(12) United States Patent
Gunn

(10) Patent No.: US 11,807,394 B1
(45) Date of Patent: Nov. 7, 2023

(54) ON-GROUND HELICOPTER ENGINE STARTER INTERRUPT SYSTEM THAT PREVENTS ENGINE START UP WHEN EITHER THE THROTTLE IS OPEN OR THE FUEL CONTROL IS ENGAGED (OR BOTH) FOR RECIPROCATING AND TURBINE HELICOPTERS

(71) Applicant: Jonathan Richard Gunn, Camarillo, CA (US)

(72) Inventor: Jonathan Richard Gunn, Camarillo, CA (US)

( * ) Notice: Subject to any disclaimer, the term of this patent is extended or adjusted under 35 U.S.C. 154(b) by 502 days.

(21) Appl. No.: 17/143,040

(22) Filed: Jan. 6, 2021

Related U.S. Application Data

(60) Provisional application No. 62/957,472, filed on Jan. 6, 2020.

(51) Int. Cl.
*B64F 1/34* (2006.01)
*F02M 1/08* (2006.01)

(52) U.S. Cl.
CPC .................. *B64F 1/34* (2013.01); *F02M 1/08* (2013.01)

(58) Field of Classification Search
CPC .............................. F02N 11/101; F02N 11/106
See application file for complete search history.

(56) References Cited

U.S. PATENT DOCUMENTS

| | | | | |
|---|---|---|---|---|
| 3,004,387 | A * | 10/1961 | Woodward, Jr. | ........ F02C 7/277 60/39.27 |
| 11,363,756 | B2 * | 6/2022 | Kuriyagawa | .......... A01D 34/76 |
| 2004/0262995 | A1 * | 12/2004 | Hawkins | ................... H02P 9/08 307/10.6 |
| 2009/0020092 | A1 * | 1/2009 | Kishibata | .............. F02N 11/101 123/179.5 |
| 2015/0114343 | A1 * | 4/2015 | Bernier | .................... B62M 9/06 123/337 |
| 2017/0089315 | A1 * | 3/2017 | Fujita | .................. F02N 11/0851 |
| 2022/0194621 | A1 * | 6/2022 | Kita | ....................... B64D 35/08 |

* cited by examiner

*Primary Examiner* — Logan M Kraft
*Assistant Examiner* — Anthony L Bacon
(74) *Attorney, Agent, or Firm* — Plager Schack LLP; Mark H. Plager; Stephen Hallberg

(57) ABSTRACT

An on-ground engine starter interrupt system that prevents engine start up when either the throttle is open or the fuel control is engaged (or both) for reciprocating and turbine helicopters is disclosed. The on-ground engine starter interrupt system works for Robinson helicopter models R22, R44, and R66.

1 Claim, 34 Drawing Sheets

REMOVE BOTTOM ACCESS PANEL AND COVER UNDER PILOT COLLECTIVE

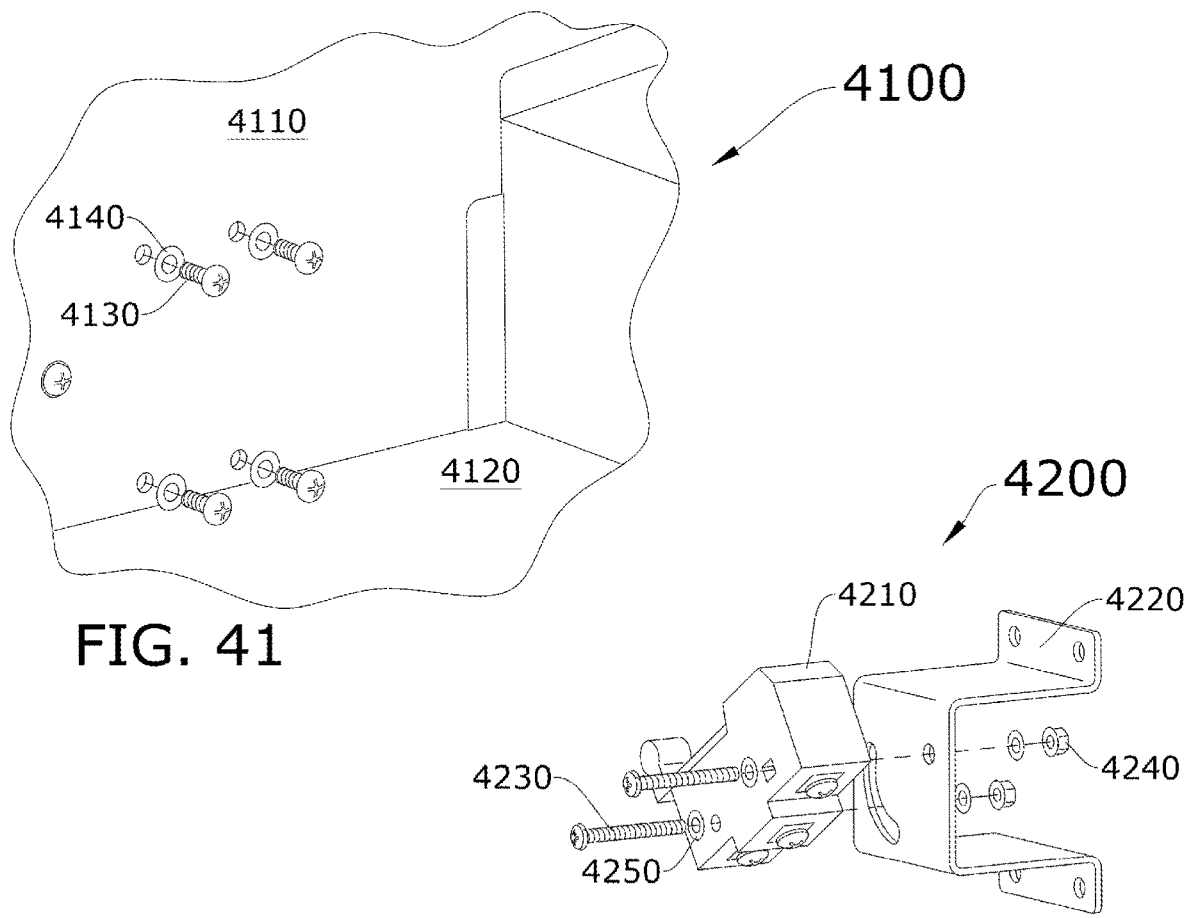
FIG. 41
FIG. 42
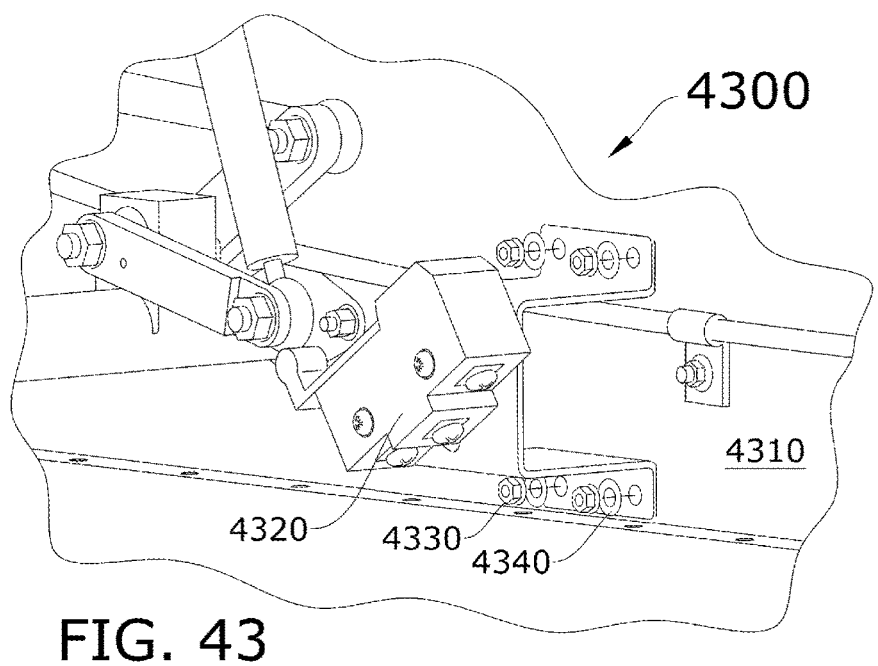
FIG. 43

ON-GROUND HELICOPTER ENGINE STARTER INTERRUPT SYSTEM THAT PREVENTS ENGINE START UP WHEN EITHER THE THROTTLE IS OPEN OR THE FUEL CONTROL IS ENGAGED (OR BOTH) FOR RECIPROCATING AND TURBINE HELICOPTERS

CLAIM OF BENEFIT TO PRIOR APPLICATION

This application claims benefit to U.S. Provisional Patent Application 62/957,472, entitled "AN ON-GROUND HELICOPTER ENGINE STARTER INTERRUPT SYSTEM THAT PREVENTS ENGINE START UP WHEN EITHER THE THROTTLE IS OPEN OR THE FUEL CONTROL IS ENGAGED (OR BOTH) FOR RECIPROCATING AND TURBINE HELICOPTERS," filed Jan. 6, 2020. The U.S. Provisional Patent Applications 62/957,472 is incorporated herein by reference.

BACKGROUND

Embodiments of the invention described in this specification relate generally to helicopter safety systems, and more particularly, to an on-ground helicopter engine starter interrupt system that prevents engine start up when either the throttle is open or the fuel control is engaged (or both) for reciprocating and turbine helicopters, such as Robinson helicopter models R22, R44, and R66.

Problems occur when starting a helicopter engine with the throttle open or fuel control engaged or a combination of both. None of the existing reciprocating or turbine helicopters prevent an operator from starting the helicopter when either or both of the throttle is open or the fuel control is engaged. No existing add-on systems prevent such start-up scenario either.

Therefore, what is needed is a way to prevent starting the engine of the helicopter with the throttle open or fuel control engaged or a combination of both.

BRIEF DESCRIPTION

A novel on-ground helicopter engine starter interrupt system is disclosed that prevents engine start up of a helicopter when either a throttle of the helicopter is open or a fuel control of the helicopter is engaged (or both) for reciprocating and turbine helicopters. In some embodiments, the on-ground helicopter engine starter interrupt system includes a first electrical position switch (S1), a second electrical position switch (S2), a first relay (R1), a second relay (R2), and an indicator light (L1). In some embodiments, the first electrical position switch S1, the second electrical position switch S2, the first relay R1, and the second relay R2 are connected to control linkage of the helicopter that detects when at least one of the throttle of the helicopter is open and the fuel control of the helicopter is engaged. In some embodiments, at least one of the first electrical position switch S1 and the second electrical position switch S2 is positioned via a mounting bracket next to at least one of a throttle linkage of the helicopter and a fuel control of the helicopter to detect its position as being in one of an open position and a closed position. In some embodiments, the first relay R1 is connected in series to an existing engine starter signal wire and provides an engine starter signal to the first electrical position switch S1. In some embodiments, the second relay R2 is used to isolate the starter interrupt circuit after a normal engine start. In some embodiments, the engine starter signal is interrupted when the throttle or the fuel control is in the open position, as detected by either the first electrical position switch S1 or the second electrical position switch S2, and the indicator lamp L1 is lighted to indicate that the throttle or the fuel control is in the open position. On the other hand, the engine starter signal is supplied to the engine starter switch for engagement when the throttle of the helicopter and the fuel control of the helicopter are in the closed position. In some embodiments, the on-ground helicopter engine starter interrupt system works with reciprocating and turbine helicopters. In some embodiments, the on-ground helicopter engine starter interrupt system works for Robinson helicopter models R22, R44 (both the "R44 Raven I and Cadet" and the "R44 Raven II"), and R66.

The on-ground helicopter engine starter interrupt system is also generally referred to as a "helicopter engine starter interrupt system," a "helicopter engine starter interrupt," a "starter interrupt system," or simply a "starter interrupt". The on-ground helicopter engine starter interrupt system is also specifically referred, for each Robinson helicopter model R22, R44 (generally), R44 Raven I and Cadet, R44 Raven II, and R66, with a preceding descriptor "R22", "R44 Raven I and Cadet," "R44 Raven II," and "R66," for the referenced naming convention noted above. For example, the R22 starter interrupt, the R44 Raven II starter interrupt system, the R66 helicopter engine starter interrupt, and so on. Also, in this disclosure, a general leading descriptor for "R44" is considered to be inclusive of references to both the "R44 Raven I and Cadet," the "R44 Raven II," and other R44 model helicopters that may apply.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 41 conceptually illustrates a detail view of the S1 bracket mounting screw placement along the compartment wall from the copilot seat compartment in some embodiments of the R44 starter interrupt.

FIG. 42 conceptually illustrates a detail view of the S1 switch and bracket assembly in some embodiments of the R44 starter interrupt.

FIG. 43 conceptually illustrates a detail view of the S1 switch and bracket assembly in place in some embodiments of the R44 starter interrupt.

DETAILED DESCRIPTION

Figure 1:
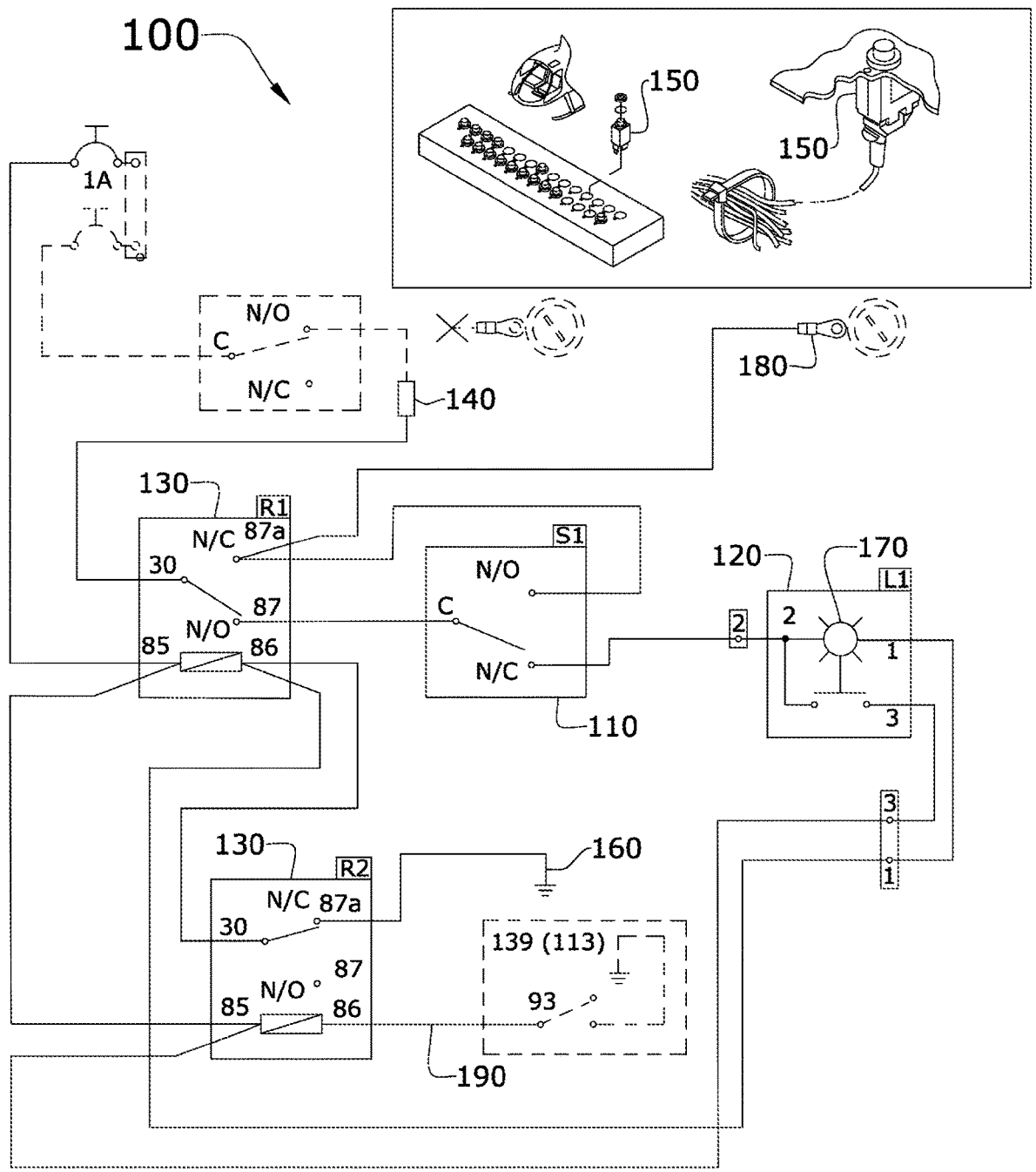
FIG. 1 conceptually illustrates a wiring diagram of an R22 starter interrupt in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide an on-ground helicopter engine starter interrupt system that prevents engine start up of a helicopter when either a throttle of the helicopter is open or a fuel control of the helicopter is engaged (or both) for reciprocating and turbine helicopters. In some embodiments, the on-ground helicopter engine starter interrupt system includes a first electrical position switch (S1), a second electrical position switch (S2), a first relay (R1), a second relay (R2), and an indicator light (L1). In some embodiments, the first electrical position switch S1, the second electrical position switch S2, the first relay R1, and the second relay R2 are connected to control linkage of the helicopter that detects when at least one of the throttle of the helicopter is open and the fuel control of the helicopter is engaged. In some embodiments, at least one of the first electrical position switch S1 and the second electrical position switch S2 is positioned via a mounting bracket next to at least one of a throttle linkage of the helicopter and a fuel control of the helicopter to detect its position as being in one of an open position and a closed position. In some embodiments, the first relay R1 is connected in series to an existing engine starter signal wire and provides an engine starter signal to the first electrical position switch S1. In some embodiments, the second relay R2 is used to isolate the starter interrupt circuit after a normal engine start. In some embodiments, the engine starter signal is interrupted when the throttle or the fuel control is in the open position, as detected by either the first electrical position switch S1 or the second electrical position switch S2, and the indicator lamp L1 is lighted to indicate that the throttle or the fuel control is in the open position. On the other hand, the engine starter signal is supplied to the engine starter switch for engagement when the throttle of the helicopter and the fuel control of the helicopter are in the closed position. In some embodiments, the on-ground helicopter engine starter interrupt system works with reciprocating and turbine helicopters. In some embodiments, the on-ground helicopter engine starter interrupt system works for Robinson helicopter models R22, R44 (both the "R44 Raven I and Cadet" and the "R44 Raven II"), and R66.

As stated above, problems occur when starting a helicopter engine with the throttle open or fuel control engaged or a combination of both. None of the existing reciprocating or turbine helicopters prevent an operator from starting the helicopter when either or both of the throttle is open or the fuel control is engaged. No existing add-on systems prevent such start-up scenario either. Embodiments of the on-ground helicopter engine starter interrupt system described in this specification solve such problems by adding a combination of electrical position switches and relays to the control linkage that detects whether the throttle is open or fuel control engaged. When either the throttle is detected open or the fuel control is detected to be engaged, the on-ground helicopter engine starter interrupt system interrupts the signal used to engage the engine starter until in the linkage is in the correct position.

Embodiments of the on-ground helicopter engine starter interrupt system described in this specification differ from and improve upon currently existing options. In particular, some embodiments of the on-ground helicopter engine starter interrupt system differ because starting a helicopter engine with the throttle open or the fuel control engaged (or a combination of both the throttle being open and the fuel control being engaged when the engine is started) causes major damage to the helicopter engine. Typically, such damage to the engine results in the removal of the engine for repair. The consequences include unwanted idle ground time for the helicopter, added expense of repair, and general aggravation by the owner or operator of the helicopter, among other negative consequences. However, the on-ground helicopter engine starter interrupt system of the present disclosure provides a different and improved set of components from existing conventional helicopter systems which prevent the helicopter engine from being started when the throttle is open or the fuel control is engaged.

The on-ground helicopter engine starter interrupt system of the present disclosure may be comprised of the following elements and components. This list of possible constituent elements and components is intended to be exemplary only and it is not intended that this list be used to limit the on-ground helicopter engine starter interrupt system of the present application to just these elements and components. Notably, specific implementations (for Robinson helicopter models R22, R44, R44 Raven I and Cadet, R44 Raven II, and R66) of the on-ground helicopter engine starter interrupt system are described further below, by reference to FIGS. 1-64, and each implementation may include additional, alternative, or equivalent elements or components. Thus, persons having ordinary skill in the art relevant to the present disclosure may understand there to be additional, alternatively, and/or equivalent elements and components that may be substituted within the present disclosure without changing the essential function or operation of the on-ground helicopter engine starter interrupt system.

1. A first electrical position switch S1
2. A second electrical position switch S2
3. A first relay R1
4. A second relay R2
5. An indicator light L1

The various elements and components of the on-ground helicopter engine starter interrupt system of the present disclosure may be related in the following exemplary fashion. It is not intended to limit the scope or nature of the relationships between the various elements and components and the following examples are presented as illustrative examples only. The first relay R1 is connected in series to the existing engine starter signal wire and provides the starter signal to the first electrical position switch S1. The first electrical position switch S1 or the second electrical position switch S2 is positioned via a mounting bracket next to the throttle linkage of the helicopter or the fuel control of the helicopter to detect its position related to being open or closed. The engine starter signal is interrupted when the throttle or fuel control is in the open position, as detected by the first electrical position switch S1 or the second electrical position switch S2, and the indicator lamp L1 is lighted to indicate the throttle or fuel control is in the open position. On the other hand, the engine starter signal is supplied to the engine starter switch for engagement when the throttle of the helicopter and the fuel control of the helicopter are in the closed position. After a normal engine start, the second relay R2 is used to isolate the starter interrupt circuit described here.

The on-ground helicopter engine starter interrupt system generally works by operation of the several components listed and described above. Those components are electrically connected to each other to provide the correct condition for engine starter engagement or not, depending on the status of the throttle and the fuel control. Furthermore, the on-ground helicopter engine starter interrupt system works in specific ways according to specific implementations of the on-ground helicopter engine starter interrupt system for Robinson helicopter models R22, R44, R44 Raven I and Cadet, R44 Raven II, and R66, as described further below, by reference to FIGS. 1-64.

Generally, a person may make the on-ground helicopter engine starter interrupt system of the present disclosure by assembling and deploying industry available position switches with a special custom designed bracket along with relays and the indicator light, which are all mounted and electrically connected to provide the intended engine start protection. Specific details of how to make the on-ground helicopter engine starter interrupt system for operation in Robinson helicopter models R22, R44, R44 Raven I and Cadet, R44 Raven II, and R66, are described further below, by reference to FIGS. 1-64.

Also, a person seeking to use the on-ground helicopter engine starter interrupt system may generally follow installation drawings that are provided with a kit (with all the components) for mechanical installation and electrical connection to the existing vehicle/air frame. Furthermore, usage of the on-ground helicopter engine starter interrupt system varies for each of the Robinson helicopter models R22, R44, R44 Raven I and Cadet, R44 Raven II, and R66, according to the particular details of those specific implementations, as described further below, by reference to FIGS. 1-64.

Several more detailed embodiments of the on-ground helicopter engine starter interrupt system are described in the sections below. Section I describes components of an R22 starter interrupt and wiring of the components for the R22 starter interrupt. Section II describes components of an R44 Raven I and Cadet starter interrupt and wiring of the components for the R44 Raven I and Cadet starter interrupt. Section III describes components of an R44 Raven II starter interrupt and wiring of the components for the R44 Raven II starter interrupt. Section IV describes components of an R66 starter interrupt and wiring of the components for the R66 starter interrupt. Section V describes installation and deployment of an R22 starter interrupt. Section VI describes installation and deployment, in general, of an R44 starter interrupt. Section VII describes installation and deployment of an R66 starter interrupt.

I. R22 Starter Interrupt Components and Circuit Wiring

In some embodiments, the on-ground helicopter engine starter interrupt system ("R22 starter interrupt" or "R22 starter interrupt circuit") is installed into existing equipment and interfaces of a Robinson R22 helicopter to prevent engine start up when the throttle of the helicopter is open. In some embodiments, the R22 starter interrupt includes an electrical position switch, a first relay, a second relay, and an indicator lamp. In some embodiments, the electrical position switch, the first relay, and the second relay are installed into and connected to the existing throttle control linkage of the helicopter, which is able to detect whether the throttle of the helicopter is open or closed. In some embodiments, the electrical position switch is positioned via a mounting bracket next to the throttle control linkage in order to detect when the throttle is open and when it is closed, and adjust its position to one of a throttle open position that corresponds to a normally closed (N/C) position and a throttle closed position that corresponds to a normally open (N/O) position. In some embodiments, the first relay is connected in series to an existing rotor brake switch and engine starter signal wire and, when energized (N/C position), provides an engine starter signal to the electrical position switch when the clutch of the helicopter is disengaged. The electrical position switch, in turn, interrupts the engine starter signal and lights the indicator lamp when the throttle is detected open (throttle open position) or, when the throttle is detected closed (throttle closed position), passes the engine starter signal back to the first relay which then sends the engine starter signal to a key starter switch to start the helicopter. In some embodiments, the second relay is used to isolate the R22 starter interrupt circuit after a normal engine start.

By way of example, FIG. 1 conceptually illustrates a wiring diagram of an R22 starter interrupt 100. As shown in this figure, the R22 starter interrupt 100 includes several components that are symbolically shown in the wiring diagram. Specifically, the R22 starter interrupt 100 includes a switch 110; a lamp 120 with a bulb 170; relays 130; a 16-20 gauge environmental splice 140 rated for aircraft; a circuit breaker 150; a ground wire 160; a key starter switch 180, and a clutch switch connection 190. In some embodiments, the switch 110 is a microswitch (S1) 110 with adjustment. In some embodiments, the lamp 120 is a non-dimming incandescent amber lamp (L1) 120 configured with PTT ("press to test" or "push to test") and includes three pins ("pin 1," "pin 2," and "pin 3"). In some embodiments, the bulb 170 is 14V bulb that is used in pilot lights of older helicopters with 12-14V systems. In some embodiments, the bulb 170 is a 28V bulb that is used in pilot lights of new helicopters with 24-28V systems. In some embodiments, the bulb 170 is encapsulated within the PTT, which is configured as such to allow a pilot or other user to press the lamp 120 PTT to test whether the bulb is working. In some embodiments, the circuit breaker 150 is a 1 Amp circuit breaker 150 ("1 A circuit breaker 150").

Figure 14:
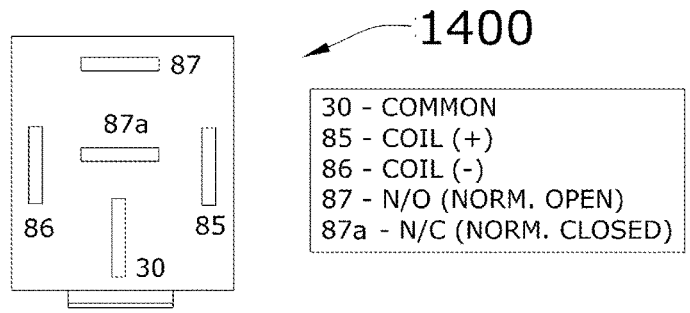
FIG. 14 conceptually illustrates a bottom view of a relay included in the R44 Raven II starter interrupt in some embodiments.

The R22 starter interrupt 100 is installed into existing wiring equipment and interfaces of a Robinson R22 helicopter (i.e., see Robinson R22 Maintenance Manual electrical wiring diagrams FIG. 14.600, pg. 14, 18A and/or B). As such, the R22 starter interrupt 100 interfaces with the existing equipment, such as a rotor brake switch connected to the existing circuit breaker and which provides the rotor brake signal to the R22 starter interrupt 100 circuit as installed. To differentiate between the R22 starter interrupt 100 components/wiring and the existing equipment/wiring shown in this figure, the existing wiring equipment and interfaces are shown in dashed lines, while the components and wiring of the R22 starter interrupt 100 are illustrated in solid lines. Also, contacts in the R22 starter interrupt 100 demonstrate a "throttle open" configuration, which allows signal at the switch 110 to pass to the lamp (L1) 120 to light up the bulb 170, instead of passing to the key starter switch 180 to start the helicopter. However, a person of ordinary skill in the art would understand that the R22 starter interrupt 100 shown in FIG. 1 could be shown in a "throttle closed" configuration.

Specifically, starting at the existing battery bus, a new circuit breaker (the 1 A circuit breaker 150) is installed in the circuit breaker panel. In this figure, the 1 A circuit breaker 150 is shown in a box as a conceptually illustrated component, and is also symbolically shown within the wiring diagram (as "1 A" corresponding to circuit breaker symbol). As shown within the box, the 1 A circuit breaker 150 is installed in a spare unmarked location of the circuit breaker panel, which is typically located in front of the copilot seat.

Figure 2:
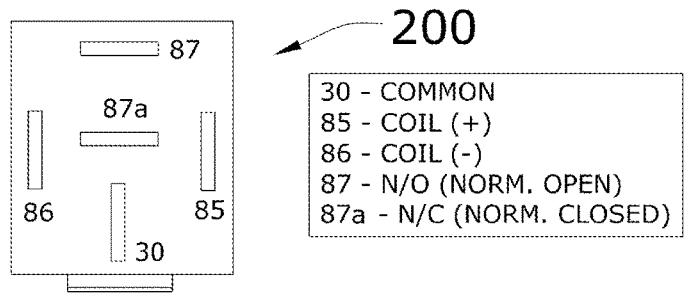
FIG. 2 conceptually illustrates a bottom view of a relay included in the R22 starter interrupt in some embodiments.

In some embodiments, the relays 130 connected into the circuit of the R22 starter interrupt 100 include a first relay (R1) 130 and a second relay (R2) 130. In some embodiments, the relays 130 are 12V DC single pole double throw (SPDT) relays. By way of reference, FIG. 2 conceptually illustrates a bottom view of an exemplary relay 200. The relay 200 shown in this figure is an SPDT relay, like the first relay (R1) 130 and the second relay (R2) 130 included in the R22 starter interrupt 100. As shown, the relay 200 includes a plurality of connector terminals comprising a common 30 terminal, a coil (+) 85 terminal, a coil (−) 86 terminal, a normally open (N/O) 87 terminal, and a normally closed (N/C) 87A terminal. Turning back to FIG. 1, the first relay (R1) 130 is wired to the environmental splice 140 after removing an existing ring terminal connection wire at an existing key starter switch and installing the environmental splice 140 at one end to existing wire that connects to an existing key starter switch terminal and at the opposing end to 16-gauge wire to the first relay (R1) 130.

Figure 3:
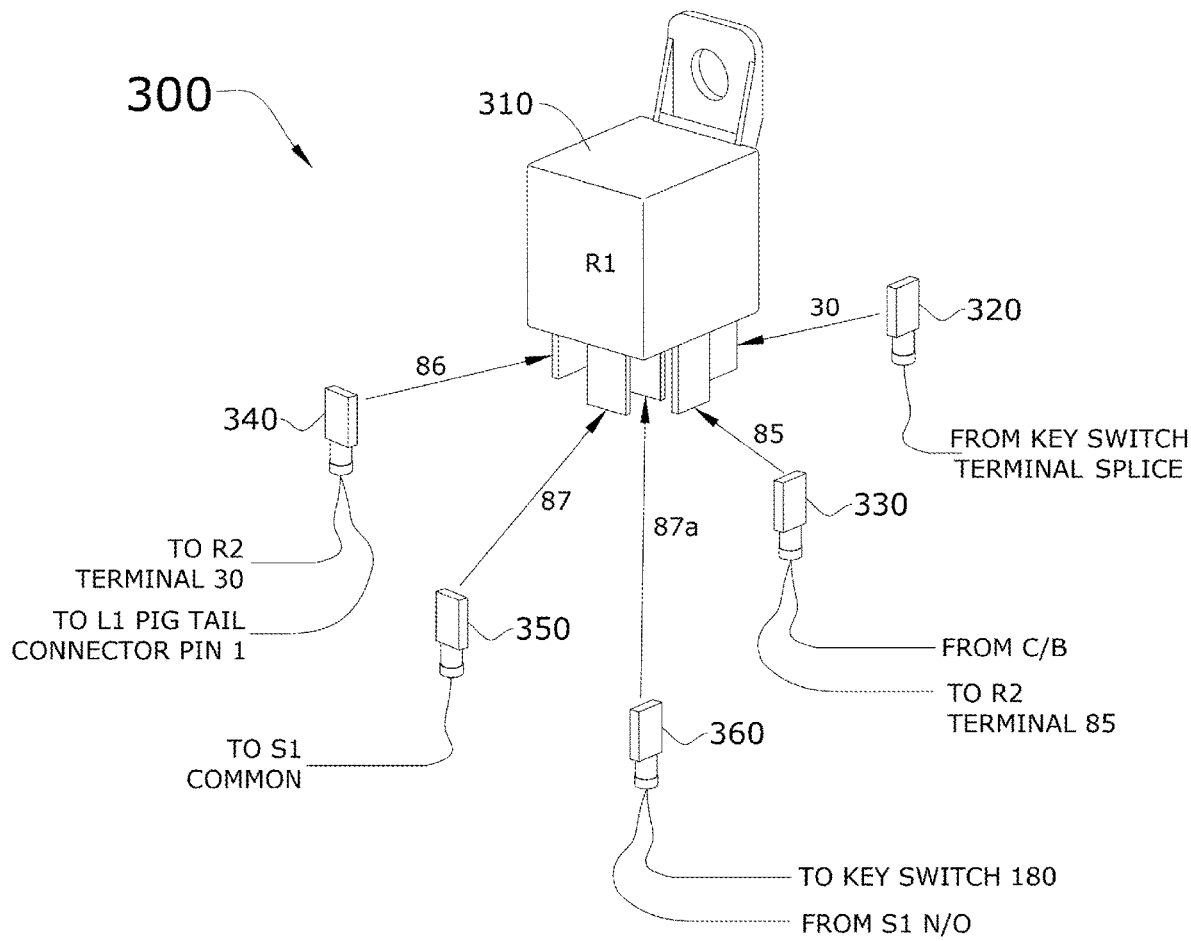
FIG. 3 conceptually illustrates an exploded view of an R1 relay connection of the R22 starter interrupt in some embodiments.
Figure 4:
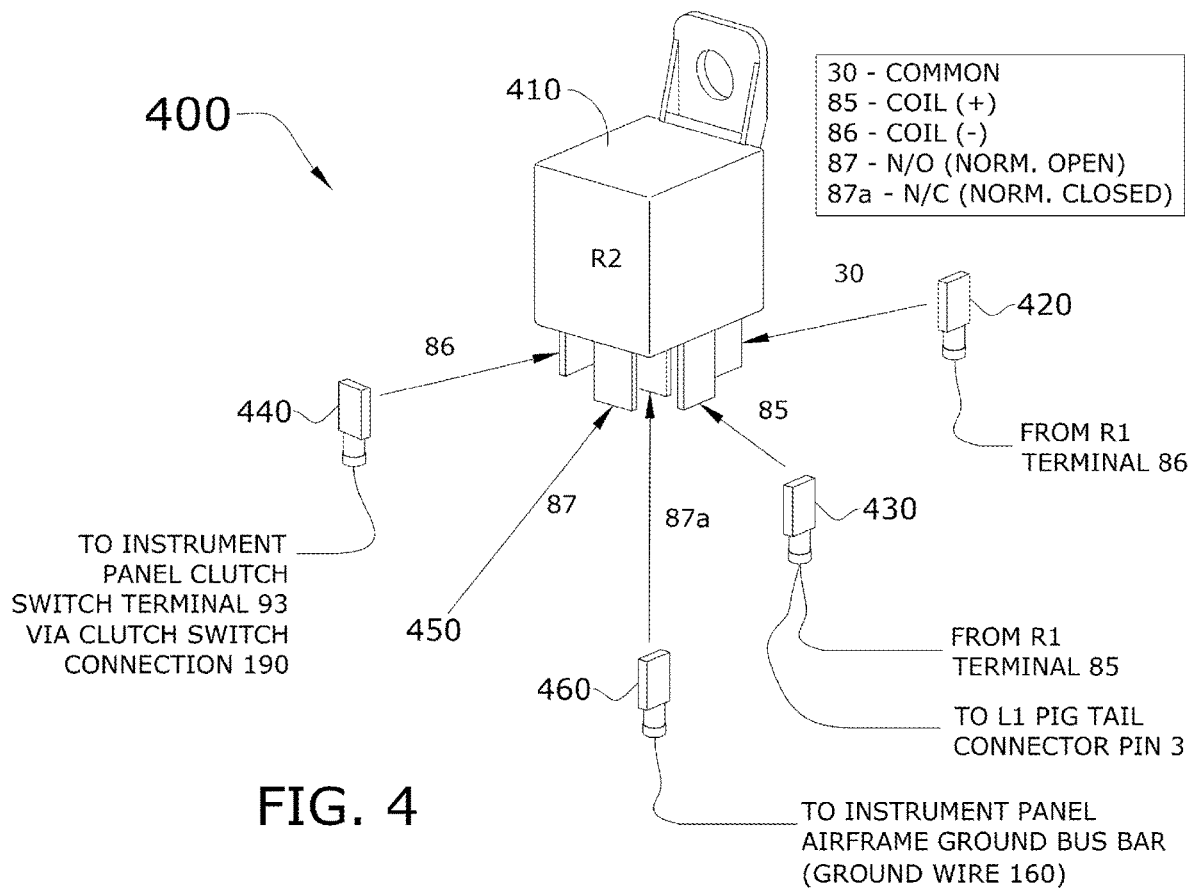
FIG. 4 conceptually illustrates an exploded view of an R2 relay connection of the R22 starter interrupt in some embodiments.

Also, each relay (R1 and R2) 130 is connected to the R22 starter interrupt 100 circuit by spade terminals, which are demonstrated in FIGS. 3 and 4. Turning first to FIG. 3, which conceptually illustrates an exploded perspective view 300 of a relay (R1) 310 and a plurality of spade terminals 320-360. As shown in this figure, the relay (R1) 310 includes the five bottom connector terminals, namely, the common 30 terminal, the coil (+) 85 terminal, the coil (−) 86 terminal, the N/O 87 terminal, and the N/C 87A terminal, which allow the relay (R1) 310 to be connected to the R22 starter interrupt 100 circuit. Specifically, spade terminal 320 connects to the common 30 terminal of the relay (R1) 310 and includes pigtail connection from the existing key starter switch terminal by way of the environmental splice 140 and newly added 16-gauge wire, spade terminal 330 connects to the coil (+) 85 terminal of the relay (R1) 310 and includes pigtail connections from the newly added 1 A circuit breaker 150 and to the coil (+) 85 terminal of the second relay (R2) 130, spade terminal 340 connects to the coil (−) 86 terminal of the relay (R1) 310 and includes pigtail connections to the common 30 terminal of the second relay (R2) 130 and to pig tail connector pin 1 of the lamp (L1) 120 with PTT, spade terminal 350 connects to the N/O 87 terminal of the relay (R1) 310 and includes pigtail connection to a common terminal of the switch 110, and spade terminal 360 connects to the N/C 87A terminal of the relay (R1) 310 and includes pigtail connections to a key starter switch terminal that is re-connected via existing ring terminal connection wire that was modified to add environmental splice 140 and from an N/O 87 terminal of the microswitch (S1) 110 with adjustment.

Now turning to another example of a relay used in the R22 starter interrupt 100 circuit, FIG. 4 conceptually illustrates an exploded perspective view 400 of a relay (R2) 410 and a plurality of spade terminals 420-460. As shown in this figure, the relay (R2) 410 includes the five bottom connector terminals, namely, the common 30 terminal, the coil (+) 85 terminal, the coil (−) 86 terminal, the N/O 87 terminal, and the N/C 87A terminal, which allow the relay (R2) 410 to be connected to the R22 starter interrupt 100 circuit. Specifically, spade terminal 420 connects to the common 30 terminal of the relay (R2) 410 and includes pigtail connection from the coil (−) 86 terminal of the relay (R1) 310, spade terminal 430 connects to the coil (+) 85 terminal of the relay (R2) 410 and includes pigtail connections from the coil (+) 85 terminal of the relay (R1) 310 and to pig tail connector pin 3 of the lamp (L1) 120 with PTT, spade terminal 440 connects to the coil (−) 86 terminal of the relay (R2) 410 and includes a pigtail connection to an existing instrument panel clutch switch terminal 93, spade terminal 450 connects to the N/O 87 terminal of the relay (R2) 410 with no connection out, and spade terminal 460 connects to the N/C 87A terminal of the relay (R2) 410 and includes a pigtail connection to the existing instrument panel airframe ground bus bar.

Figure 5:
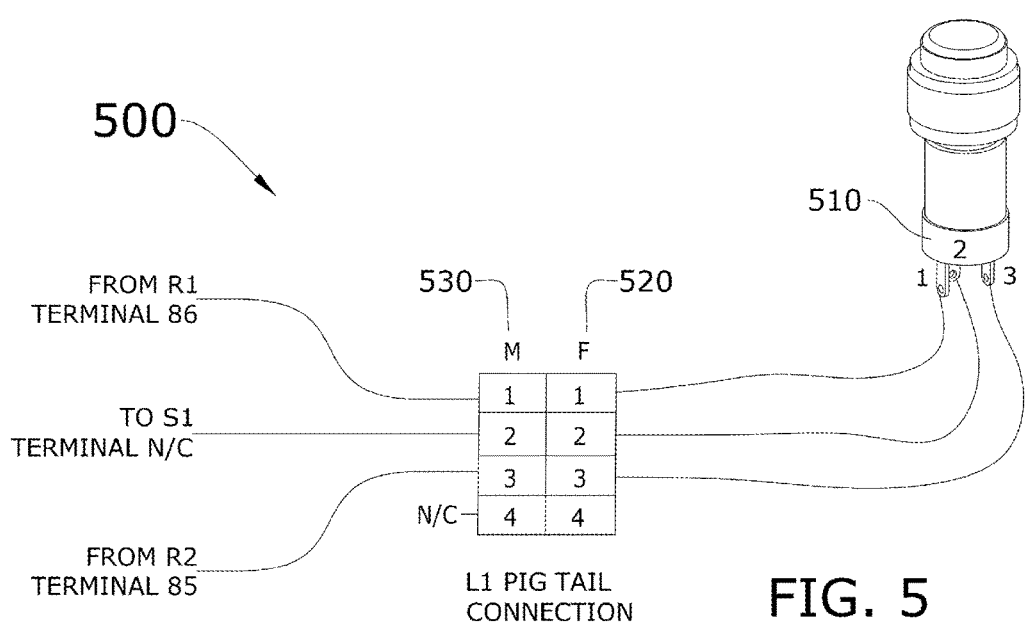
FIG. 5 conceptually illustrates a schematic view of the L1 incandescent lamp pigtail connection of the R22 starter interrupt in some embodiments.

By way of example, FIG. 5 conceptually illustrates a schematic view 500 of the pigtail connections of the incandescent lamp (L1) of the R22 starter interrupt. As shown in this figure, a Molex 4pin female connector 520 and a Molex 4pin male connector 530 map pig tail connections with respect to the incandescent lamp (L1) 510 via three pins ("pin 1," "pin 2," and "pin 3"). In this way, the first relay (R1) 310 connects from the coil (−) 86 terminal to pin 1 of the incandescent lamp (L1) 510 via pin 1 of the Molex 4pin female connector 520 and the Molex 4pin male connector 530 and the second relay (R2) 410 connects from the coil (+) 85 terminal to pin 3 of the incandescent lamp (L1) 510 via pin 3 of the Molex 4pin female connector 520 and the Molex 4pin male connector 530. Also, signal is sent from the incandescent lamp (L1) 510 through pin 2 and via pin 2 of the Molex 4pin female connector 520 and the Molex 4pin male connector 530 to terminal N/C of the microswitch (S1) 110. The microswitch (S1) 110 with adjustment is described in further detail, next.

Figure 6:
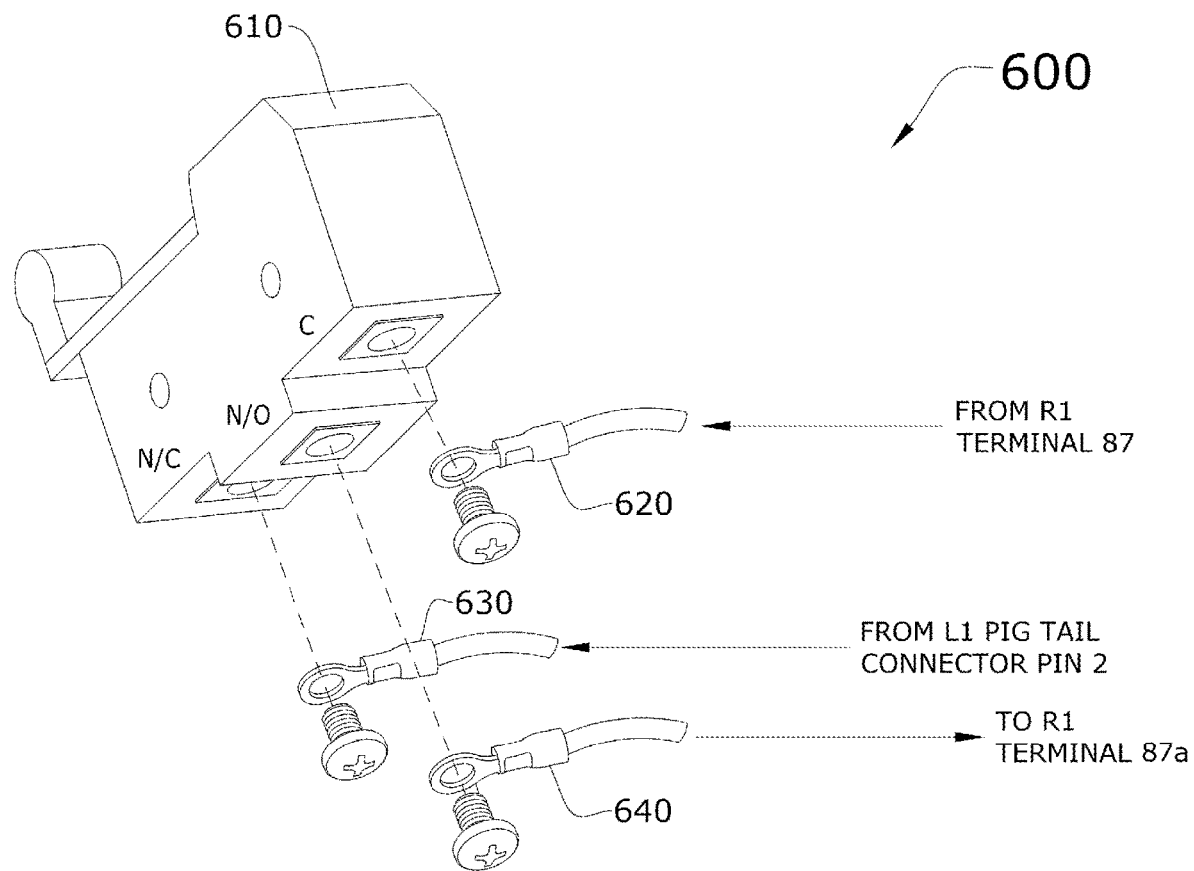
FIG. 6 conceptually illustrates an exploded view of the S1 microswitch of the R22 starter interrupt in some embodiments.

By way of example, FIG. 6 conceptually illustrates an exploded view 600 of a microswitch (S1) 610 of the R22 starter interrupt. As shown in this figure, the microswitch (S1) 610 includes an internal lock ring terminal common 620, an internal lock ring terminal N/C 630 (throttle open), and an internal lock ring terminal N/O 640 (throttle closed). The ring terminals are wired and screwed to the microswitch (S1) 610, thereby connecting the microswitch (S1) 610 to the R22 starter interrupt circuit. Signal from the N/O 87 terminal of the first relay (R1) 310 is received at the internal lock ring terminal common 620 of the microswitch (S1) 610. Signal is also received at the microswitch (S1) 610 by way of the internal lock ring terminal N/C 630 from pig tail connector pin 2 of the incandescent lamp (L1) 510, which is lighted when the throttle is open, thereby effectively interrupting the engine starter signal from starting the helicopter with the throttle open. Furthermore, signal is output to the N/C 87A terminal of the first relay (R1) 310 by way of the internal lock ring terminal N/C 640, after which the engine starter signal flows to the key starter switch 180 to start the helicopter.

II. R44 Raven I and Cadet Starter Interrupt Components and Circuit Wiring

In some embodiments, the on-ground helicopter engine starter interrupt system ("R44 Raven I and Cadet starter interrupt" or "R44 Raven I and Cadet starter interrupt circuit") is installed into existing equipment and interfaces of a Robinson R44 Raven I and Cadet helicopter to prevent engine start up when the throttle of the helicopter is open. In some embodiments, the R44 Raven I and Cadet starter interrupt includes an electrical position switch, a first relay, a second relay, and an indicator lamp. In some embodiments, the electrical position switch, the first relay, and the second relay are installed into and connected to the existing throttle control linkage of the helicopter, which is able to detect whether the throttle of the helicopter is open or closed. In some embodiments, the electrical position switch is positioned via a mounting bracket next to the throttle control linkage so as to detect when the throttle is open and when it is closed, and thereby adjust its position to one of a throttle open position that corresponds to a normally closed (N/C) position and a throttle closed position that corresponds to a normally open (N/O) position. In some embodiments, the first relay is connected in series to an existing rotor brake switch and engine starter signal wire and, when energized (N/C position), provides an engine starter signal to the electrical position switch when the clutch of the helicopter is disengaged. The electrical position switch, in turn, interrupts the engine starter signal and lights the indicator lamp when the throttle is detected open (throttle open position) or, when the throttle is detected closed (throttle closed position), passes the engine starter signal back to the first relay which then sends the engine starter signal to a key starter switch to start the helicopter. In some embodiments, the second relay is used to isolate the R44 Raven I and Cadet starter interrupt circuit after a normal engine start.

Figure 7:
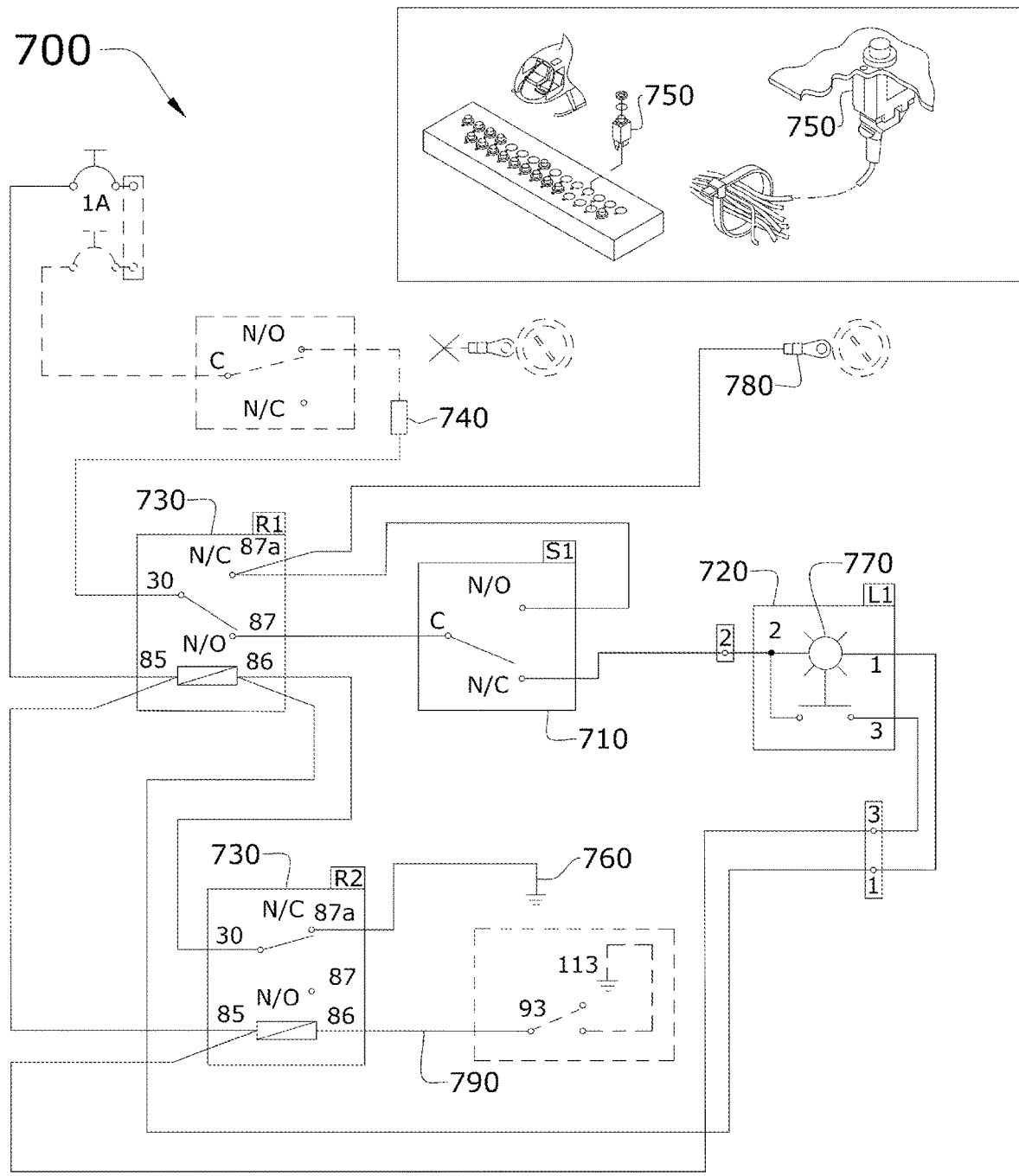
FIG. 7 conceptually illustrates a wiring diagram of an R44 Raven I and Cadet starter interrupt in some embodiments.

By way of example, FIG. 7 conceptually illustrates a wiring diagram of an R44 Raven I and Cadet starter interrupt 700. As shown in this figure, the R44 Raven I and Cadet starter interrupt 700 includes several components that are symbolically shown in the wiring diagram. Specifically, the R44 Raven I and Cadet starter interrupt 700 includes a switch 710; a lamp 720 with a bulb 770; relays 730; a 16-20 gauge environmental splice 740 rated for aircraft; a circuit breaker 750; a ground wire 760; a key starter switch 780, and a clutch switch connection 790. In some embodiments, the switch 710 is a microswitch (S1) 710 with adjustment. In some embodiments, the lamp 720 is a non-dimming incandescent amber lamp (L1) 720 configured with PTT and includes three pins ("pin 1," "pin 2," and "pin 3"). In some embodiments, the bulb 770 is 14V bulb that is used in pilot lights of older helicopters with 12-14V systems. In some embodiments, the bulb 770 is a 28V bulb that is used in pilot lights of new helicopters with 24-28V systems. In some embodiments, the bulb 770 is encapsulated within the PTT, which is configured as such to allow a pilot or other user to press the lamp 720 PTT to test whether the bulb is working. In some embodiments, the circuit breaker 750 is a 1 Amp circuit breaker 750 ("1 A circuit breaker 750").

The R44 Raven I and Cadet starter interrupt 700 is installed into existing wiring equipment (such as an existing rotor brake switch that is connected to the circuit breaker of the helicopter) and interfaces of a Robinson R44 Raven I and Cadet helicopter (i.e., see Robinson R44 Maintenance Manual electrical wiring diagrams FIG. 14.17 through 14.19D, pages 14.17 through 14.18A, depending on 14V or 28V aircraft configuration). As such, the R44 Raven I and Cadet starter interrupt 700 interfaces with the existing equipment, including the rotor brake switch which provides the rotor brake signal to the R44 Raven I and Cadet starter interrupt 700 circuit as installed. To differentiate between the R44 Raven I and Cadet starter interrupt 700 components/wiring and the existing equipment/wiring shown in this figure, the existing wiring equipment and interfaces are shown in dashed lines, while the components and wiring of the R44 Raven I and Cadet starter interrupt 700 are illustrated in solid lines. Also, contacts in the R44 Raven I and Cadet starter interrupt 700 demonstrate a "throttle open" configuration, which, when detected at the microswitch (S1) 710, interrupts the engine starter signal. In that case, the non-dimming incandescent amber lamp (L1) 720 with PTT is lighted (at the bulb 770 of the lamp), instead of passing the engine starter signal to the key starter switch 780 to start the helicopter. However, a person of ordinary skill in the art would understand that the R44 Raven I and Cadet starter interrupt 700 shown in FIG. 7 could be shown in a "throttle closed" configuration, which would suggest that the microswitch (S1) 710 allows the engine starter signal to transmit to the key starter switch 780 and start the engine.

Specifically in FIG. 7, starting at the existing battery bus, a new circuit breaker (the 1 A circuit breaker 750 shown in boxed outline with an exemplary circuit breaker panel for the helicopter and also symbolically shown within the wiring diagram as "1 A" corresponding to circuit breaker symbol). As shown within the box, the 1 A circuit breaker 750 is installed in a spare unmarked location of the circuit breaker panel, which is located in front of the copilot seat of the Robinson R44 Raven I and Cadet helicopter.

Figure 8:
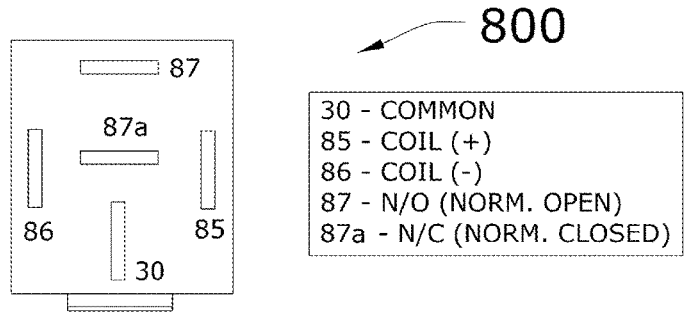
FIG. 8 conceptually illustrates a bottom view of a relay included in the R44 Raven I and Cadet starter interrupt in some embodiments.

In some embodiments, the relays 730 installed in and connected to the R44 Raven I and Cadet starter interrupt circuit 700 include a first relay (R1) 730 and a second relay (R2) 730. In some embodiments, the relays 730 are 12V DC SPDT relays. In some other embodiments, the relays 730 are 24V DC SPDT relays. The implementation of either 12V or 24V relays is dependent upon whether the helicopter is based on a 14V or a 28V aircraft system. By way of example, FIG. 8 conceptually illustrates a bottom view of an exemplary relay 800. The relay 800 shown in this figure is an SPDT relay, like the first relay (R1) 730 and the second relay (R2) 730 included in the R44 Raven I and Cadet starter interrupt 700. The power is either 14V or 28V, depending on the system employed in the helicopter. As shown, the relay 800 includes a plurality of connector terminals comprising a common 30 terminal, a coil (+) 85 terminal, a coil (−) 86 terminal, a normally open (N/O) 87 terminal, and a normally closed (N/C) 87A terminal. Turning back to FIG. 7, the first relay (R1) 730 is spliced into existing starter wire via the environmental splice 740 after removing an existing ring terminal connection wire at an existing key starter switch (or existing rotor brake position switch) and installing the environmental splice 740 at one end to existing wire that connects to an existing key starter switch terminal of the existing rotor brake position switch and at the opposing end to 16-gauge wire to the first relay (R1) 730.

Figure 9:
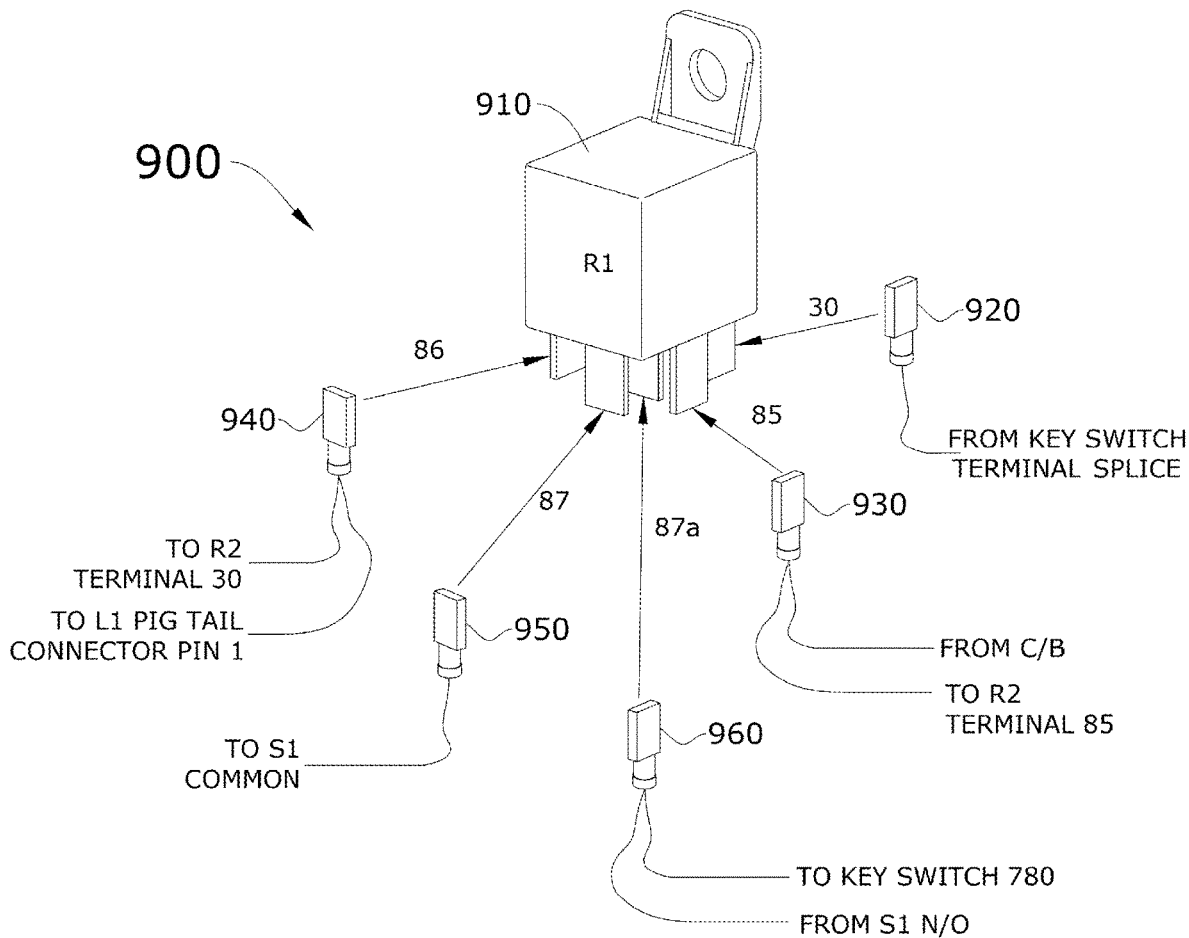
FIG. 9 conceptually illustrates an exploded view of an R1 relay connection of the R44 Raven I and Cadet starter interrupt in some embodiments.
Figure 10:
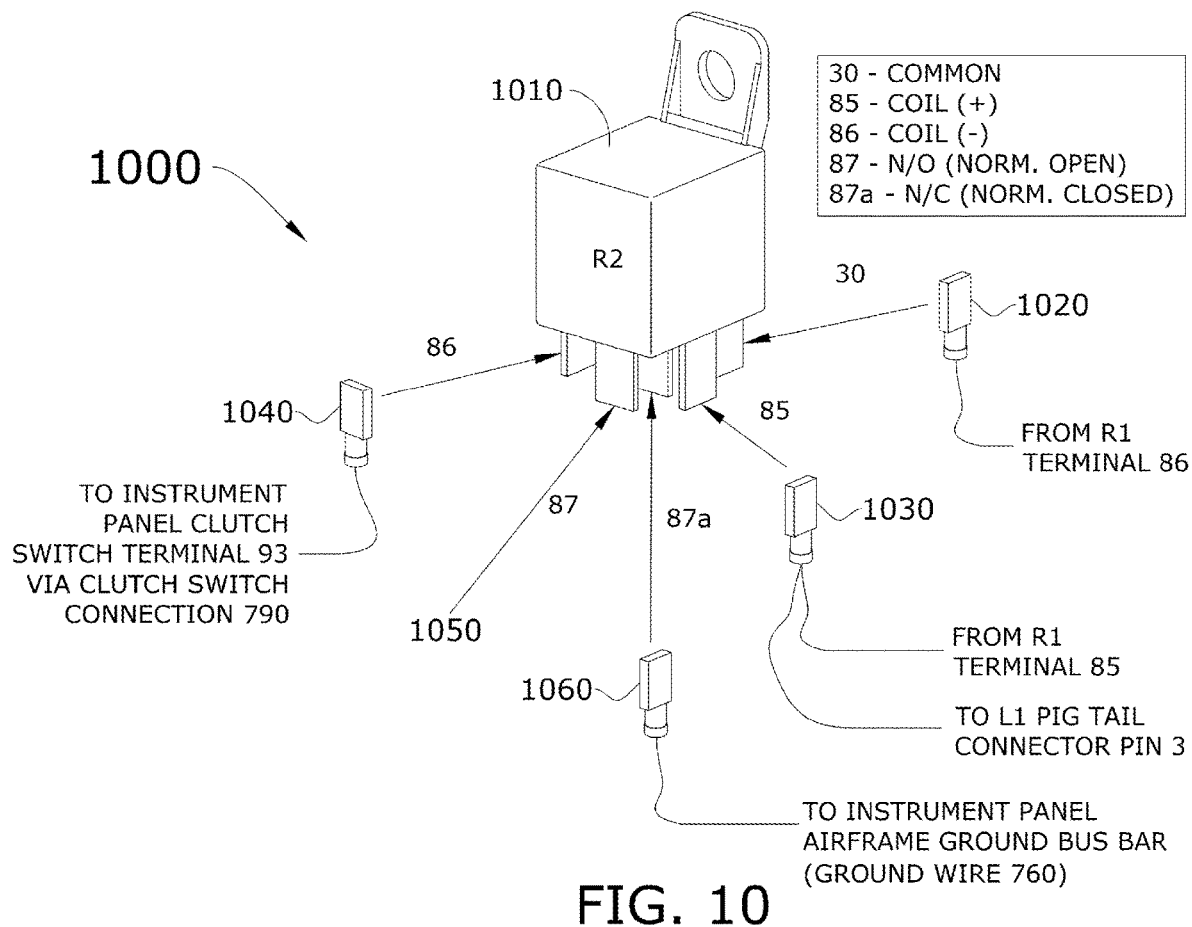
FIG. 10 conceptually illustrates an exploded view of an R2 relay connection of the R44 Raven I and Cadet starter interrupt in some embodiments.

Also, each relay (R1 and R2) 730 is connected to the R44 Raven I and Cadet starter interrupt 700 circuit by spade terminals, which are demonstrated in FIGS. 9 and 10. Turning first to FIG. 9, which conceptually illustrates an exploded perspective view 900 of a relay (R1) 910 and a plurality of spade terminals 920-960. As shown in this figure, the relay (R1) 910 includes the five bottom connector terminals, namely, the common 30 terminal, the coil (+) 85 terminal, the coil (−) 86 terminal, the N/O 87 terminal, and the N/C 87A terminal, which allow the relay (R1) 910 to be connected to the R44 Raven I and Cadet starter interrupt 700 circuit. Specifically, spade terminal 920 connects to the common 30 terminal of the relay (R1) 910 and includes pigtail connection from the existing key starter switch terminal by way of the environmental splice 740 and newly added 16-gauge wire, spade terminal 930 connects to the coil (+) 85 terminal of the relay (R1) 910 and includes pigtail connections from the newly added IA circuit breaker 750 and to the coil (+) 85 terminal of the second relay (R2) 730, spade terminal 940 connects to the coil (−) 86 terminal of the relay (R1) 910 and includes pigtail connections to the common 30 terminal of the second relay (R2) 730 and to pig tail connector pin 1 of the lamp (L1) 720 with PTT, spade terminal 950 connects to the N/O 87 terminal of the relay (R1) 910 and includes pigtail connection to a common terminal of the microswitch (S1) 710, and spade terminal 960 connects to the N/C 87A terminal of the relay (R1) 910 and includes pigtail connections to a key starter switch 780 terminal that is re-connected via existing ring terminal connection wire that was modified to add environmental splice 740 and from an N/O 87 terminal of the microswitch (S1) 710 with adjustment.

Now turning to another example of a relay used in the R44 Raven I and Cadet starter interrupt 700 circuit, FIG. 10 conceptually illustrates an exploded perspective view 1000 of a relay (R2) 1010 and a plurality of spade terminals 1020-1060. As shown in this figure, the relay (R2) 1010 includes the five bottom connector terminals, namely, the common 30 terminal, the coil (+) 85 terminal, the coil (−) 86 terminal, the N/O 87 terminal, and the N/C 87A terminal, which allow the relay (R2) 1010 to be connected to the R44 Raven I and Cadet starter interrupt 700 circuit. Specifically, spade terminal 1020 connects to the common 30 terminal of the relay (R2) 1010 and includes pigtail connection from the coil (−) 86 terminal 940 of the relay (R1) 910, spade terminal 1030 connects to the coil (+) 85 terminal of the relay (R2) 1010 and includes pigtail connections from the coil (+) 85 terminal 930 of the relay (R1) 910 and to pig tail connector pin 3 of the lamp (L1) 720 with PTT, spade terminal 1040 connects to the coil (−) 86 terminal of the relay (R2) 1010 and includes a pigtail connection to an existing instrument panel clutch switch terminal 93 (via clutch switch connection 790), spade terminal 1050 connects to the N/O 87 terminal of the relay (R2) 1010 with no connection out, and spade terminal 1060 connects to the N/C 87A terminal of the relay (R2) 1010 and includes a pigtail connection to the existing instrument panel airframe ground bus bar (via ground wire 760).

Figure 11:
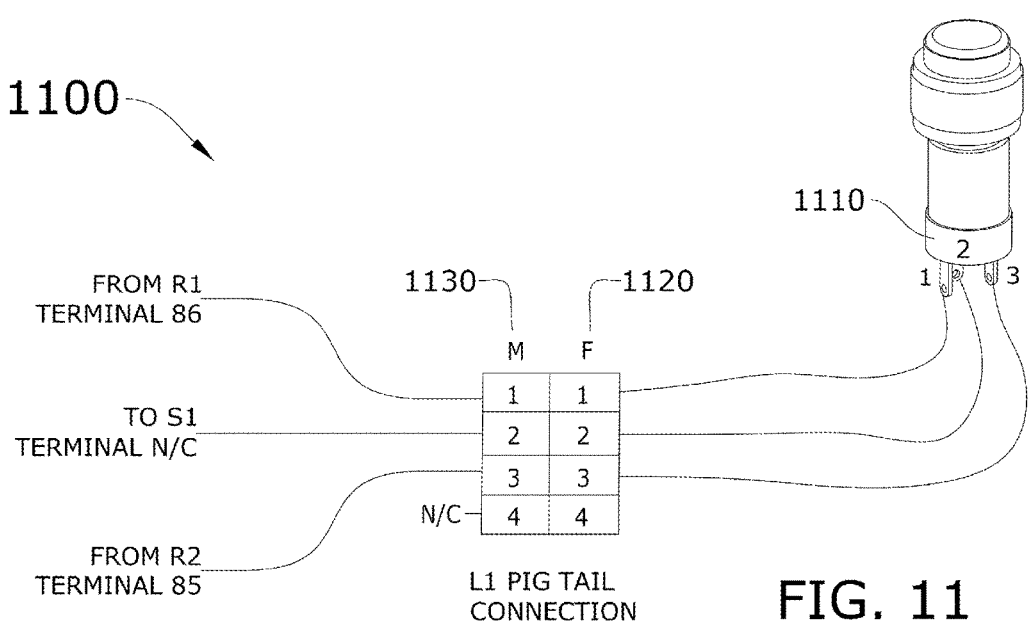
FIG. 11 conceptually illustrates a schematic view of the L1 incandescent lamp pigtail connection of the R44 Raven I and Cadet starter interrupt in some embodiments.

By way of example, FIG. 11 conceptually illustrates a schematic view 1100 of the pigtail connections of the incandescent lamp (L1) of the R44 Raven I and Cadet starter interrupt. As shown in this figure, a Molex 4pin female connector 1120 and a Molex 4pin male connector 1130 map pig tail connections with respect to the incandescent lamp (L1) 1110 via three pins ("pin 1," "pin 2," and "pin 3"). In this way, the first relay (R1) 910 connects from the coil (−) 86 terminal to pin 1 of the incandescent lamp (L1) 1110 via pin 1 of the Molex 4pin female connector 1120 and the Molex 4pin male connector 1130 and the second relay (R2) 1010 connects from the coil (+) 85 terminal to pin 3 of the incandescent lamp (L1) 1110 via pin 3 of the Molex 4pin female connector 1120 and the Molex 4pin male connector 1130. Also, signal is sent from the incandescent lamp (L1) 1110 through pin 2 and via pin 2 of the Molex 4pin female connector 1120 and the Molex 4pin male connector 1130 to terminal N/C of the microswitch (S1) 710. The microswitch (S1) 710 with adjustment is described in further detail, next.

Figure 12:
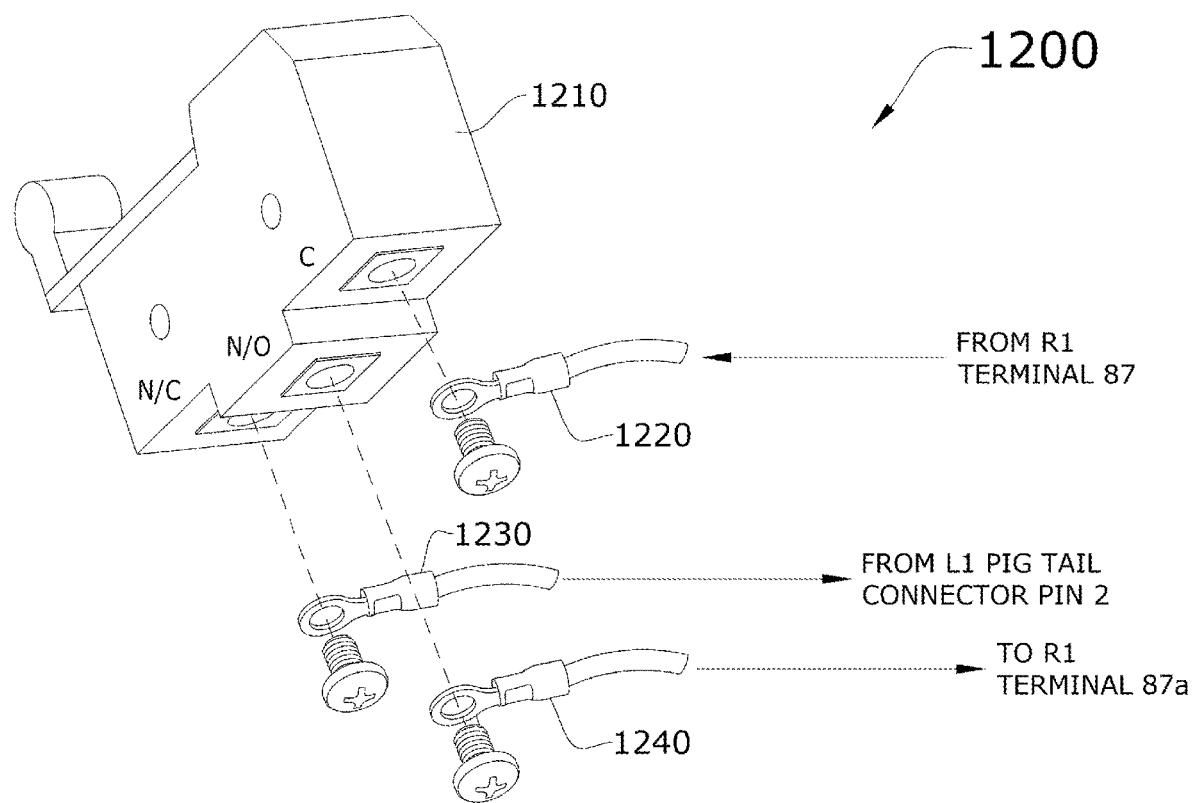
FIG. 12 conceptually illustrates an exploded view of the S1 microswitch of the R44 Raven I and Cadet starter interrupt in some embodiments.

By way of example, FIG. 12 conceptually illustrates an exploded view 1200 of a microswitch (S1) 1210 of the R44 Raven I and Cadet starter interrupt. As shown in this figure, the microswitch (S1) 1210 includes an internal lock ring terminal common 1220, an internal lock ring terminal N/C 1230, and an internal lock ring terminal N/O 1240. Signal from the N/O 87 terminal of the first relay (R1) 910 is received at the microswitch (S1) 1210 by way of the internal lock ring terminal common 1220. Signal is also received at the microswitch (S1) 1210 by way of the internal lock ring terminal N/C 1230 from pig tail connector pin 2 of the incandescent lamp (L1) 1110. Furthermore, signal is output to the N/C 87A terminal of the first relay (R1) 910 by way of the internal lock ring terminal N/C 1240.

III. R44 Raven II Starter Interrupt Components and Circuit Wiring

In some embodiments, the on-ground helicopter engine starter interrupt system ("R44 Raven II starter interrupt" or "R44 Raven II starter interrupt circuit") is installed into existing equipment and interfaces of a Robinson R44 Raven II helicopter to prevent engine start up when the throttle of the helicopter is open. In some embodiments, the R44 Raven II starter interrupt includes an electrical position switch, a first relay, a second relay, and an indicator lamp. In some embodiments, the electrical position switch, the first relay, and the second relay are installed into and connected to the existing throttle control linkage of the R44 Raven II helicopter, which is able to detect whether the throttle of the helicopter is open or closed. Like in the R44 Raven I and Cadet helicopter, the electrical position switch installed in the R44 Raven II helicopter is positioned via a mounting bracket next to the throttle control linkage so as to detect when the throttle is open and when it is closed, and thereby adjust its position to one of a throttle open position that corresponds to a normally closed (N/C) position and a throttle closed position that corresponds to a normally open (N/O) position. In some embodiments, the first relay is connected in series to an existing rotor brake switch and engine starter signal wire and, when energized (N/C position), provides an engine starter signal to the electrical position switch when the clutch of the R44 Raven II is disengaged. The electrical position switch, in turn, interrupts the engine starter signal and lights the indicator lamp when the throttle is detected open (throttle open position) or, when the throttle is detected closed (throttle closed position), passes the engine starter signal back to the first relay which then sends the engine starter signal to a collective push button starter spliced switch to start the helicopter. In some embodiments, the second relay is used to isolate the R44 Raven II starter interrupt circuit after a normal engine start.

Figure 13:
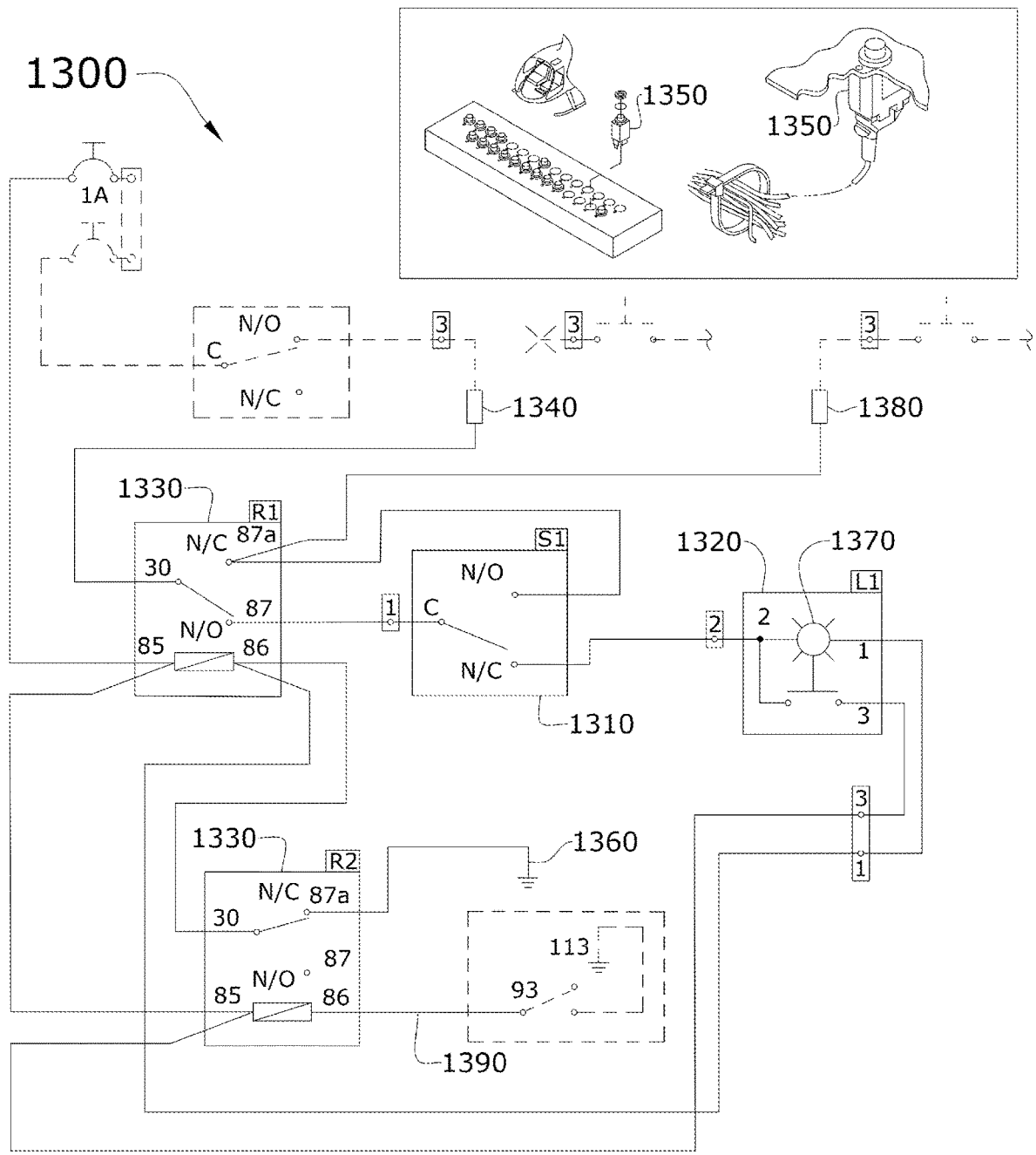
FIG. 13 conceptually illustrates a wiring diagram of an R44 Raven II starter interrupt in some embodiments.

By way of example, FIG. 13 conceptually illustrates a wiring diagram of an R44 Raven II starter interrupt 1300. As shown in this figure, the R44 Raven II starter interrupt 1300 includes several components that are symbolically shown in the wiring diagram. Specifically, the R44 Raven II starter interrupt 1300 includes a switch 1310; a lamp 1320 with a bulb 1370; relays (R1 and R2) 1330; a 16-20 gauge environmental splice 1340 rated for aircraft; a circuit breaker 1350; a ground wire 1360; a collective push button starter splice 1380, and a clutch switch connection 1390. In some embodiments, the switch 1310 is an electrical position microswitch (S1) 1310 with adjustment. In some embodiments, the lamp 1320 is a non-dimming incandescent amber lamp (L1) 1320 configured with PTT and includes three pins ("pin 1," "pin 2," and "pin 3"). In some embodiments, the bulb 1370 is a 28V bulb that is used in pilot lights of new helicopters with 24-28V systems, such as a Robinson R44 Raven II. In some embodiments, the bulb 1370 is encapsulated within the PTT, which is configured as such to allow a pilot or other user to press the lamp 1320 PTT to test whether the bulb is working. In some embodiments, the circuit breaker 1350 is a 1 Amp circuit breaker 1350 ("1 A circuit breaker 1350").

The R44 Raven II starter interrupt 1300 is installed into existing wiring equipment (such as an existing rotor brake switch that is connected to the circuit breaker of the helicopter) and interfaces of a Robinson R44 Raven II helicopter (i.e., see Robinson R44 Maintenance Manual electrical wiring diagrams FIG. 14.17 through 14.19D, pages 14.17 through 14.18A, for the 28V aircraft configuration). As such, the R44 Raven II starter interrupt 1300 interfaces with the existing equipment, including the rotor brake switch which provides the rotor brake signal to the R44 Raven II starter interrupt 1300 circuit as installed. To differentiate between the R44 Raven II starter interrupt 1300 components/wiring and the existing equipment/wiring shown in this figure, the existing wiring equipment and interfaces are shown in dashed lines, while the components and wiring of the R44 Raven II starter interrupt 1300 are illustrated in solid lines. Also, contacts in the R44 Raven II starter interrupt 1300 demonstrate a "throttle open" configuration, which, when detected at the electrical position microswitch (S1) 1310, interrupts the engine starter signal. In that case, the non-dimming incandescent amber lamp (L1) 1320 with PTT is lighted (at the bulb 1370 of the lamp), instead of passing the engine starter signal to the collective push button starter splice 1380 to start the helicopter.

Specifically in FIG. 13, starting at the existing battery bus, a new circuit breaker (the 1 A circuit breaker 1350 shown in boxed outline with an exemplary circuit breaker panel for the helicopter and also symbolically shown within the wiring diagram as "1 A" corresponding to circuit breaker symbol). As shown within the box, the 1 A circuit breaker 1350 is installed in a spare unmarked location of the circuit breaker panel, which is located in front of the copilot seat of the Robinson R44 Raven II.

In some embodiments, the relays 1330 installed in and connected to the R44 Raven II starter interrupt circuit 1300 include a first relay (R1) 1330 and a second relay (R2) 1330. In some embodiments, the relays 1330 are 24V DC SPDT relays. By way of example, FIG. 14 conceptually illustrates a bottom view of an exemplary relay 1400. The relay 1400 shown in this figure is an SPDT relay, like the first relay (R1) 1330 and the second relay (R2) 1330 included in the R44 Raven II starter interrupt 1300 powered at 28V. As shown, the relay 1400 includes a plurality of connector terminals comprising a common 30 terminal, a coil (+) 85 terminal, a coil (−) 86 terminal, a normally open (N/O) 87 terminal, and a normally closed (N/C) 87A terminal. Turning back to FIG. 13, the first relay (R1) 1330 is spliced into existing starter wire via the environmental splice 1340 after removing an existing ring terminal connection wire at an existing starter switch and installing the environmental splice 1340 at one end to existing wire that connects to an existing starter switch terminal and at the opposing end to 22-gauge wire to the first relay (R1) 1330.

Figure 15:
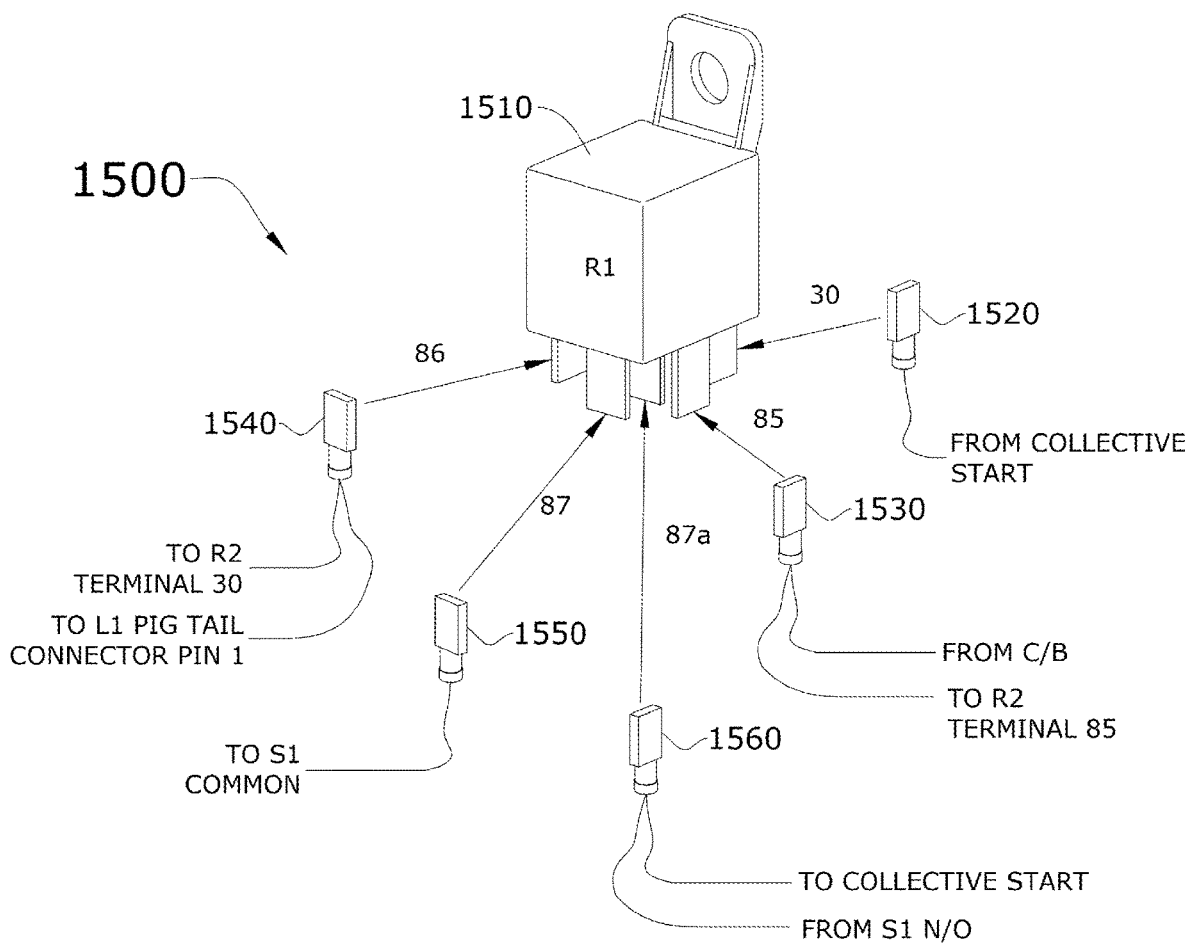
FIG. 15 conceptually illustrates an exploded view of an R1 relay connection of the R44 Raven II starter interrupt in some embodiments.
Figure 16:
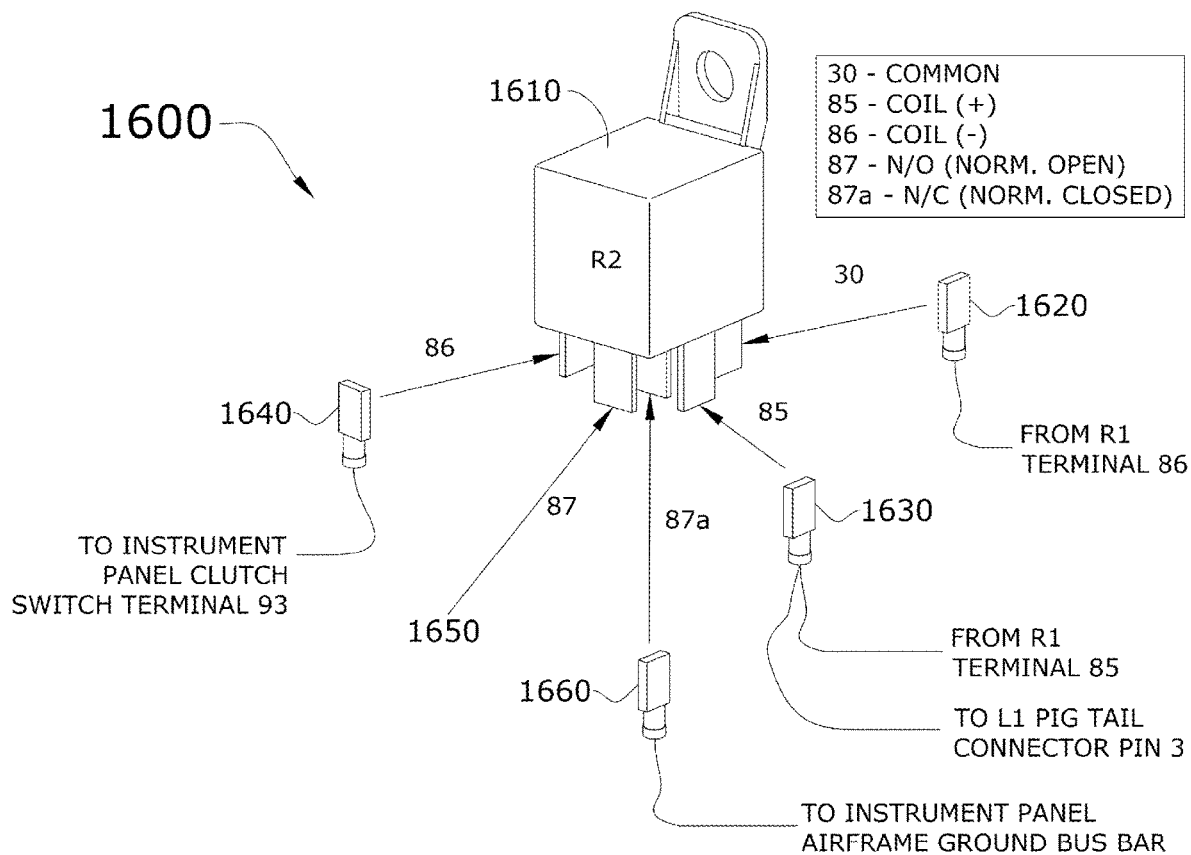
FIG. 16 conceptually illustrates an exploded view of an R2 relay connection of the R44 Raven II starter interrupt in some embodiments.

Also, each relay (R1 and R2) 1330 is connected to the R44 Raven II starter interrupt 1300 circuit by spade terminals, which are demonstrated in FIGS. 15 and 16. Turning first to FIG. 15, which conceptually illustrates an exploded perspective view 1500 of a relay (R1) 1510 and a plurality of spade terminals 1520-1560. As shown in this figure, the relay (R1) 1510 includes the five bottom connector terminals, namely, the common 30 terminal, the coil (+) 85 terminal, the coil (−) 86 terminal, the N/O 87 terminal, and the N/C 87A terminal, which allow the relay (R1) 1510 to be connected to the R44 Raven II starter interrupt 1300 circuit. Specifically, spade terminal 1520 connects to the common 30 terminal of the relay (R1) 1510 and includes pigtail connection from the collective start by way of the environmental splice 1340 and newly added 22-gauge wire, spade terminal 1530 connects to the coil (+) 85 terminal of the relay (R1) 1510 and includes pigtail connections from the newly added 1 A circuit breaker 1350 of the circuit breaker and to the coil (+) 85 terminal of the second relay (R2) 1330, spade terminal 1540 connects to the coil (−) 86 terminal of the relay (R1) 1510 and includes pigtail connections to the common 30 terminal of the second relay (R2) 1330 and to pig tail connector pin 1 of the lamp (L1) 1320 with PTT, spade terminal 1550 connects to the N/O 87 terminal of the relay (R1) 1510 and includes pigtail connection to a common terminal of the electrical position microswitch (S1) 1310, and spade terminal 1560 connects to the N/C 87A terminal of the relay (R1) 1510 and includes pigtail connections to the collective push button starter splice 1380 terminal that is re-connected via connection wire to push button starter switch that was modified to add environmental splice 1340 and from an N/O 87 terminal of the electrical position microswitch (S1) 1310 with adjustment.

Now turning to another example of a relay used in the R44 Raven II starter interrupt 1300 circuit, FIG. 16 conceptually illustrates an exploded perspective view 1600 of a relay (R2) 1610 and a plurality of spade terminals 1620-1660. As shown in this figure, the relay (R2) 1610 includes the five bottom connector terminals, namely, the common 30 terminal, the coil (+) 85 terminal, the coil (−) 86 terminal, the N/O 87 terminal, and the N/C 87A terminal, which allow the relay (R2) 1610 to be connected to the R44 Raven II starter interrupt 1300 circuit. Specifically, spade terminal 1620 connects to the common 30 terminal of the relay (R2) 1610 and includes pigtail connection from the coil (−) 86 terminal 1540 of the relay (R1) 1510, spade terminal 1630 connects to the coil (+) 85 terminal of the relay (R2) 1610 and includes pigtail connections from the coil (+) 85 terminal 1530 of the relay (R1) 1510 and to pig tail connector pin 3 of the lamp (L1) 1320 with PTT, spade terminal 1640 connects to the coil (−) 86 terminal of the relay (R2) 1610 and includes a pigtail connection to an existing instrument panel clutch switch terminal 93 (via clutch switch connection 1390), spade terminal 1650 connects to the N/O 87 terminal of the relay (R2) 1610 with no connection out, and spade terminal 1660 connects to the N/C 87A terminal of the relay (R2) 1610 and includes a pigtail connection to the existing instrument panel airframe ground bus bar (via ground wire 1360).

Figure 17:
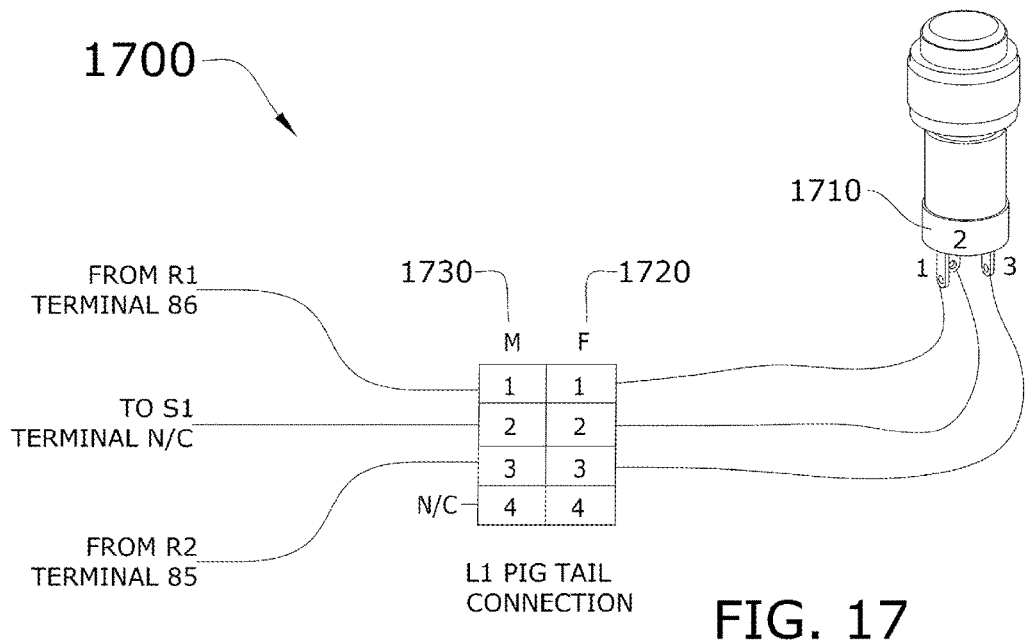
FIG. 17 conceptually illustrates a schematic view of the L1 incandescent lamp pigtail connection of the R44 Raven II starter interrupt in some embodiments.

By way of example, FIG. 17 conceptually illustrates a schematic view 1700 of the pigtail connections of the incandescent lamp (L1) of the R44 Raven I and Cadet starter interrupt. As shown in this figure, a Molex 4pin female connector 1720 and a Molex 4pin male connector 1730 map pig tail connections with respect to the incandescent lamp (L1) 1710 via three pins ("pin 1," "pin 2," and "pin 3"). In this way, the first relay (R1) 1510 connects from the coil (−) 86 terminal to pin 1 of the incandescent lamp (L1) 1710 via pin 1 of the Molex 4pin female connector 1720 and the Molex 4pin male connector 1730 and the second relay (R2) 1610 connects from the coil (+) 85 terminal to pin 3 of the incandescent lamp (L1) 1710 via pin 3 of the Molex 4pin female connector 1720 and the Molex 4pin male connector 1730. Also, signal is sent from the incandescent lamp (L1) 1710 through pin 2 and via pin 2 of the Molex 4pin female connector 1720 and the Molex 4pin male connector 1730 to terminal N/C of the electrical position microswitch (S1) 1310. The electrical position microswitch (S1) 1310 with adjustment is described in further detail, next.

Figure 18:
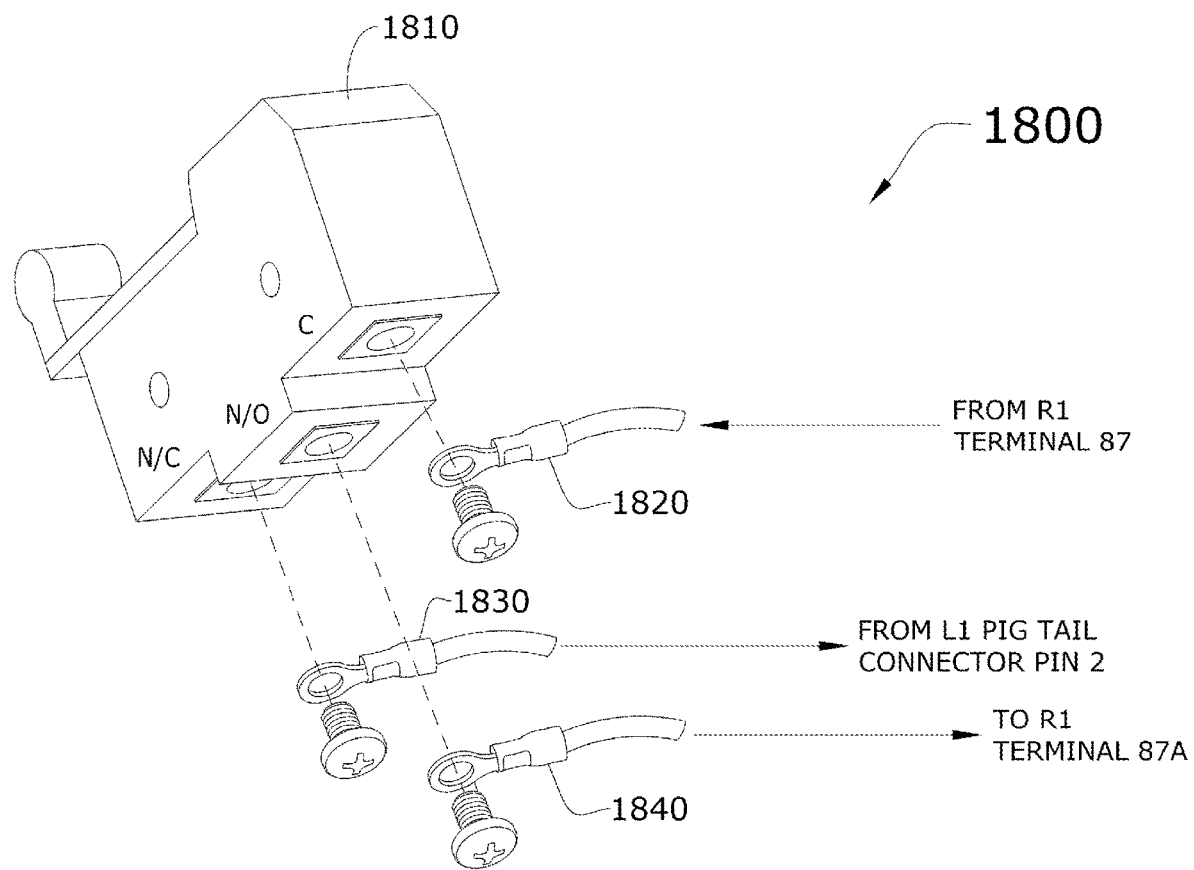
FIG. 18 conceptually illustrates an exploded view of the S1 microswitch of the R44 Raven II starter interrupt in some embodiments.

By way of example, FIG. 18 conceptually illustrates an exploded view 1800 of an electrical position microswitch (S1) 1810 of the R44 Raven II starter interrupt. As shown in this figure, the electrical position microswitch (S1) 1810 includes an internal lock ring terminal common 1820, an internal lock ring terminal N/C 1830, and an internal lock ring terminal N/O 1840. Signal from the N/O 87 terminal of the first relay (R1) 1510 is received at the electrical position microswitch (S1) 1810 by way of the internal lock ring terminal common 1820. Signal is also received at the electrical position microswitch (S1) 1810 by way of the internal lock ring terminal N/C 1830 from pig tail connector pin 2 of the incandescent lamp (L1) 1710. Furthermore, signal is output to the N/C 87A terminal of the first relay (R1) 1510 by way of the internal lock ring terminal N/C 1840.

IV. R66 Starter Interrupt Components and Circuit Wiring

In some embodiments, the on-ground helicopter engine starter interrupt system ("R66 starter interrupt" or "R66 starter interrupt circuit") is installed into existing equipment and interfaces of a Robinson R66 helicopter to prevent engine start up when either a throttle of the helicopter is open or a fuel control of the helicopter is engaged (or both) for turbine helicopters. In some embodiments, the R66 starter interrupt includes a first electrical position switch (S1), a second electrical position switch (S2), a first relay (R1), a second relay (R2), and an indicator light (L1). In some embodiments, the first electrical position switch (S1), the second electrical position switch (S2), the first relay (R1), the second relay (R2), and the indicator light (L1) are installed into and connected to the existing throttle control linkage of the R66 helicopter, which is able to detect when at least one of the throttle of the helicopter is open and the fuel control of the helicopter is engaged. In some embodiments, at least one of the first electrical position switch (S1) and the second electrical position switch (S2) is positioned via a mounting bracket next to at least one of a throttle linkage of the helicopter and a fuel control of the helicopter to detect its position as being in one of an open position and a closed position. In some embodiments, the first relay (R1) is connected in series to an existing rotor brake switch and engine starter signal wire and provides an engine starter signal to the first electrical position switch (S1). In some embodiments, the second relay (R2) is used to isolate the starter interrupt circuit after a normal engine start. In some embodiments, the engine starter signal is interrupted when the throttle or the fuel control is in the open position, as detected by either the first electrical position switch (S1) or the second electrical position switch (S2), and the indicator lamp (L1) is lighted to indicate that the throttle or the fuel control is in the open position. On the other hand, the engine starter signal is supplied to the engine starter switch for engagement when the throttle of the helicopter and the fuel control of the helicopter are in the closed position.

Figure 19:
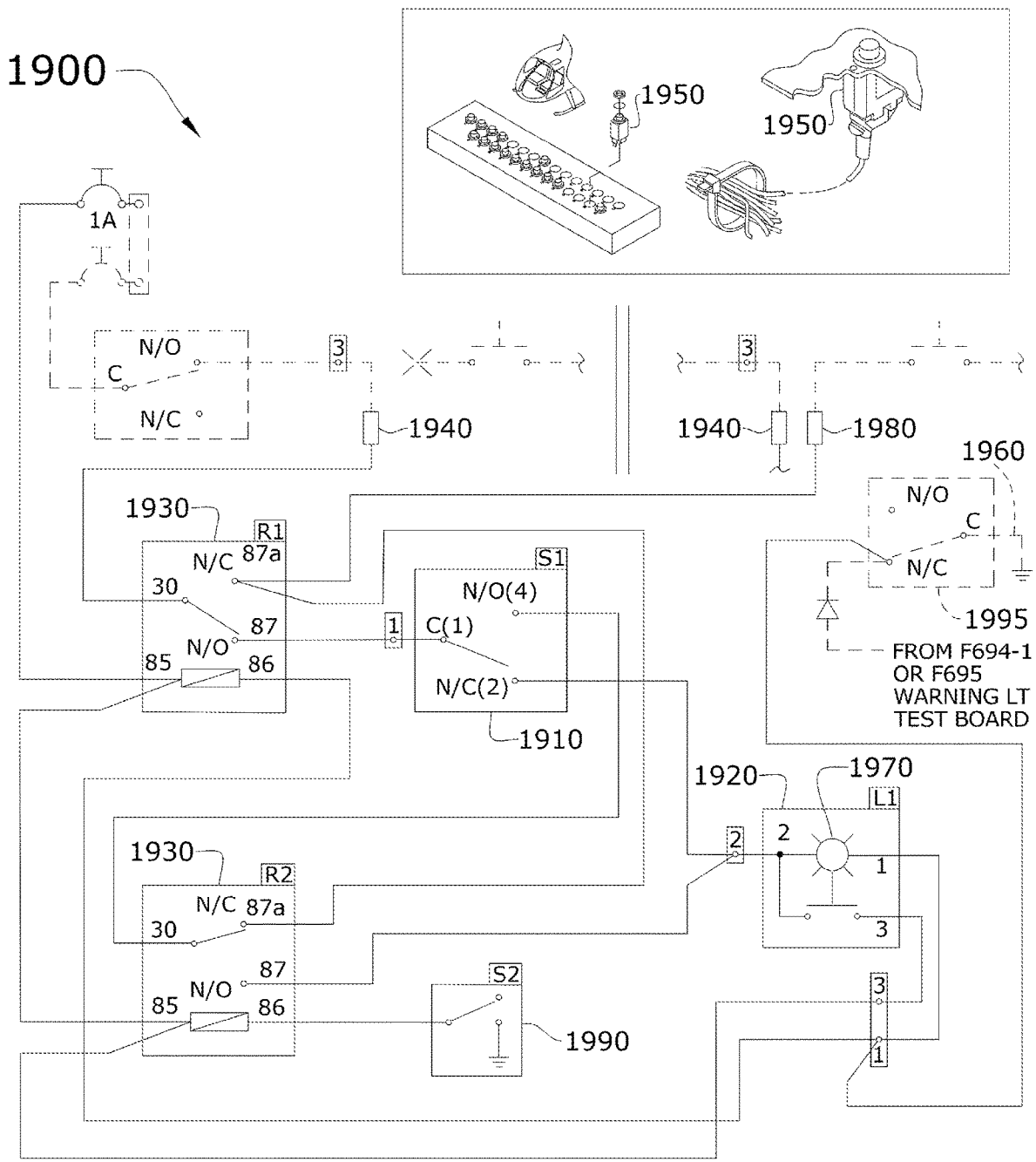
FIG. 19 conceptually illustrates a wiring diagram of an R66 starter interrupt in some embodiments.

By way of example, FIG. 19 conceptually illustrates a wiring diagram of an R66 starter interrupt 1900. As shown in this figure, the R66 starter interrupt 1900 includes several components that are symbolically shown in the wiring diagram. Specifically, the R66 starter interrupt 1900 includes a first switch (S1) 1910; a lamp (L1) 1920 with PTT and a bulb 1970; first and second relays (R1 and R2) 1930; splices 1940 installed to connect to existing linkage control wiring of the R66 helicopter; a circuit breaker 1950; a ground wire 1960; a collective starter splice 1980, and a second switch (S2) 1990. The R66 starter interrupt 1900 is installed into existing wiring equipment (such as an existing rotor brake switch that is connected to the circuit breaker of the helicopter) and interfaces of a Robinson R66 helicopter. As such, the R66 starter interrupt 1900 interfaces with the existing equipment, including the rotor brake switch which provides the rotor brake signal to the R66 starter interrupt 1900 circuit as installed. To differentiate between the R66 starter interrupt 1900 components/wiring and the existing equipment/wiring shown in this figure, the existing wiring equipment and interfaces of the R66 helicopter are shown in dashed lines, while the components and wiring of the R66 starter interrupt 1900 are illustrated in solid lines. Again, the contacts demonstrate a "throttle open" configuration, which interrupts the engine starter signal and illuminates the lamp (L1) 1920 with PTT. Also, as shown within the box, the 1 A circuit breaker 1950 is installed in a spare unmarked location of the circuit breaker panel, which is located in front of the copilot seat of the Robinson R66 helicopter.

While the first switch (S1) 1910 and the lamp (L1) 1920 behavior similar to those corresponding components noted above in connection with FIGS. 1, 7, and 13, the difference with the R66 starter interrupt 1900 is the inclusion of the second switch (S2) 1990 and operation in relation to an MGBP pressure switch 1995 of the existing components of the R66 helicopter. Specifically, the second switch (S2) 1990, by way of a second switch (S2) fuel control unit (FCU) switch, confers the added ability to detect when the FCU of the helicopter is engaged, and relays the signal via the second relay (R2) 1930. Like before, the first switch (S1) 1910 sets the position to N/C when the throttle is detected open and N/O when the throttle is detected as closed. However, the first relay (R1) 1930 is energized when the existing MGBP pressure switch 1995 is detected to be low or off (since the MGBP pressure switch 1995 is closed and remains closed until pressure rises and re-positions to N/O), thereby providing a different mechanism to provide the signal to the first switch (S1) 1910.

Figure 20:
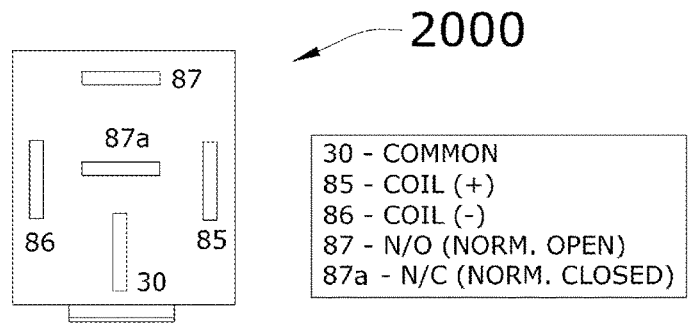
FIG. 20 conceptually illustrates a bottom view of a relay included in the R66 starter interrupt in some embodiments.
Figure 21:
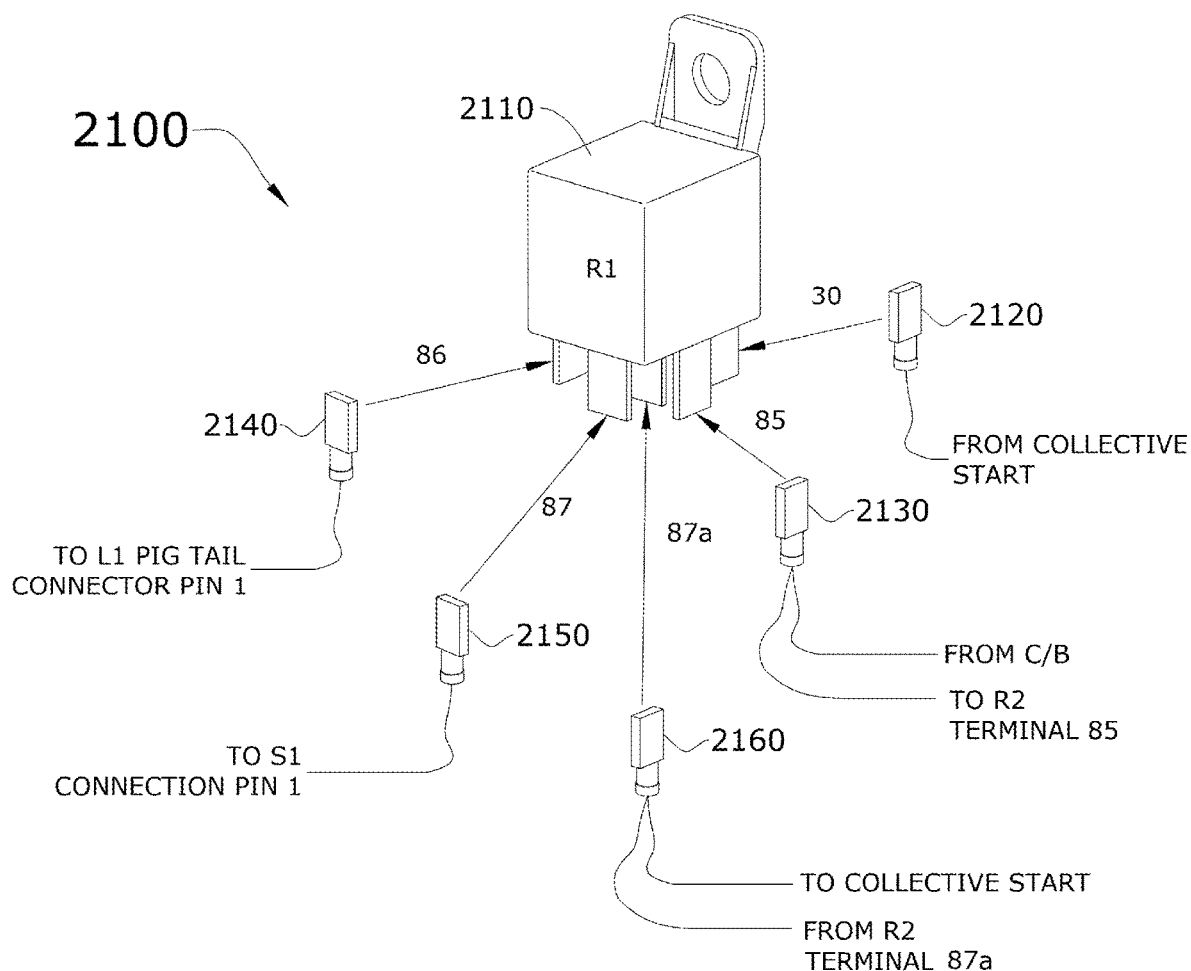
FIG. 21 conceptually illustrates an exploded view of an R1 relay connection of the R66 starter interrupt in some embodiments.

In some embodiments, the first and second relays (R1 and R2) 1930 are 24V DC SPDT relays. By way of example, FIG. 20 conceptually illustrates a bottom view of an SPDT relay 2000 which includes a common 30 terminal, a coil (+) 85 terminal, a coil (−) 86 terminal, a normally open (N/O) 87 terminal, and a normally closed (N/C) 87A terminal. Now turning to FIG. 21, which conceptually illustrates an exploded perspective view 2100 of a relay (R1) 2110 and a plurality of spade terminals 2120-2160 for five bottom connector terminals. Specifically, spade terminal 2120 connects to the common 30 terminal and includes pigtail connection from the collective start, spade terminal 2130 connects to the coil (+) 85 terminal and includes pigtail connections from the 1 A circuit breaker 1950 and to the coil (+) 85 terminal of the second relay (R2) 1930, spade terminal 2140 connects to the coil (−) 86 terminal and includes pigtail connection to pig tail connector pin 1 of the lamp (L1) 1920 with PTT, spade terminal 2150 connects to connection pin 1 of the first switch (S1) 1910, and spade terminal 2160 connects to the N/C 87A terminal and includes pigtail connections to the collective start and from an N/C 87A terminal of the second relay (R2) 1930.

Figure 22:
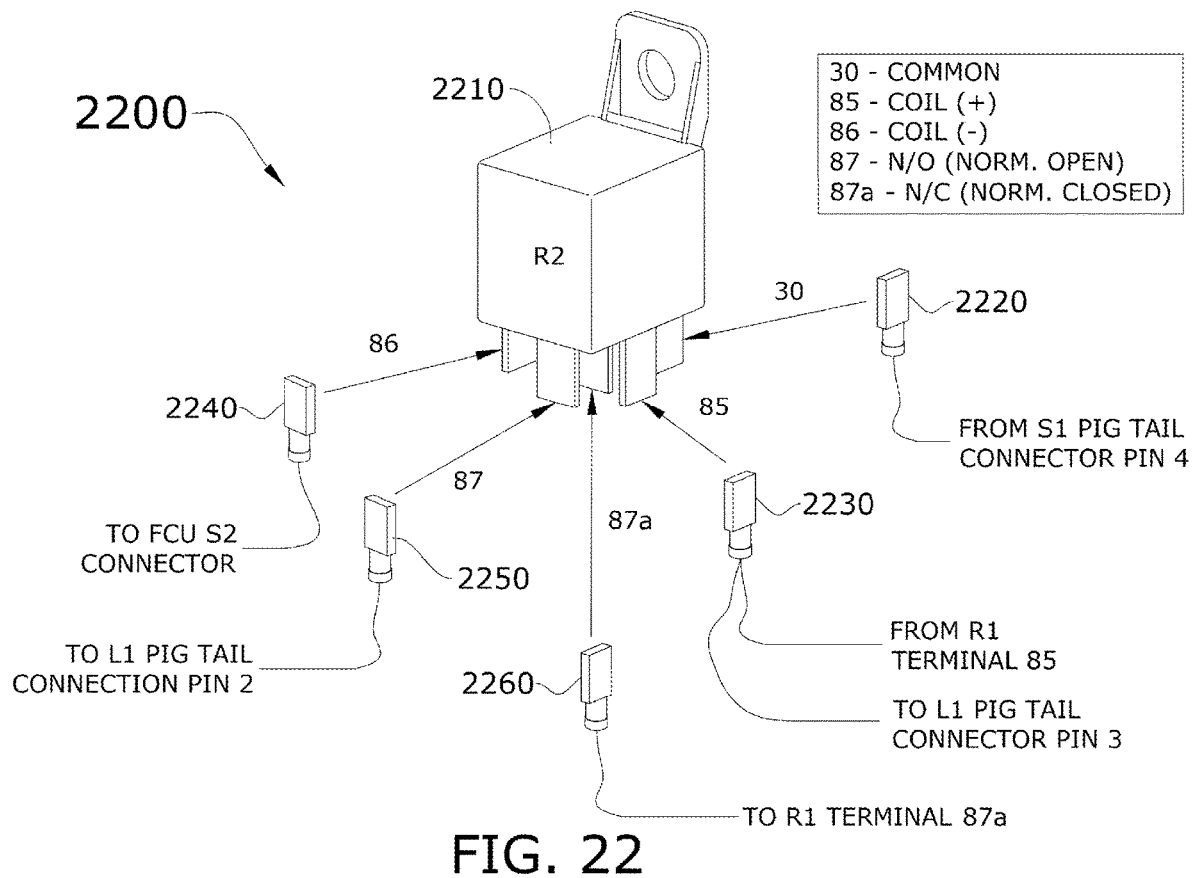
FIG. 22 conceptually illustrates an exploded view of an R2 relay connection of the R66 starter interrupt in some embodiments.

Now turning to FIG. 22, which conceptually illustrates an exploded perspective view 2200 of a relay (R2) 2210 and a plurality of spade terminals 2220-2260 (five bottom connector terminals). Specifically, spade terminal 2220 connects to the common 30 terminal and includes pigtail connection from the first switch (S1) connector pin 4, spade terminal 2230 connects to the coil (+) 85 terminal and includes pigtail connections from the first relay (R1) 2110 coil (+) 85 terminal and to pig tail connector pin 3 of the lamp (L1) 1920 with PTT, spade terminal 2240 connects to the coil (−) 86 terminal and includes pigtail connection to a connector of the second switch (S2) 1990 which sets position according to detected engagement of the FCU of the helicopter, spade terminal 2250 connects N/O 87 terminal of the second relay (R2) 2210 and to pig tail connector pin 2 of the lamp (L1) 1920 with PTT, and spade terminal 2260 connects to the N/C 87A terminal and includes pigtail connection to the N/C 87A terminal of the first relay (R1) 2110.

Figure 23:
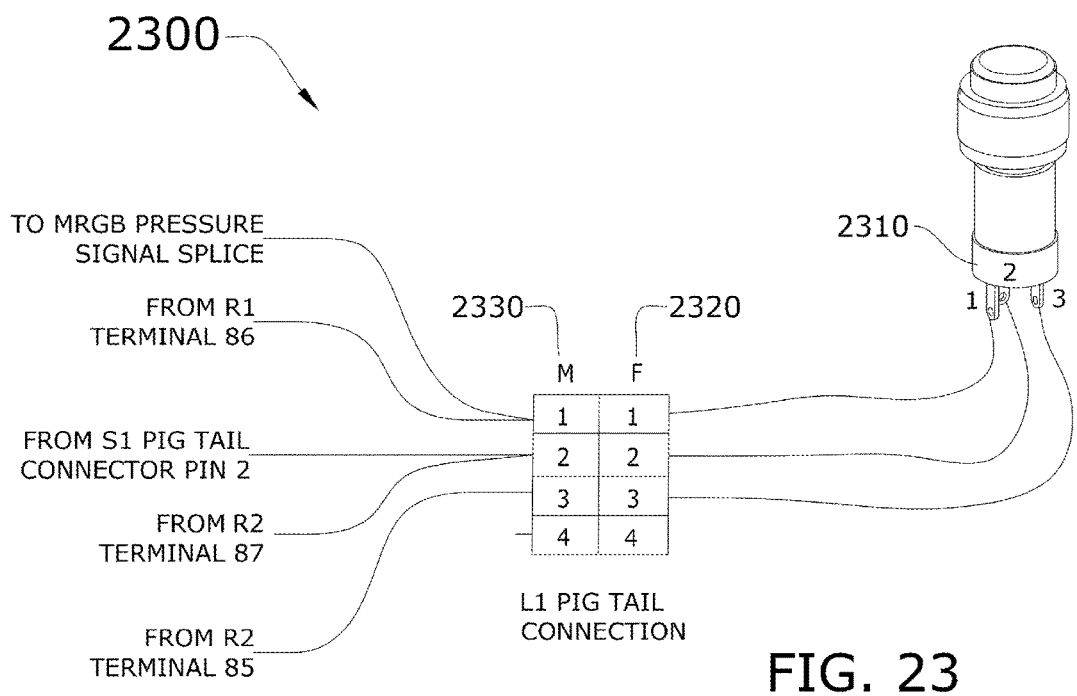
FIG. 23 conceptually illustrates a schematic view of the L1 incandescent lamp pigtail connection of the R66 starter interrupt in some embodiments.

By way of example, FIG. 23 conceptually illustrates a schematic view 2300 of the pigtail connections of the incandescent lamp (L1) 2310 of the R66 starter interrupt. As shown in this figure, a Molex 4pin female connector 2320 and a Molex 4pin male connector 2330 map pig tail connections with respect to the incandescent lamp (L1) 2310 via three pins ("pin 1," "pin 2," and "pin 3"). In this way, the first relay (R1) 2110 connects from the coil (−) 86 terminal to pin 1 of the incandescent lamp (L1) 2310 and pin 1 of the incandescent lamp (L1) 2310 connects to the MRGB pressure switch 1995 signal splice by way of pin 1 of the Molex 4pin female connector 2320 and the Molex 4pin male connector 2330. Also, the first switch (S1) pig tail connects from the pin 2 connector to pin 2 of the incandescent lamp (L1) 2310 and the second relay (R2) connects from the N/O 87 terminal to pin 2 of the incandescent lamp (L1) 2310 by way of pin 2 of the Molex 4pin female connector 2320 and the Molex 4pin male connector 2330. Finally, the second relay (R2) connects from the coil (+) 85 terminal to pin 3 of the incandescent lamp (L1) 2310 by way of pin 3 of the Molex 4pin female connector 2320 and the Molex 4pin male connector 2330.

Figure 24:
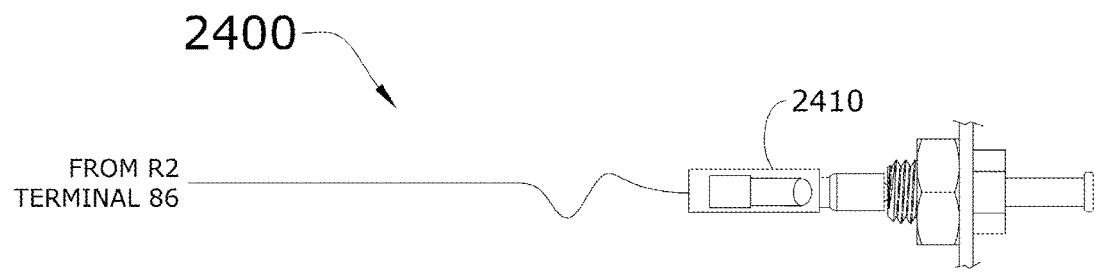
FIG. 24 conceptually illustrates a side view of the S2 fuel control unit (FCU) switch connection of the R66 starter interrupt in some embodiments.

Now an example of the second switch (S2) fuel control unit (FCU) switch connection is described. Specifically, and by way of example, FIG. 24 conceptually illustrates a side view 2400 of the S2 FCU switch connection 2410 of the R66 starter interrupt. As shown, the S2 FCU switch connection 2410 is connected to receive signal from the coil (−) 86 terminal of the second relay (S2) 1990, described above by reference to FIG. 19 and/or the relay (S2) 2210 described above by reference to FIG. 22.

Figure 25:
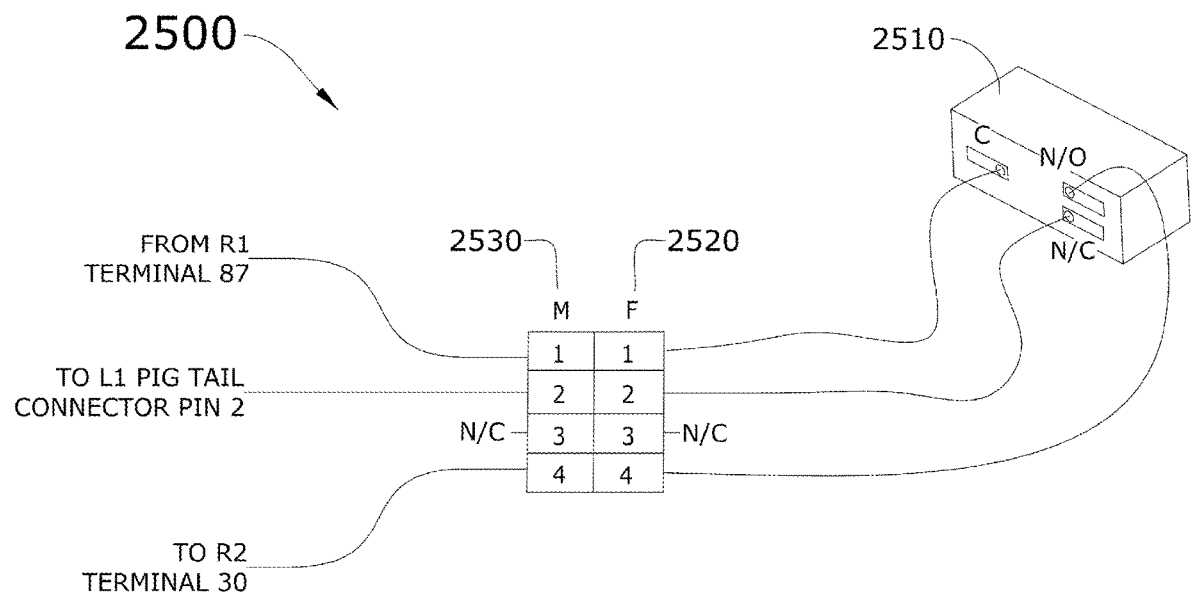
FIG. 25 conceptually illustrates schematic view of the S1 microswitch pigtail connection of the R66 starter interrupt in some embodiments.

By way of another example, FIG. 25 conceptually illustrates schematic view of a first switch (S1) 2510 pigtail connection of the R66 starter interrupt 1900, similar to the first switch (S1) 1910 described above by reference to FIG. 19. As shown in this figure, the first switch (S1) 2510 includes a Molex 4pin female connector 2520 and a Molex 4pin male connector 2530, whereby signal from the N/O 87 terminal of the first relay (R1) 2110 is received at a terminal C (pin 1) of the first switch (S1) 2510. Signal is also sent out through terminal N/C (pin 2) of the first switch (S1) 2510 to pin 2 of the incandescent lamp (L1) 2310 and out through terminal N/O (pin 4) of the first switch (S1) 2510 to common 30 terminal of the second relay (R2) 2210.

The next several sections describe installation and deployment of particular on-ground helicopter engine starter interrupt systems (for reciprocating and turbine helicopters, such as, specifically, Robinson R22, R44, and R66 model helicopters).

V. R22 Starter Interrupt Installation and Deployment

Figure 26:
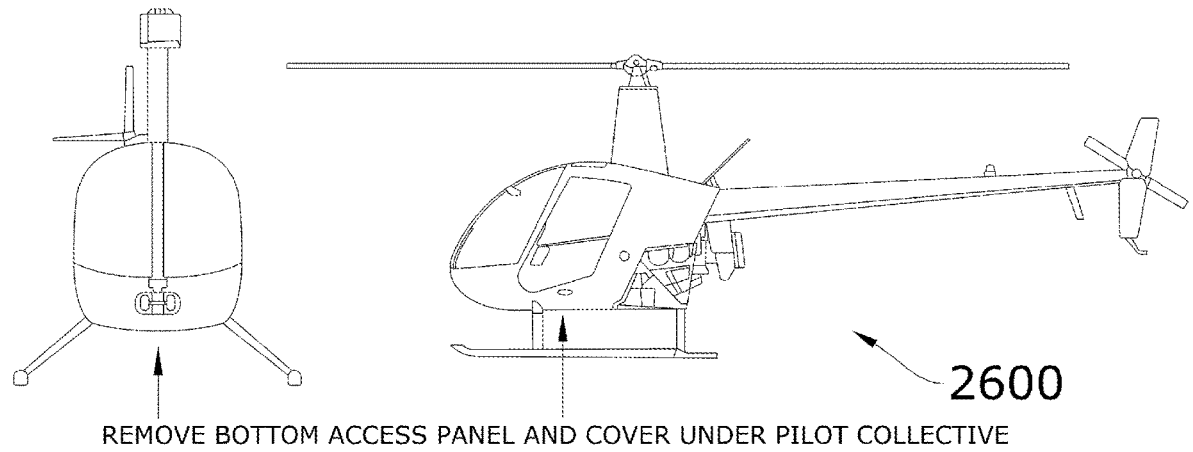
FIG. 26 conceptually illustrates a schematic view of a Robinson R22 model helicopter indicating a location from which to remove a bottom access panel and cover under the pilot collective for installation of the R22 starter interrupt.

By way of example, FIG. 26 conceptually illustrates a schematic view of a Robinson R22 model helicopter 2600. As shown in this figure, a location is pointed too under the belly of the Robinson R22 model helicopter 2600, which indicates the location from which to remove the bottom access panel and cover under the pilot collective for installation of the R22 starter interrupt.

Figure 27:
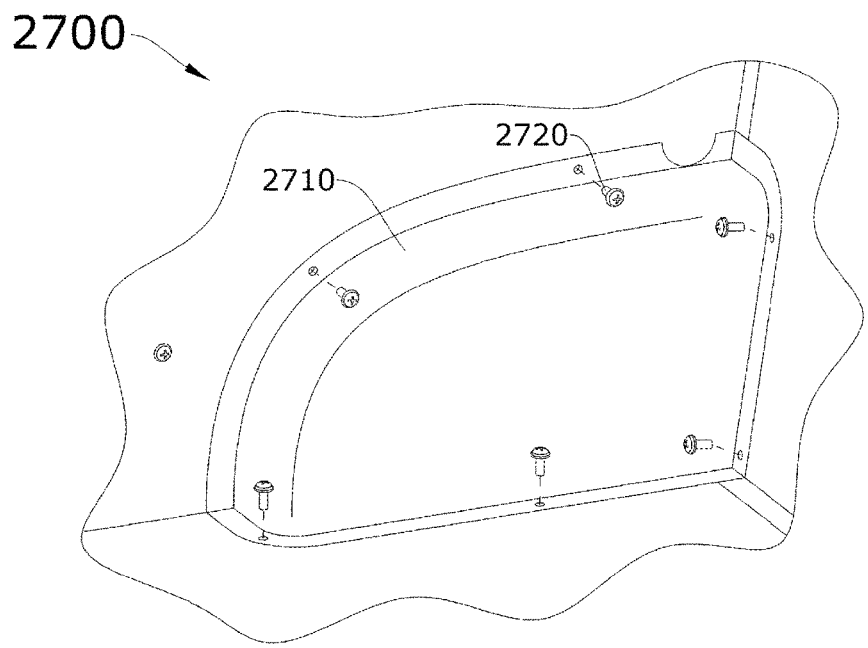
FIG. 27 conceptually illustrates a detail view of an existing linkage access panel cover of a Robinson R22 model helicopter.

Now, turning further details regarding R22 starter interrupt installation, FIG. 27 conceptually illustrates a detail view 2700 of an existing linkage access panel cover 2710 of the Robinson R22 model helicopter. As shown here, the existing linkage access panel cover 2710 is secured internally to the helicopter under the copilot seat by cover screws 2720. When the cover screws 2720 are removed, the existing linkage access panel cover 2710 can be removed. This reveals the throttle linkage control of the helicopter and installation of the R22 starter interrupt can proceed.

Figure 28:
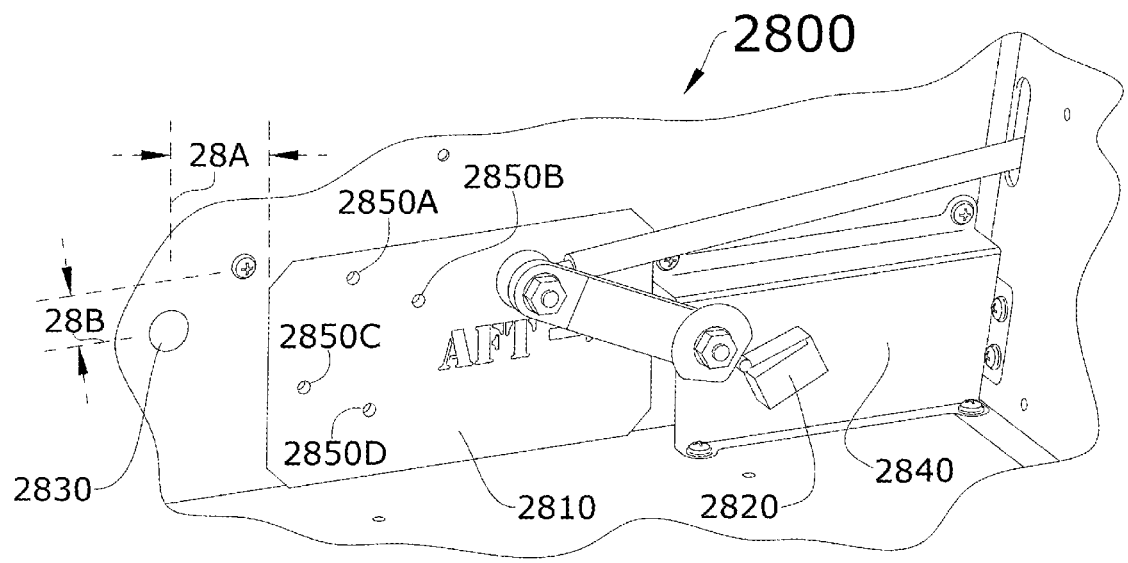
FIG. 28 conceptually illustrates a detail view of the S1 jig placement in some embodiments of the R22 starter interrupt.

Referring now to FIG. 28, a detail view of the S1 jig placement 2800 is conceptually illustrated for installation the R22 starter interrupt. Specifically, this figure shows a jig 2810, an existing microswitch 2820, a grommet 2830, and existing throttle bracket 2840. The placement and dimensions of various components may change for various model or updates to the R22 helicopter, however, for purposes of explanation, of person of ordinary skill in the art would appreciate that the existing microswitch 2820 is placed and sized according to specifications of the helicopter manufacturer, and therefore, may constrain the placement and dimensions of components installed for the R22 starter interrupt. In particular, the jig 2810 is placed flush along the compartment wall under the copilot seat and against the existing throttle bracket 2840 of the helicopter. Drill holes 2850A, 2850B, 2850C, and 2850D are made through the jig 2810 and are matched along the compartment wall from inside the tunnel between the pilot and copilot seats (which is described next, by reference to FIG. 29). The grommet 2830 is cut out of the wall with a diameter that is sufficiently large for wires to pass through. In some embodiments, the grommet 2830 cut-out is ⅜ inches in diameter. Also, the cut-out location of the grommet 2830 is shown by measured guidelines 28A and 28B. Specifically, guideline 28A measures ⅞ inches away from the end of the jig 2810 and guideline 28B measures ⅜ inches down from the top of the jig 2810. The grommet 2830 is cut-out at the intersection of the guideline 28A and guideline 28B.

Figure 29:
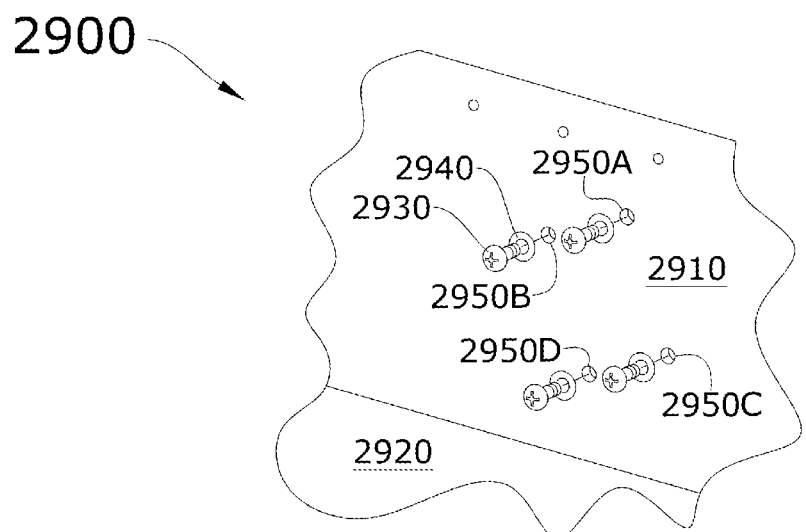
FIG. 29 conceptually illustrates a detail view of bracket mounting screw placement along a compartment wall within a linkage tunnel (accessible after removal of the bottom access panel and cover) that is below the pilot collective and between the pilot and copilot seats in some embodiments of the R22 starter interrupt.

Now viewing from another perspective, FIG. 29 conceptually illustrates a detail view of matching bracket mounting screw placement 2900 along a compartment wall 2910 within a linkage tunnel (accessible after removal of the bottom access panel and cover) that is below the pilot collective and between the pilot and copilot seats in some embodiments of the R22 starter interrupt. As shown in this figure, the matching bracket mounting screw placement 2900 occurs along the compartment wall 2910 and above the floor 2920 within the tunnel. The compartment wall 2910 is the opposing side of the wall along which the jig 2810 is flush mounted, as described above in reference to FIG. 28. Screws 2930 and washers 2940 fit through matching drill holes 2950A, 2950B, 2950C, and 2950D, which correspond in placement to drill holes 2850A, 2850B, 2850C, and 2850D, described above by reference to FIG. 28. The screws 2930 and washers 2940 are then used to secure a switch bracket to the surface of the jig 2810. A switch and switch bracket of a switch and bracket assembly are described next.

Figure 30:
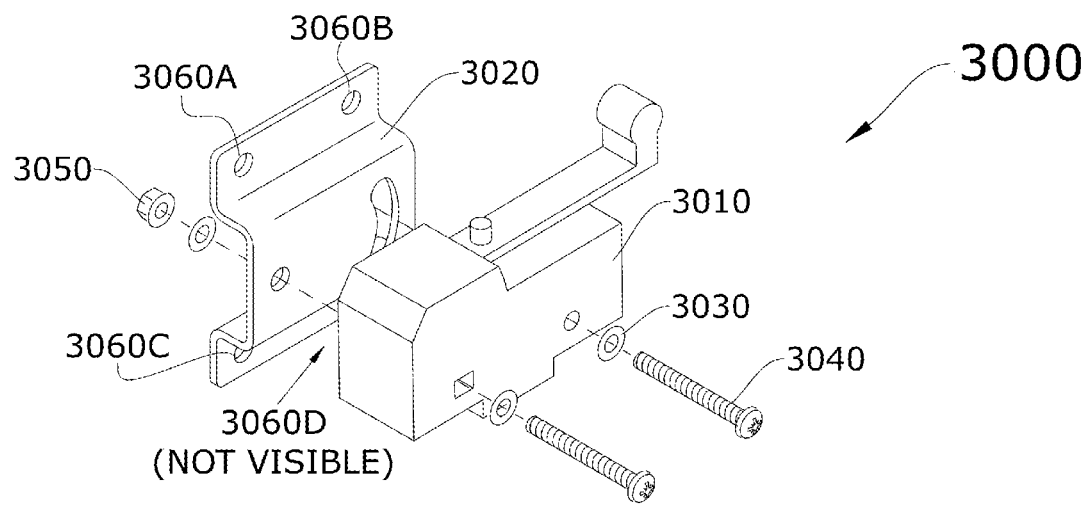
FIG. 30 conceptually illustrates a detail view of the S1 switch and bracket assembly in some embodiments of the R22 starter interrupt.
Figure 31:
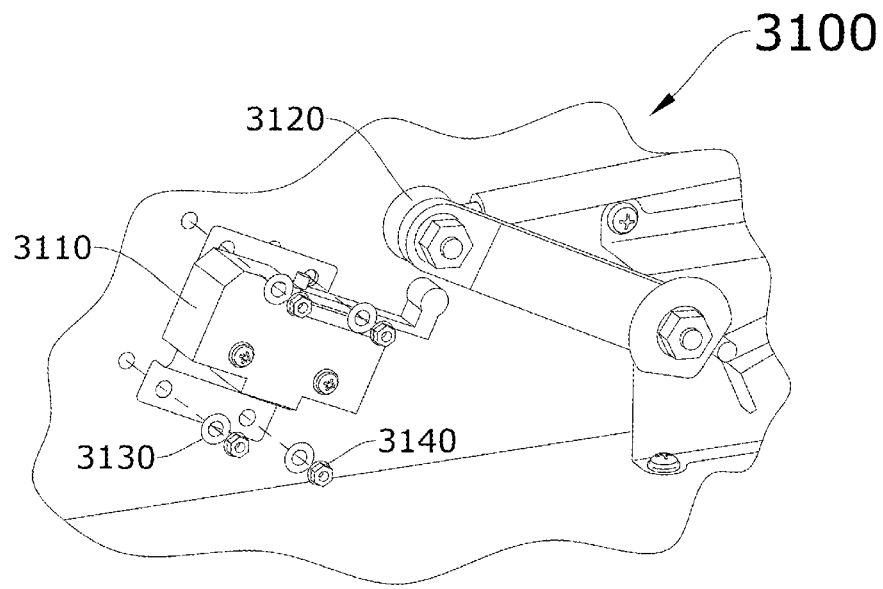
FIG. 31 conceptually illustrates a detail view of the S1 switch and bracket assembly in place in some embodiments of the R22 starter interrupt.

By way of example, FIG. 30 conceptually illustrates a detail exploded view of the S1 switch and bracket assembly 3000 in some embodiments of the R22 starter interrupt. As shown in this figure, the S1 switch and bracket assembly 3000 includes a microswitch 3010, a switch bracket 3020, washers 3030, screws 3040, and nuts 3050. The screws 3040 may be torque screws which, when connected and tightened to nuts 3050, secure the microswitch 3010 to the switch bracket 3020. In this way, the switch bracket 3020 can be mounted to the surface of the jig 2810 by nuts screwed onto screws 2930 that fit through matching drill holes 2950A, 2950B, 2950C, and 2950D and drill holes 2850A, 2850B, 2850C, and 2850D, and then with the S1 switch bracket assembly 3000 placed flush against the jig 2810, through bracket holes 3060A, 3060B, 3060C, and (although not visible in this FIG. 3060D of the switch bracket 3020. This is demonstrated in FIG. 31, which conceptually illustrates a detail view of the S1 switch and bracket assembly in place 3100 in some embodiments of the R22 starter interrupt. As shown, the S1 switch and bracket assembly is in place 3100 with microswitch 3110 positioned proximate to the collective throttle and linkage control assembly 3120 by washers 3130 and nuts 3140 fitting onto the ends of the screws 2930.

Figure 32:
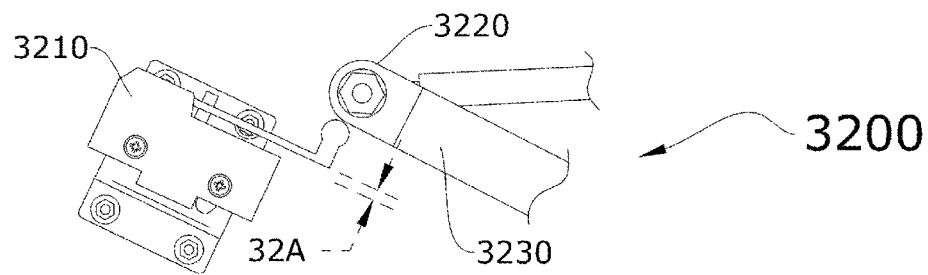
FIG. 32 conceptually illustrates a front view of the S1 switch and throttle linkage in some embodiments of the R22 starter interrupt.

From another view, after installation and placement of the S1 switch and bracket assembly 3000, FIG. 32 conceptually illustrates a front view of the S1 switch and throttle linkage 3200 in some embodiments of the R22 starter interrupt. As shown in this figure, the microswitch 3210 is placed proximate to a rod end bearing 3220 of the collective throttle and linkage assembly 3230. A gap 32A is maintained between the body and the arm of the microswitch 3210. In some embodiments, the gap 32A has a measurement in the range of 0.030 inches to 0.045 inches. In this way, the gap 32A ensures that the arm does not touch the body of the microswitch 3210 as the rod end bearing 3220 of the collective throttle and linkage assembly 3230 comes into contact with the arm of the microswitch 3210.

Figure 33:
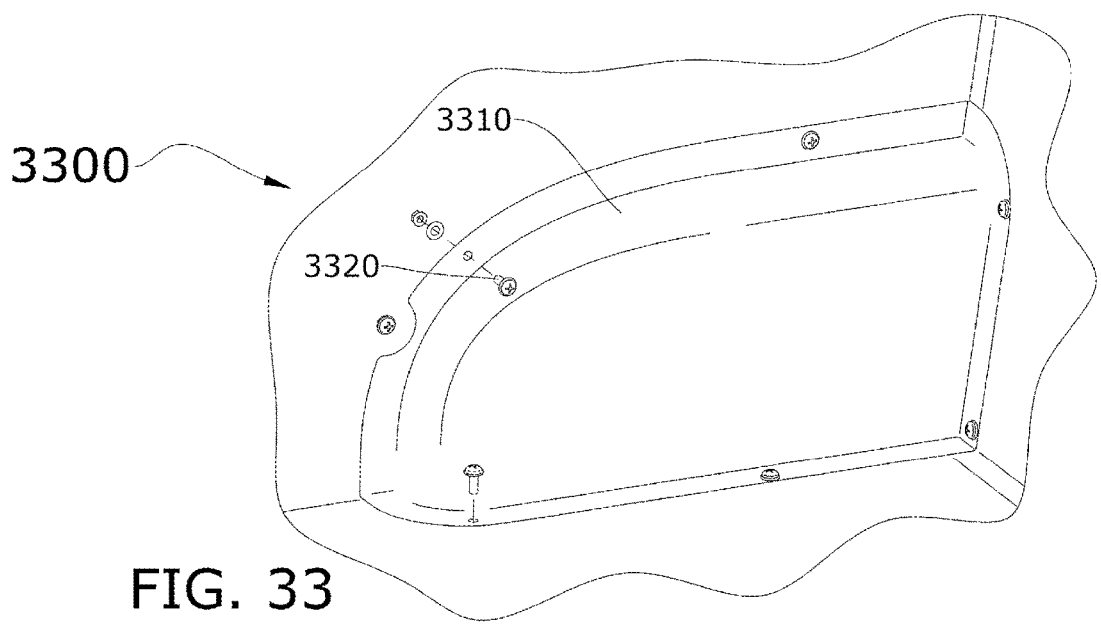
FIG. 33 conceptually illustrates a detail view of a new linkage access panel cover that replaces the existing linkage access panel cover to support the R22 starter interrupt in some embodiments.

Turning to another view of installing the R22 starter interrupt, FIG. 33 conceptually illustrates a detail view 3300 of a new linkage access panel cover 3310 for the Robinson R22 model helicopter. The new linkage access panel cover 3310 replaces the existing linkage access panel cover 2710 that is removed to install some components of the R22 starter interrupt, as described above by reference to FIG. 27. In some embodiments, the new linkage access panel cover 3310 is secured flush against the wall by cover screws 3320. The cover screws 3320 may be the screws from the existing mounting hardware from the original, existing linkage access panel cover 2710. Although the new linkage access panel cover 3310 of some embodiments is longer than the original, existing linkage access panel cover 2710, the cover screws 3320 are screwed into wall drill holes that match screw holes along the edge perimeter of the new linkage access panel cover 3310.

Figure 34:
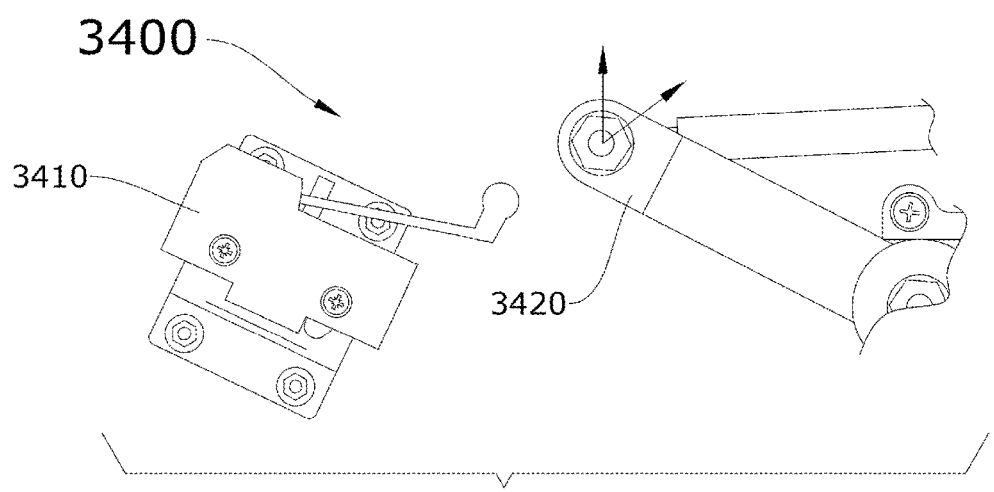
FIG. 34 conceptually illustrates a front view of a throttle kinematic logic open state of the S1 switch and throttle linkage in some embodiments of the R22 starter interrupt.

While the example in FIG. 32 demonstrated the rod end bearing 3220 of the collective throttle and linkage assembly 3230 coming into contact with the arm of the microswitch 3210, FIG. 34 conceptually illustrates a front view of a throttle kinematic logic open state of the S1 switch and throttle linkage 3400 in some embodiments of the R22 starter interrupt. As shown in this figure, the arm of the microswitch 3410 is free from contact with the rod end bearing 3220 due to the motion of the collective throttle and linkage assembly 3420 when the throttle is opened. In particular, the throttle kinematic logic open state of the S1 switch and throttle linkage 3400 is due to the direction of the collective throttle and linkage assembly 3420 moving upward and rearward, causing the rod end bearing 3220 to also move upward and backward.

Figure 35:
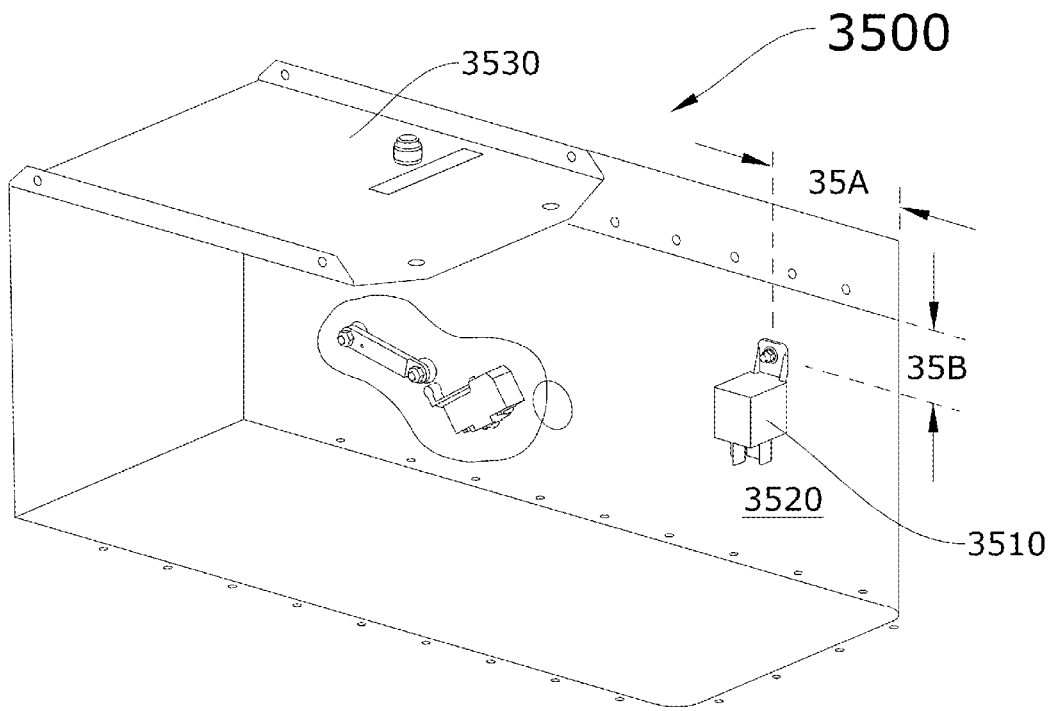
FIG. 35 conceptually illustrates a detail perspective view of the R1 relay installed along the copilot seat wall in some embodiments of the R22 starter interrupt.
Figure 36:
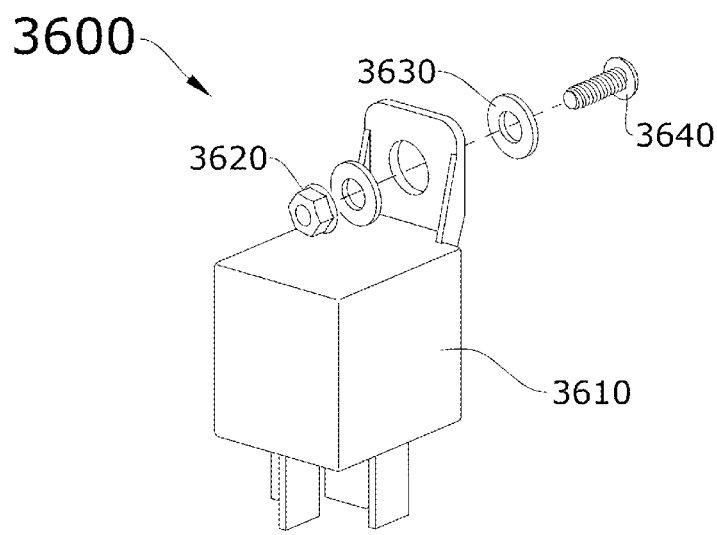
FIG. 36 conceptually illustrates an exploded view of the exemplary relay mounting in some embodiments of the R22 starter interrupt.

By reference to another example, FIG. 35 conceptually illustrates a detail perspective view 3500 of the relay (R1) installed along the copilot seat wall in some embodiments of the R22 starter interrupt. As shown in this figure, the relay (R1) 3510 is mounted along the copilot seat wall 3520. The relay (R1) 3510 can be mounted to the copilot seat wall 3520 by removal of the cover 3530. The cover 3530 is described, along with lamp (L1) and label installation, in more detail below, by reference to FIG. 37. The position at which to mount the relay (R1) 3510 is defined by gaps 35A and 35B. In some embodiments, the gap 35A is two inches and the gap 35B is half of one inch (0.5 inches). Mounting hardware for the relay (R1) 3510 is described by reference to FIG. 36, which conceptually illustrates an exploded view of the exemplary relay mounting 3600 in some embodiments of the R22 starter interrupt. As shown in this figure, the exemplary relay mounting 3600 includes a relay 3610 (such as relay (R1) 3510), a nut 3620, washers 3630, and a screw 3640. Mounting to the copilot seat wall 3520 is possible by tightening the nut 3620 to the screw 3640. Next, details of the cover and lamp installation are described in FIG. 37.

Figure 37:
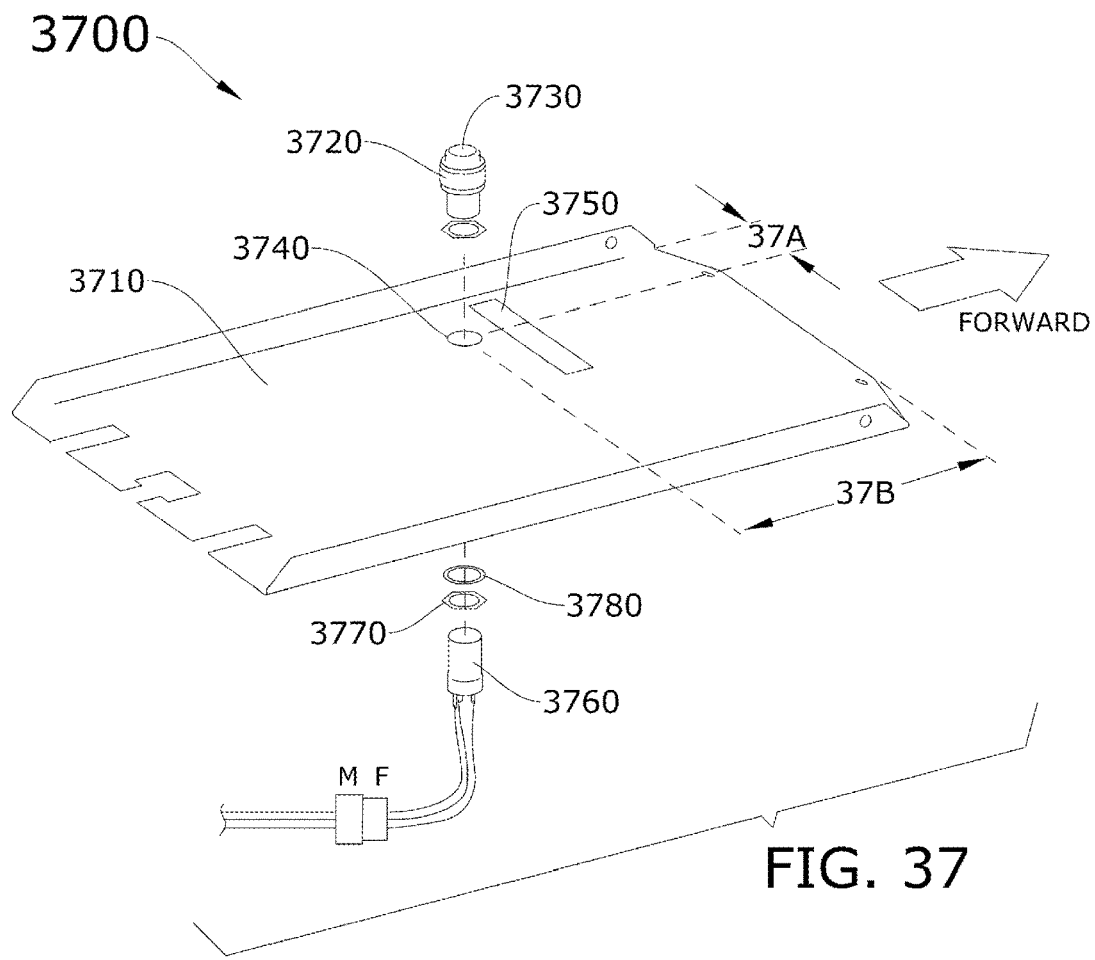
FIG. 37 conceptually illustrates a detail perspective view of the cover installation of the L1 lamp and the label in some embodiments of the R22 starter interrupt.

Specifically, FIG. 37 conceptually illustrates a detail perspective view of the cover installation of the L1 lamp and the label 3700 in some embodiments of the R22 starter interrupt. In this figure, several items are shown for cover installation of the L1 lamp and the label 3700 including the cover 3710, the L1 lamp 3720, a bulb 3730, a lamp hole 3740, a label 3750, a lamp base 3760, nuts 3770, and a washer 3780. The lamp hole 3740 is configured to be a half inch diameter cut-out hole positioned at a location of the cover 3710 defined by the intersection of gap 37A and gap 37B. As measured, gap 37A is one inch and gap 37B is six inches. The label 3750 is optional. When applied and used, the label 3750 may recite "Push to Test", "Press to Test", or, preferably, "RHSI L1 PTT", thereby providing brief information as to operation of the L1 lamp 3720, which the pilot, copilot, or other person in the helicopter may press to test the L1 lamp 3720 to ensure the bulb 3730 (encapsulated within the L1 lamp 3720) is working (lights up). Under the cover 3710 is the lamp base 3760 with pig tail connections (pins 1, 2, and 3) connecting to a Molex 4pin female connector and a Molex 4pin male connector, such as the Molex 4pin female connector 2320 and the Molex 4pin male connector 2330 described above, by reference to FIG. 23. One of the nuts 3770 and the washer 3780 secure the connection between the lamp base 3760 and the L1 lamp 3720 between the lamp hole 3740. The other nut 3770 is installed above the cover 3710 in connection with the lamp 3720.

Figure 38:
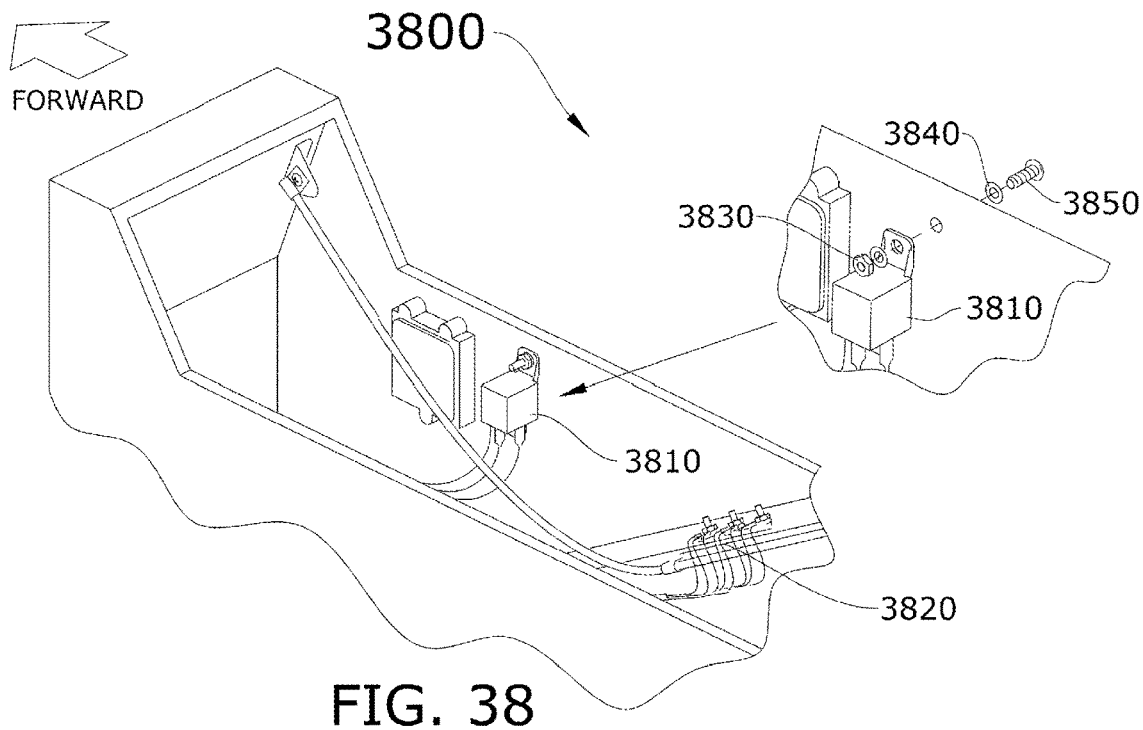
FIG. 38 conceptually illustrates a detail perspective view of the instrument panel tilted forward for access to the R2 relay in some embodiments of the R22 starter interrupt.

Turning to another view, FIG. 38 conceptually illustrates a detail perspective view of the instrument panel tilted forward for access to the R2 relay 3800 in some embodiments of the R22 starter interrupt. As shown, this figure demonstrates placement and mounting of the R2 relay 3810 in relation to a ground bus bar 3820. A nut 3830, a washer 3840, and a screw 3850 are also shown for the mounting hardware used to mount the R2 relay 3810 as shown in the instrument panel tilted forward for access to the R2 relay 3800.

VI. R44 Starter Interrupt Installation and Deployment

Figure 39:
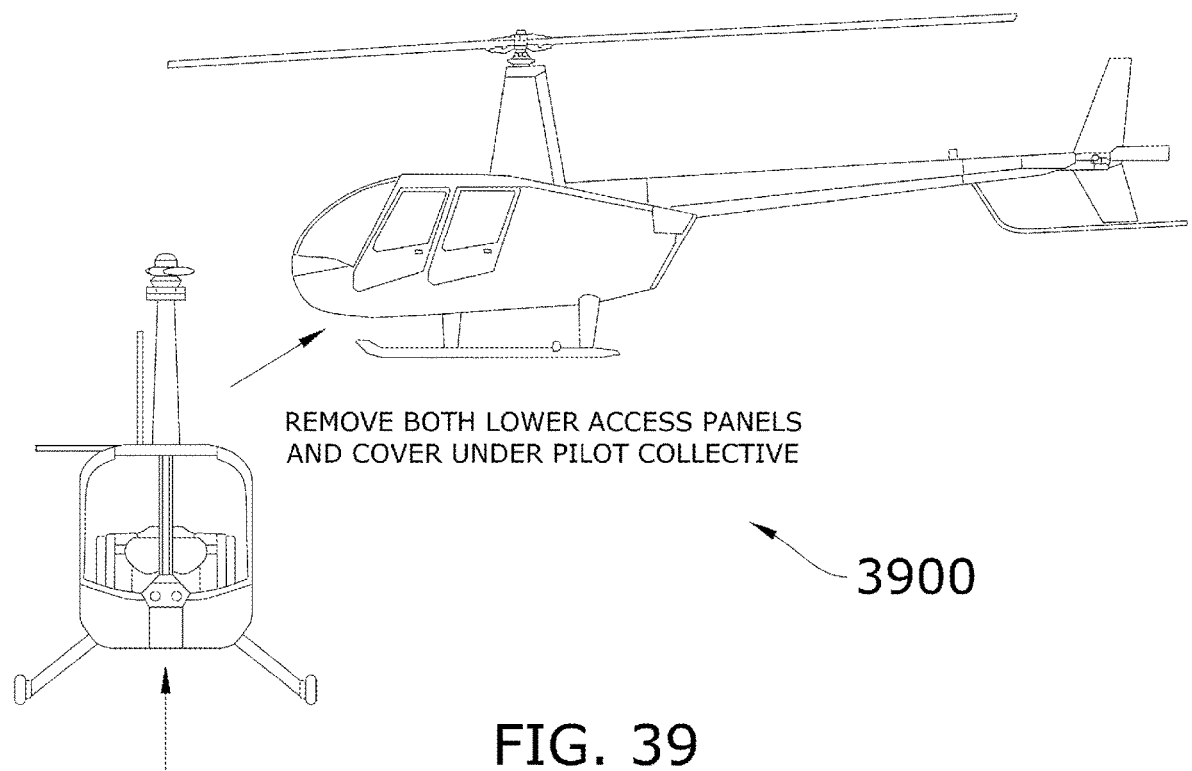
FIG. 39 conceptually illustrates a schematic view of a Robinson R44 model helicopter indicating a location from which to remove both bottom access panels and cover under the pilot collective for installation of an R44 starter interrupt.

By way of example, FIG. 39 conceptually illustrates a schematic view of a Robinson R44 model helicopter 3900. As shown in this figure, a location is pointed too under the belly of the Robinson R44 model helicopter 3900, which indicates the location from which to remove both bottom access panels and cover under the pilot collective for installation of an R44 starter interrupt, including both the R44 Raven I and Cadet starter interrupt and the R44 Raven II starter interrupt.

Figure 40:
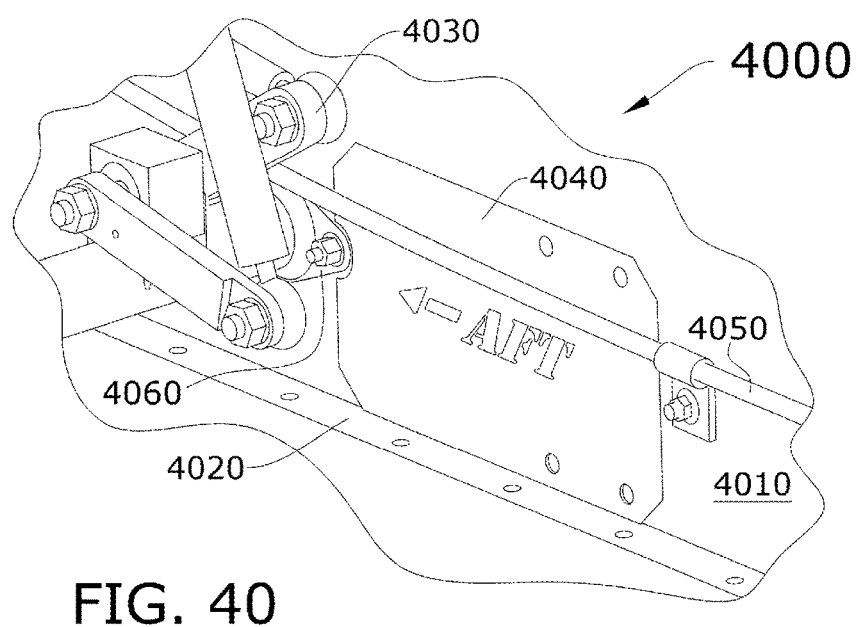
FIG. 40 conceptually illustrates a detail view of the S1 jig placement in some embodiments of the R44 starter interrupt.

In FIG. 40, a detail view of the S1 jig placement 4000 is shown for installation of the R44 starter interrupt along a compartment wall. Specifically, this figure shows a compartment wall 4010, a bottom lip 4020, an existing collective throttle and linkage assembly 4030, a jig 4040 which includes a jig notch, an existing cable 4050, and a tube flange 4060. As shown in this figure, the jig 4040 is placed behind the existing cable 4050 and flush along the compartment wall 4010. The jig 4040 is also flush and parallel with the bottom lip 4020. The jig 4040 is also placed proximate to the existing collective throttle and linkage assembly 4030 with the notch of the jig 4040 against the tube flange 4060. Match drill holes are made in the jig 4040 to match holes in the compartment wall 4010, thereby ensuring proper alignment of the jig 4040 with respect to the compartment wall 4010.

By way of another example, FIG. 41 conceptually illustrates a detail view of the S1 bracket mounting screw placement 4100 along the copilot seat compartment wall 4110 and above the floor 4120. As shown in this figure, the S1 bracket mounting screw placement 4100 includes screws 4130 and washers 4140 that fit through matching drill holes along the compartment wall 4110. The screws 4130 and washers 4140 are then used to secure a switch bracket to the surface of the jig 4040.

A switch and switch bracket are described next, by reference to FIG. 42, which conceptually illustrates a detail view of the S1 switch and bracket assembly 4200 in some embodiments of the R44 starter interrupt. As shown in this figure, the S1 switch and bracket assembly 4200 includes a microswitch 4210, a switch bracket 4220, screws 4230 (such as torque screws), nuts 4240 that secure to the screws 4230 to affix the microswitch 4210 securely to the switch bracket 4220, and washers 4250. When secured and tightened, the S1 switch and bracket assembly 4200 can be mounted (via the switch bracket 4220) to the compartment wall 4010, as described further below, by reference to FIG. 43.

Specifically, FIG. 43 conceptually illustrates a detail view of the S1 switch and bracket assembly in place 4300 in some embodiments of the R44 starter interrupt. As shown, the S1 switch and bracket assembly is in place 4300 along the compartment wall 4310 with microswitch 4320 mounted to the switch bracket 4420, which itself is secured to the compartment wall 4310 by nuts 4330 and washers 4340. When so secured, the microswitch 4320 is positioned proximate to the collective throttle and linkage control assembly, such that the kinetic movement of the collective throttle and linkage control assembly makes slight contact with the arm of the microswitch 4320.

Figure 44:
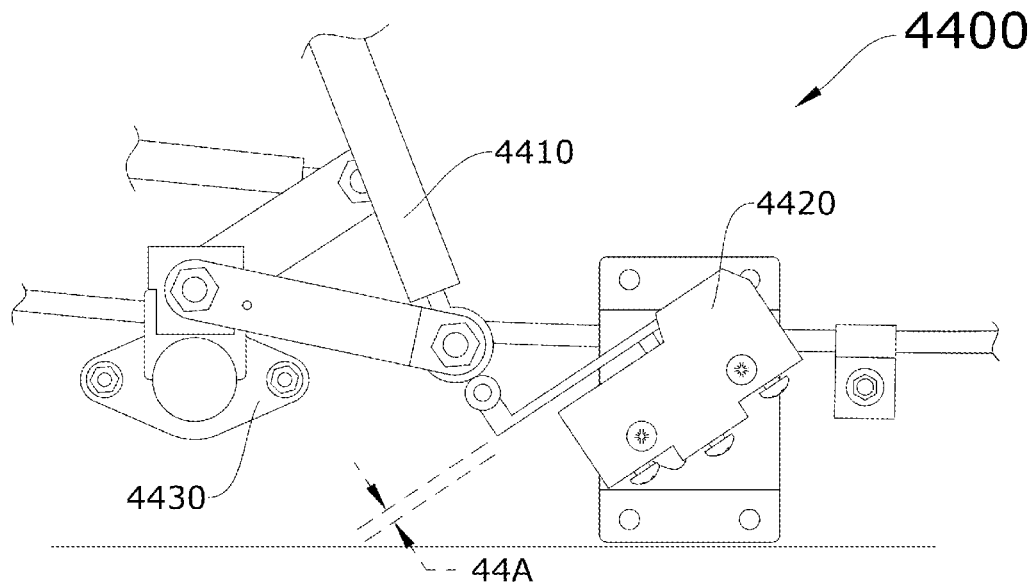
FIG. 44 conceptually illustrates a front view of the S1 switch and throttle linkage in some embodiments of the R44 starter interrupt.

By way of example, FIG. 44 conceptually illustrates a front view of the S1 switch and throttle linkage 4400 in some embodiments of the R44 starter interrupt. As shown in this figure, the collective throttle and linkage control assembly 4410 includes a tube flange 4430 to which the notch of the jig (not show in this figure) touches. Also, the microswitch 4420 and the collective throttle and linkage control assembly 4410 are in contact (at the arm of the microswitch 4420), which is designed to happen when the throttle is in the closed position. As described above by reference to FIG. 32, a gap 44A is maintained between the body and the arm of the microswitch 4420. Like the gap 32A described by reference to FIG. 32, the gap 44A shown here has a measurement in the range of 0.030 inches to 0.045 inches, thereby ensuring that the arm does not touch the body of the microswitch 4420 as the rod end bearing of the collective throttle and linkage control assembly 4410 comes into contact with the arm of the microswitch 4420.

Figure 45:
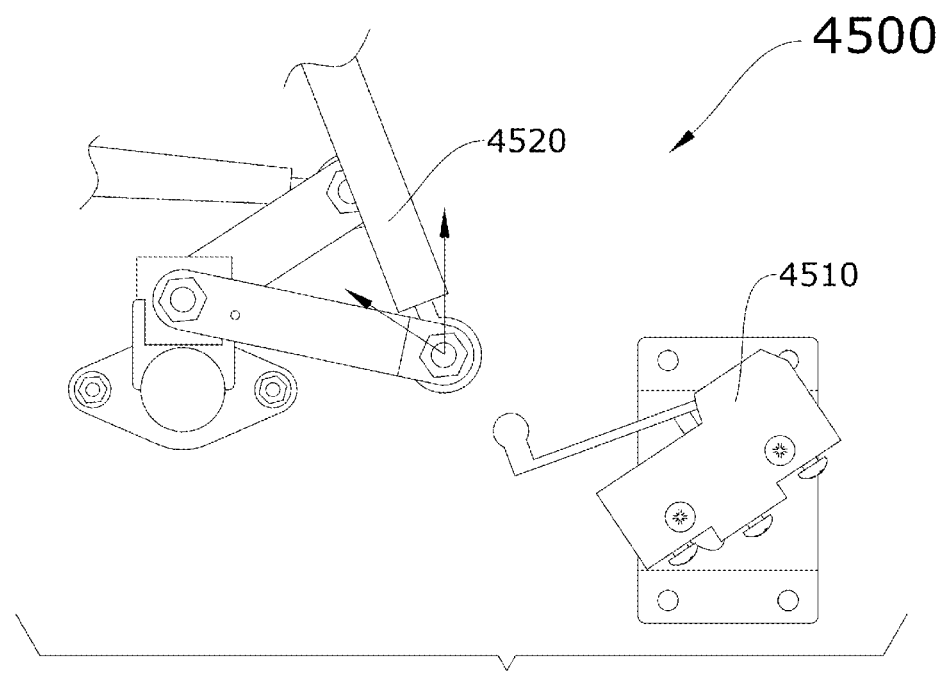
FIG. 45 conceptually illustrates a front view of a throttle kinematic logic open state of the S1 switch and throttle linkage in some embodiments of the R44 starter interrupt.

While the example in FIG. 44 demonstrates the rod end bearing of the collective throttle and linkage control assembly 4410 coming into contact with the arm of the microswitch 4420, FIG. 45 conceptually illustrates a front view of a throttle kinematic logic open state of the S1 switch and throttle linkage 4500 in some embodiments of the R44 starter interrupt. As shown in this figure, the arm of the microswitch 4510 is free from contact with the rod end bearing due to the motion of the collective throttle and linkage control assembly 4520 when the throttle is opened. In particular, the throttle kinematic logic open state of the S1 switch and throttle linkage 4500 is due to the direction of the collective throttle and linkage assembly 4520 moving upward and rearward, causing the rod end bearing to also move upward and backward, away from the arm of the microswitch 4510.

Figure 46:
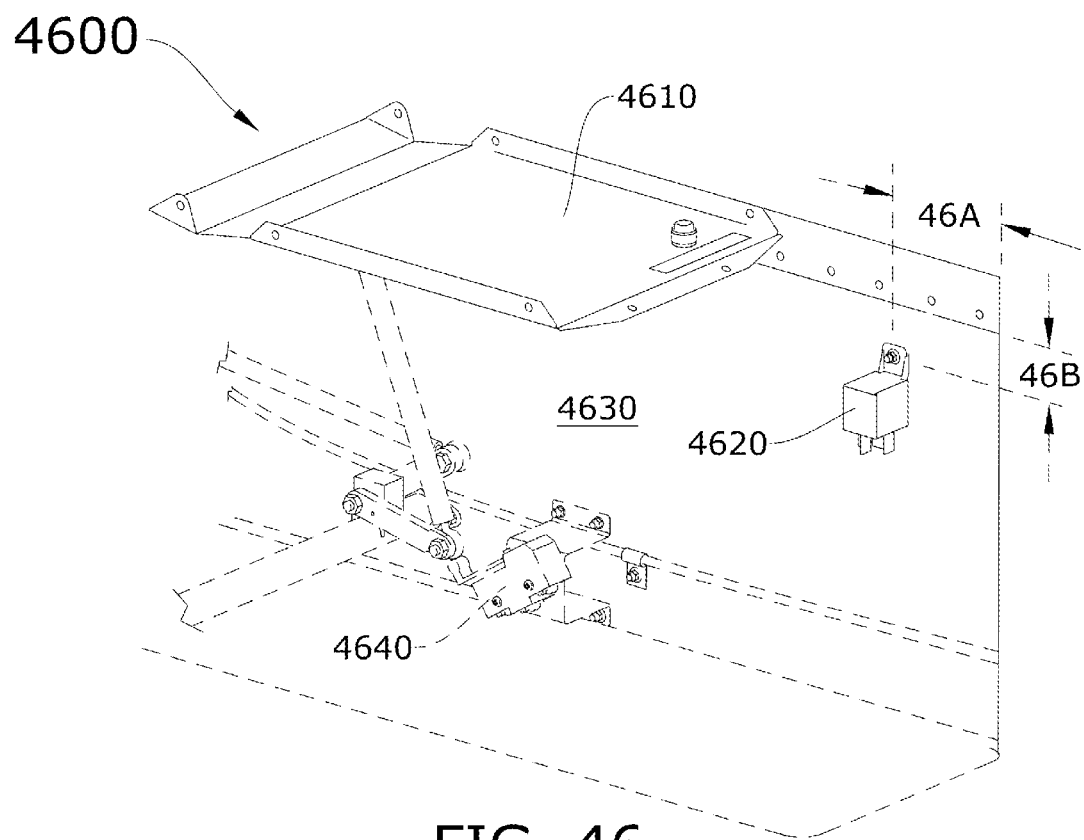
FIG. 46 conceptually illustrates a detail perspective view of the R1 relay installed along the copilot seat wall in some embodiments of the R44 starter interrupt.
Figure 47:
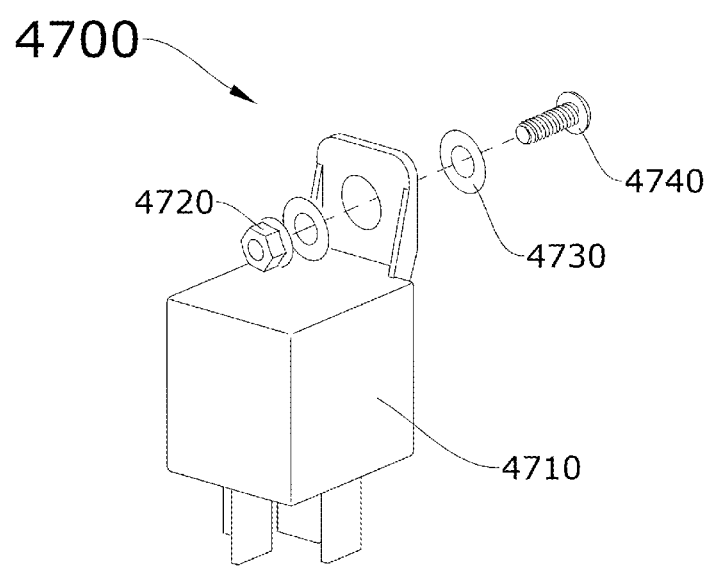
FIG. 47 conceptually illustrates an exploded view of the exemplary relay mounting in some embodiments of the R44 starter interrupt.

By reference to another example, FIG. 46 conceptually illustrates a detail perspective view 4600 of the relay (R1) installed along the copilot seat wall 4630 in some embodiments of the R44 starter interrupt. As shown in this figure, the relay (R1) 4620 is mounted along the copilot seat wall 4630 beneath a cover 4610 and a particular location opposite side of wall of the microswitch 4640. Specifically, the relay (R1) 4620 can be mounted to the copilot seat wall 4630 by removal of the cover 4610. The cover 4610 is described, along with lamp (L1) and label installation, in more detail below, by reference to FIG. 48. The position at which to mount the relay (R1) 4620 is defined by gaps 46A and 46B. In some embodiments, the gap 46A is two inches and the gap 46B is half of an inch (0.5 inches). Mounting hardware for the relay (R1) 4620 is described by reference to FIG. 47, which conceptually illustrates an exploded view of exemplary relay mounting 4700 in some embodiments of the R44 starter interrupt. As shown in this figure, the exemplary relay mounting 4700 includes a relay 4710 (such as relay (R1) 4620), a nut 4720, washers 4730, and a screw 4740. Mounting to the copilot seat wall 4630 is possible by tightening the nut 4720 and the screw 4740 together. Next, installation details of the cover, lamp, and label are described by reference to FIG. 48.

Figure 48:
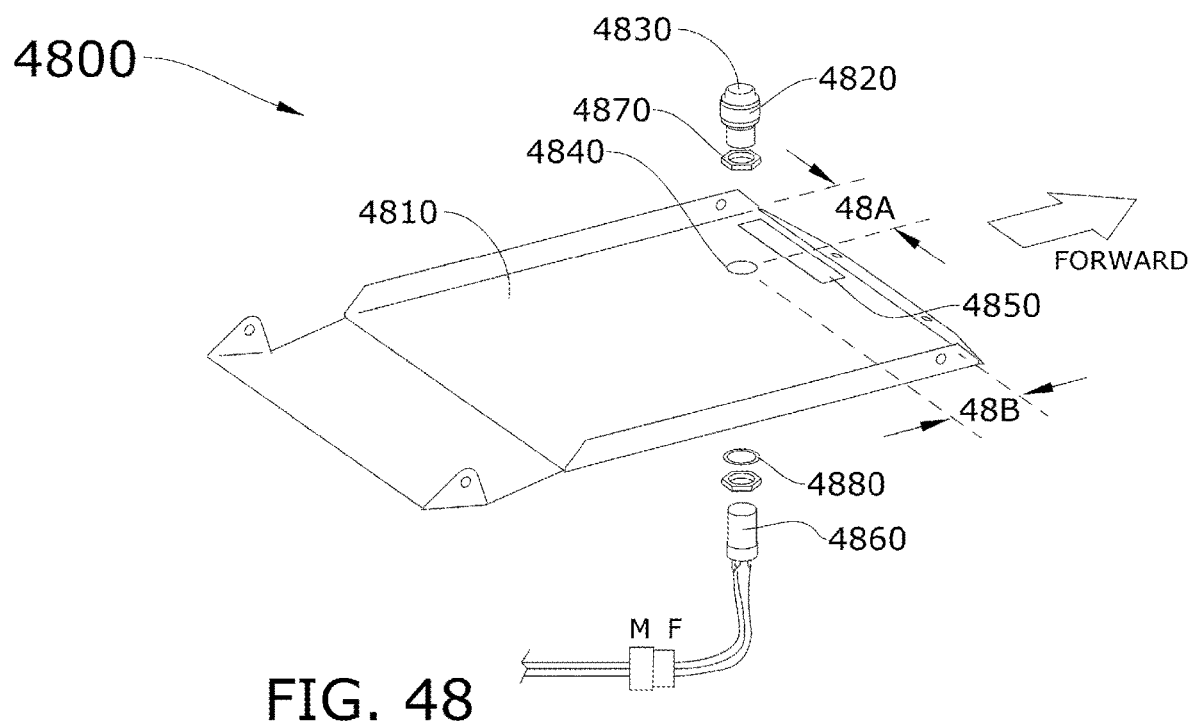
FIG. 48 conceptually illustrates a detail perspective view of the cover installation of the L1 lamp and the label in some embodiments of the R44 starter interrupt.

Specifically, FIG. 48 conceptually illustrates a detail perspective view of the cover installation of the L1 lamp and the label 4800 in some embodiments of the R44 starter interrupt. In this figure, several items are shown for cover installation of the lamp and the label 3700 including the cover 4810, the L1 lamp 4820 and the bulb 4830, a lamp hole 4840, a label 4850, a lamp base 4860, nuts 4870, and a washer 4880. The lamp hole 4840 is configured to be a half inch diameter cut-out hole positioned at a location of the cover 4810 defined by the intersection of gap 48A and gap 48B. As measured, gap 48A is one inch and gap 48B is six inches. The label 4850 is optional. When applied and used, the label 4850 may recite "Push to Test", "Press to Test", or, preferably, "RHSI L1 PTT", thereby providing brief information as to the PTT aspect of the L1 lamp 4820. Under the cover 4810 is the lamp base 4860 with connection pig tails off of pins 1, 2, and 3 on the bottom of the lamp base 4860. In some embodiments of the R44 starter interrupt system, the connection pig tails are approximately six inches long and connect to a Molex 4pin female connector and a Molex 4pin male connector, such as those described by reference to FIG. 23. One of the nuts 4870 is above the cover 4810 while the other nut 4870 is below the cover 4810 along with the washer 4880, which together secure the connection between the lamp base 4860 and the L1 lamp 4820 through the lamp hole 4840.

Figure 49:
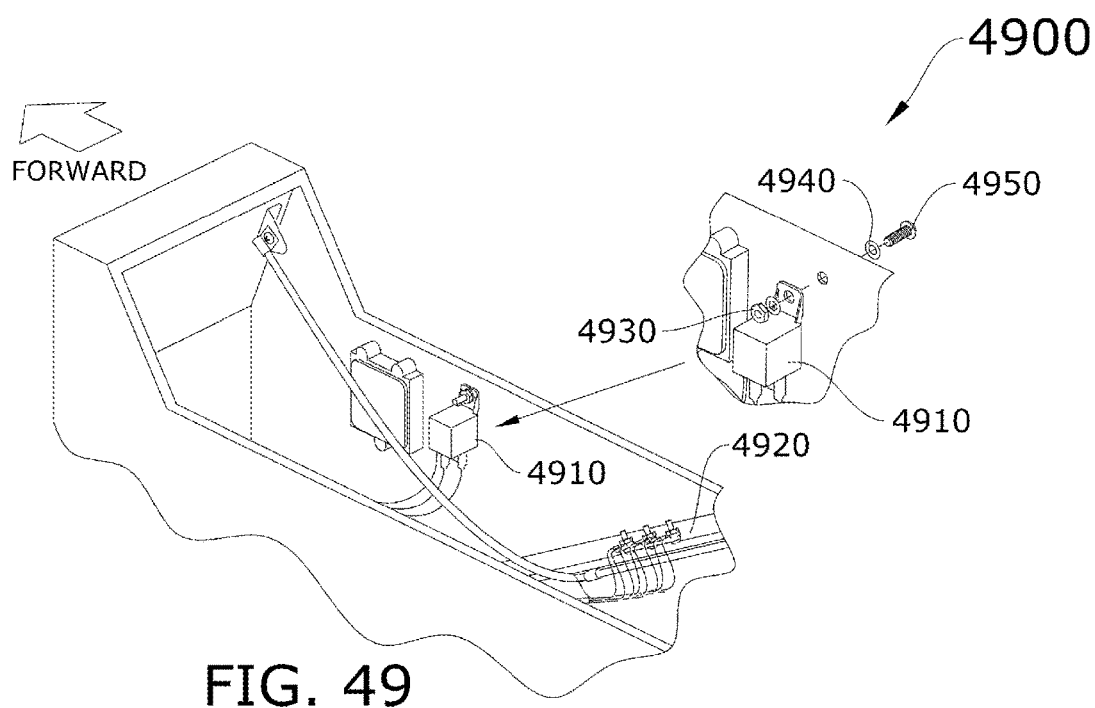
FIG. 49 conceptually illustrates a detail perspective view of the instrument panel tilted forward for access to the R2 relay in some embodiments of the R44 starter interrupt.

By way of example, FIG. 49 conceptually illustrates a detail perspective view of the instrument panel tilted forward for access to the R2 relay 4900 in some embodiments of the R44 starter interrupt. As shown, this figure demonstrates placement and mounting of a relay (R2) 4910 in relation to a ground bus bar 4920. To secure the relay (R2) 4910, a nut 4930, washers 4940, and a screw 4950 are used as the mounting hardware used to mount the relay (R2) 4910.

VII. R66 Starter Interrupt Installation and Deployment

Figure 50:
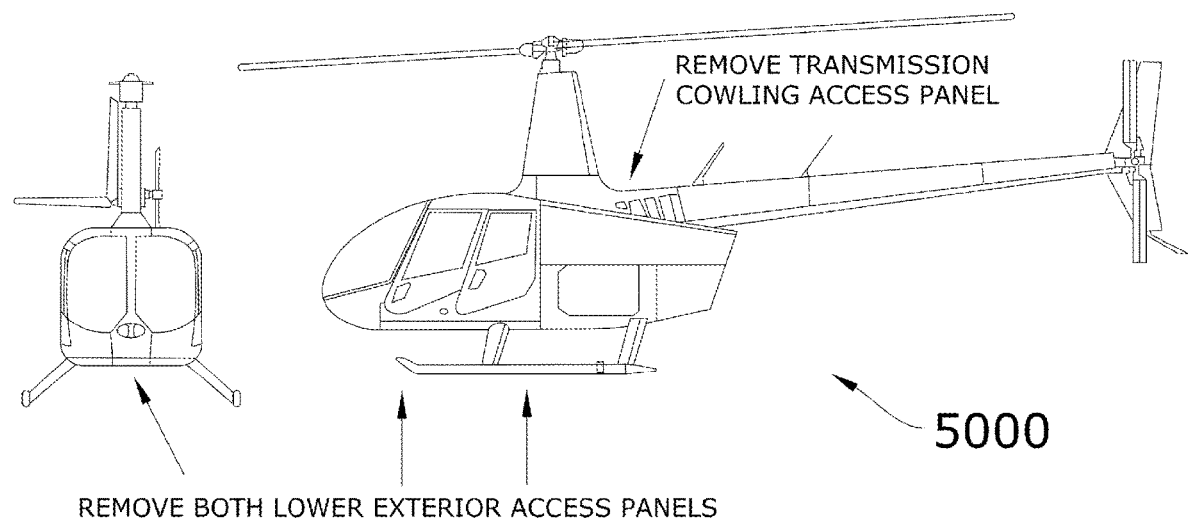
FIG. 50 conceptually illustrates a schematic view of a Robinson R66 model helicopter indicating a location from which to remove both lower exterior access panels and a location from which to remove the transmission cowling access panel for installation of an R66 starter interrupt.

By way of example, FIG. 50 conceptually illustrates a schematic view of a Robinson R66 model helicopter 5000 with pointers that indicate locations from which to remove both lower exterior access panels and the transmission cowling access panel for installation of an R66 starter interrupt.

Figure 51:
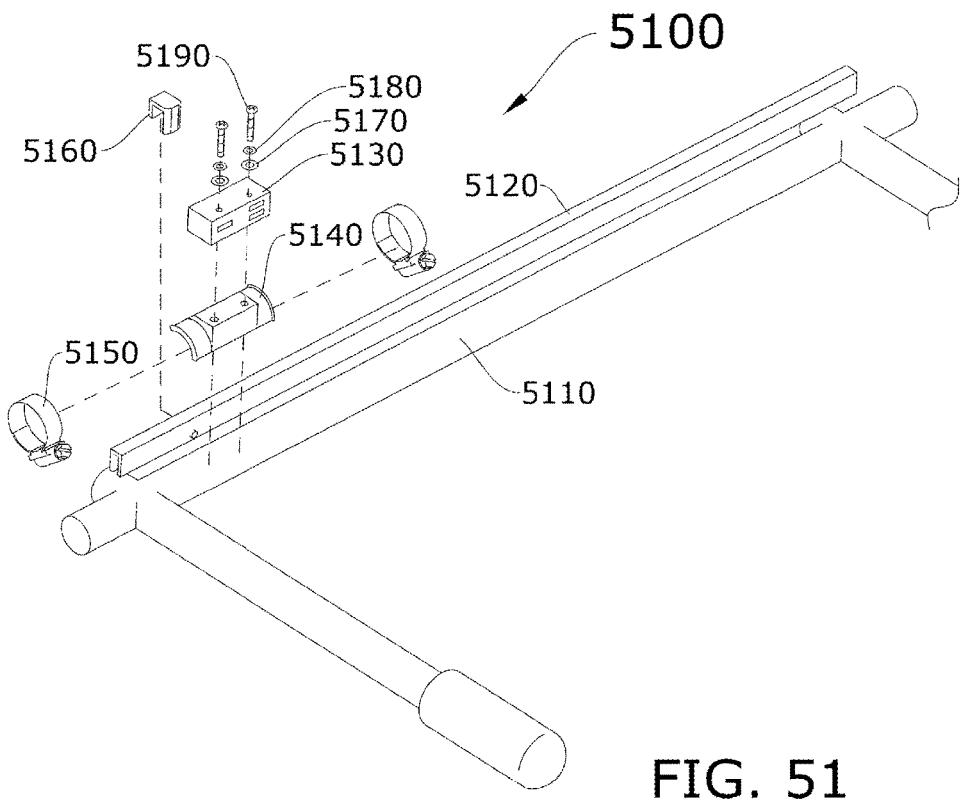
FIG. 51 conceptually illustrates an exploded view of the S1 microswitch and bracket installed onto a collective tube in some embodiments of the R66 starter interrupt.

Now turning to FIG. 51, an exploded view of an installed R66 microswitch (S1) and bracket 5100 which are installed onto a collective tube is conceptually illustrated. As shown in this figure, the installed R66 microswitch (S1) and bracket 5100 includes the collective tube 5110, a throttle interconnect bar 5120, a microswitch (S1) 5130, a mounting bracket 5140, clamps 5150, a microswitch actuator button 5160, washers 5170, small washers 5180, and screws 5190. The microswitch actuator button 5160 is bonded to the throttle interconnect bar 5120 using an adhesive, such as Loctite or another secure bonding adhesive. The microswitch (S1) 5130 and the mounting bracket 5140 are clamped to the collective tube 5110 using two clamps 5150 (one clamp 5150 clamped onto each end of the collective tube 5110). The microswitch (S1) is affixed to the top of the mounting bracket 5140 by washers 5170, small washers 5180, and screws 5190. When clamped to the collective tube 5110, the mounting bracket 5140 is secured (below) to the collective tube 5110 and (above) to the microswitch (S1) 5130.

Figure 52:
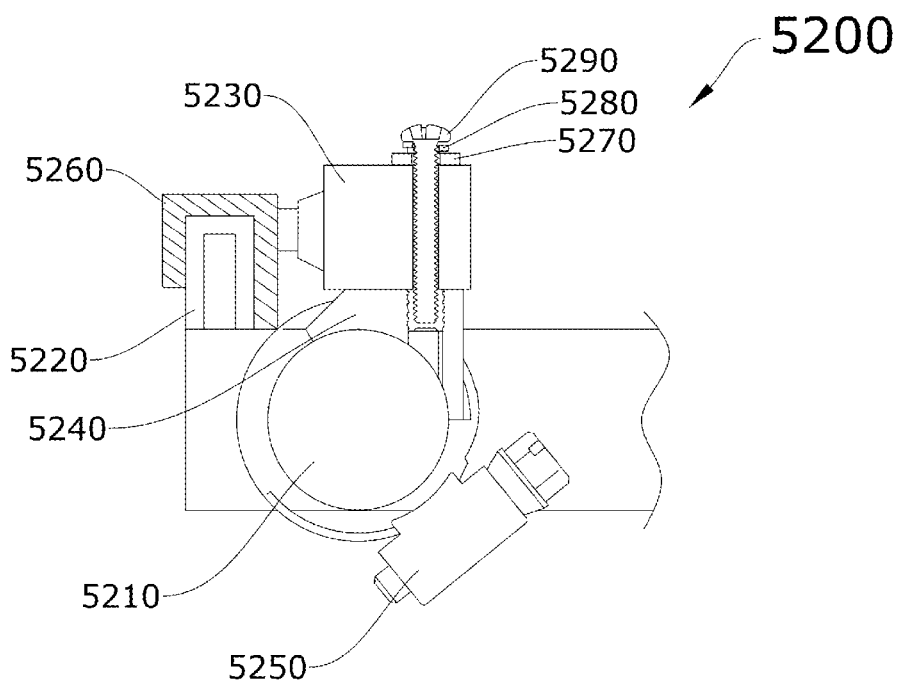
FIG. 52 conceptually illustrates a detail view of the S1 microswitch and bracket as assembled for installation in some embodiments of the R66 starter interrupt.

Turning to another example, FIG. 52 conceptually illustrates a detail view of the microswitch (S1) and bracket as assembled for installation 5200 in some embodiments of the R66 starter interrupt. As shown in this figure, the microswitch (S1) and bracket as assembled for installation 5200 includes the collective tube 5210, the throttle interconnect bar 5220, the microswitch (S1) 5230, the mounting bracket 5240, the clamps 5250, the microswitch actuator button 5260, the washers 5270, the small washers 5280, and the screws 5290.

Figure 53:
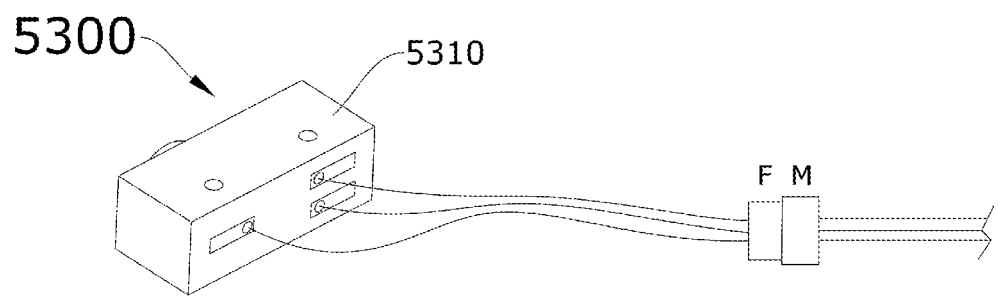
FIG. 53 conceptually illustrates a detail view of the S1 microswitch in some embodiments of the R66 starter interrupt with pigtail wiring for connection as demonstrated in FIG. 25.

By way of example, FIG. 53 conceptually illustrates a detail view 5300 of the microswitch (S1) 5310 in some embodiments of the R66 starter interrupt. As shown in this figure, the microswitch (S1) 5310 includes connection pigtails which are pre-wired (at approximately six inches in length) to connect to a Molex 4pin female connector and a Molex 4pin male connector.

Figure 54:
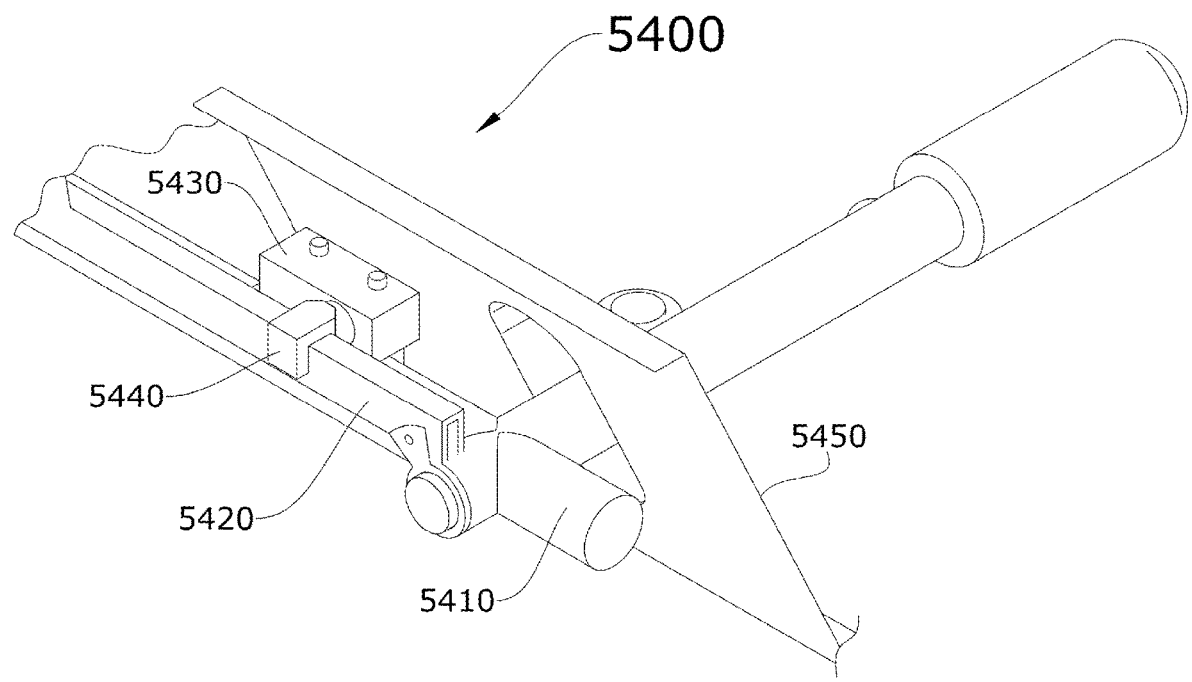
FIG. 54 conceptually illustrates detail perspective view of the S1 microswitch as installed in some embodiments of the R66 starter interrupt.

By way of another example, FIG. 54 conceptually illustrates detail perspective view of the microswitch (S1) as installed 5400 in some embodiments of the R66 starter interrupt. In particular, the collective tube 5410, the throttle interconnect bar 5420, the microswitch (S1) 5430, and the mounting bracket 5340 are shown as installed in this figure, with a cover 5450 in place.

Figure 55:
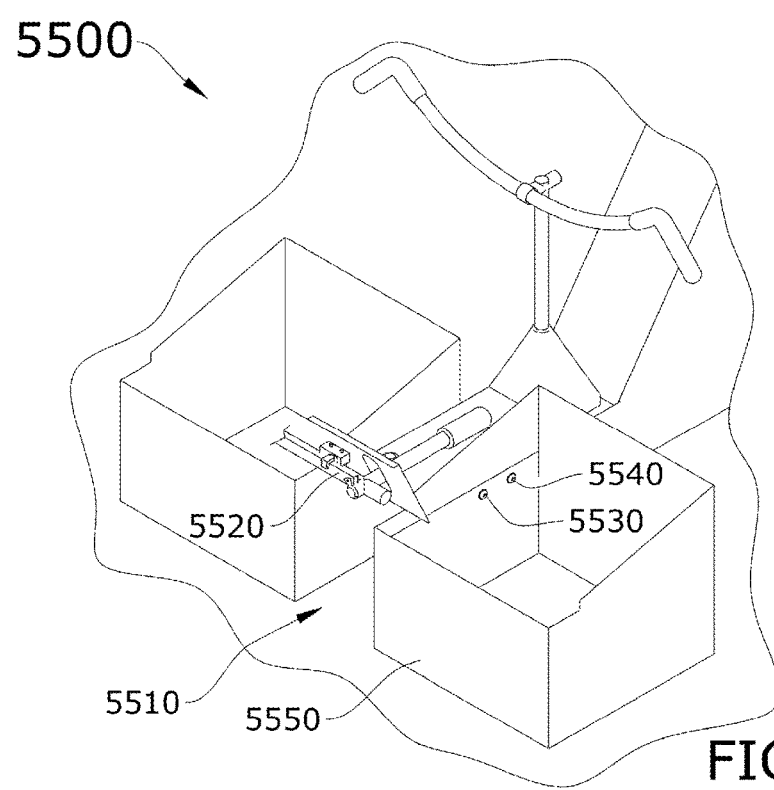
FIG. 55 conceptually illustrates a detail view of the relay locations in some embodiments of the R66 starter interrupt.
Figure 56:
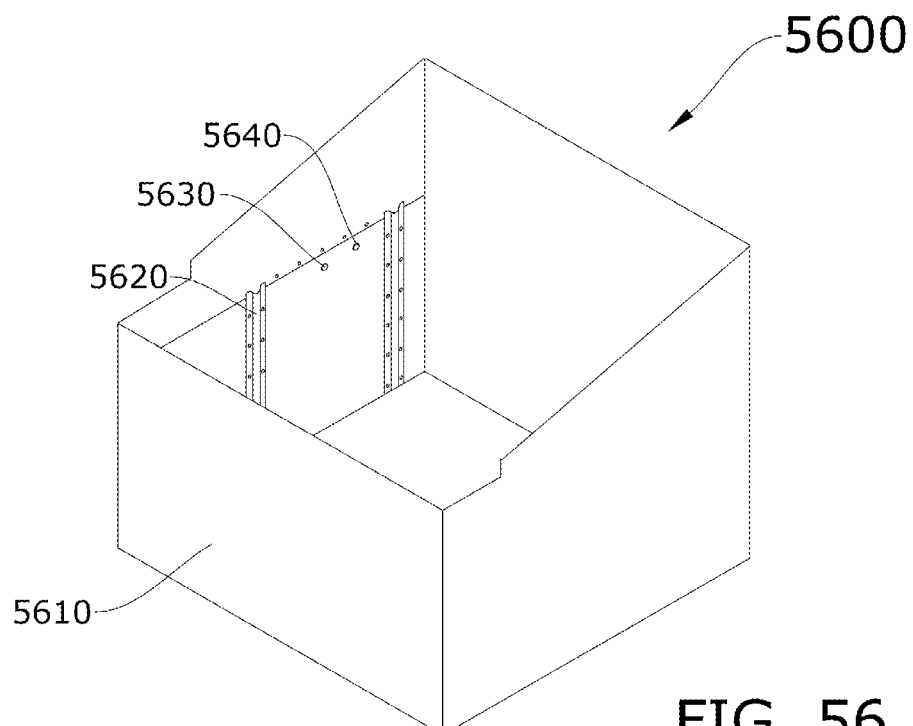
FIG. 56 conceptually illustrates a detail view of the relay locations in the pilot seat box in some embodiments of the R66 starter interrupt.
Figure 57:
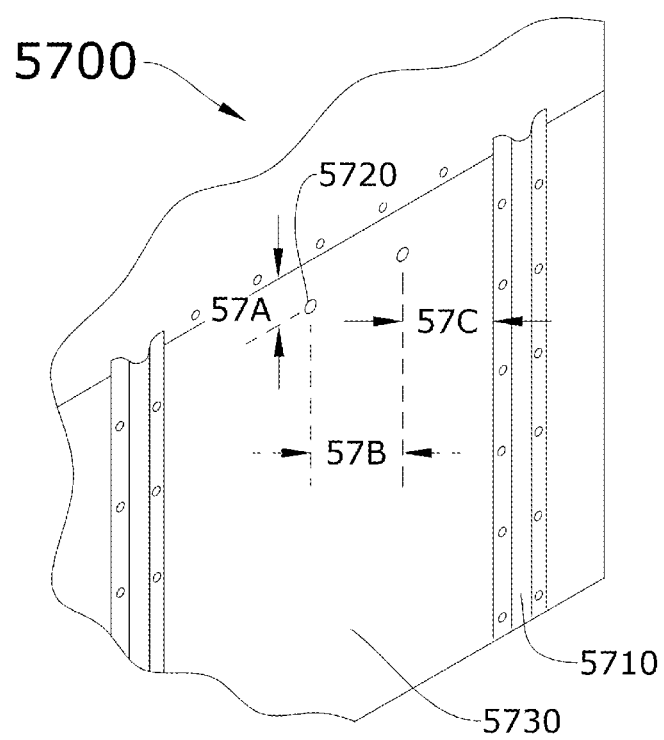
FIG. 57 conceptually illustrates a detail view of the relay locations with respect to seat box ribs in the pilot seat box in some embodiments of the R66 starter interrupt.

Now, in reference to another view, FIG. 55 conceptually illustrates a detail view of the relay locations 5500 in some embodiments of the R66 starter interrupt. As shown in this figure, the detail view of the relay locations 5500 illustrates a linkage tunnel 5510 under the pilot collective, the collective tube 5520 of the assembled and installed microswitch (S1), a first relay location screw 5530, a second relay location screw 5540, and a pilot seat box 5550. A more detailed view is demonstrated in FIG. 56, which conceptually illustrates a detail view of the relay locations in the pilot seat box 5600 in some embodiments of the R66 starter interrupt. As shown, the pilot seat box 5610 includes seat box ribs 5620, a first relay location screw 5630, and a second relay location screw 5640. Still closer and more detailed, FIG. 57 conceptually illustrates a detail view of the relay locations with respect to seat box ribs in the pilot seat box 5700 in some embodiments of the R66 starter interrupt. As shown in this figure, the seat box ribs 5710 are affixed vertically to the inside of the pilot seat box wall 5730. Also, relay mounting holes 5720 are shown as being spaced according to gap 57A, gap 57B, and gap 57C. In some embodiments, the gap 57A measures half an inch (0.5 inches) down from a peak height of the seat box ribs 5710 along the pilot seat box wall 5730, gap 57B measures two inches between the relay mounting holes 5720, and gap 57C measures two inches (horizontally away) from one of the seat box ribs 5710.

Figure 58:
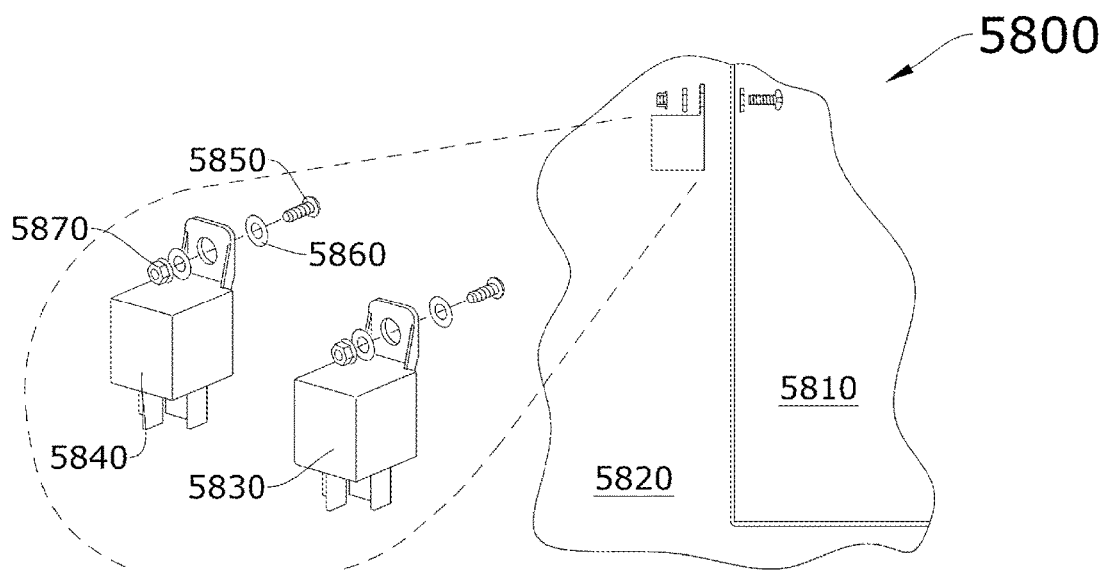
FIG. 58 conceptually illustrates side and detail views of the installation of the relays in some embodiments of the R66 starter interrupt.

By way of another R66 start interrupt example, FIG. 58 conceptually illustrates side and detail views of the installation of the relays 5800. From the view shown in this figure, the pilot seat box 5810 is to the right of the linkage tunnel 5820. A first relay (R1) 5830 and a second relay (R2) 5840 are shown in detail view with mounting hardware including (for each relay) a screw 5850, washers 5860, and a fastener nut 5870. From the side view, the relay (whether the first relay (R1) 5830 or the second relay (R2) 5840) is affixed to the outside wall of the pilot seat box 5810 within the linkage tunnel 5820 and is secured by the screw 5850 and a washer 5860 within the pilot seat box 5810. Although not shown in this figure, it is understood that the screw 5850 secures the relay in place when screwed through the mounting hole 5720 and tightened via the nut 5870.

Figure 59:
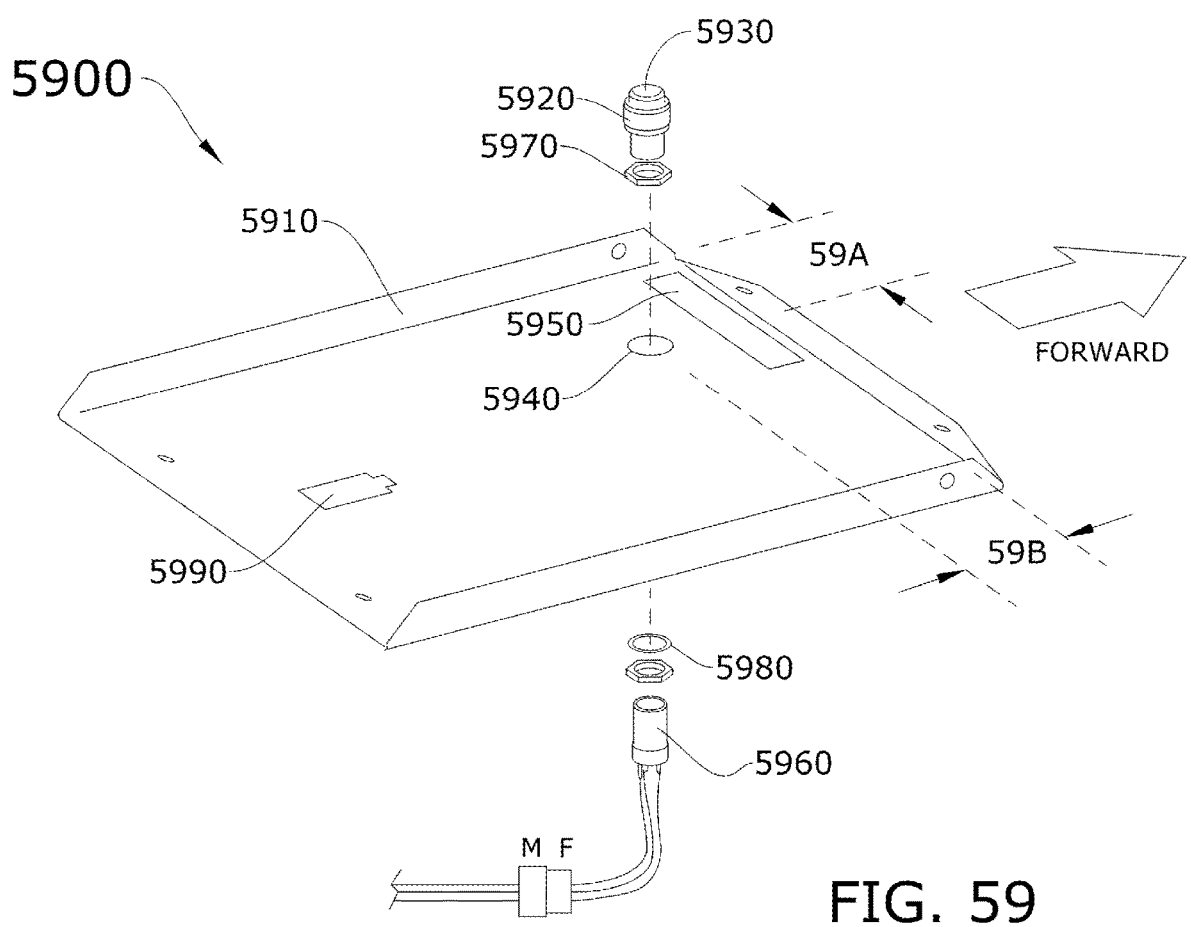
FIG. 59 conceptually illustrates a detail perspective view of the cover installation of the L1 lamp and the label in some embodiments of the R66 starter interrupt.

By way of another example, FIG. 59 conceptually illustrates a detail perspective view of the cover installation of the L1 lamp and the label 5900 in some embodiments of the R66 starter interrupt. In this figure, several items are shown for cover installation of the L1 lamp and the label 5900 including the cover 5910, the L1 lamp 5920, the bulb 5930, a lamp hole 5940, a label 5950, a lamp base 5960, nuts 5970, a washer 5980, and a friction hole 5990. The lamp hole 5940 is configured to be a half inch diameter cut-out hole positioned at a location of the cover 5910 defined by the intersection of gap 59A and gap 59B. As measured, gap 59A is one and a half inches (1.5") and gap 59B is two inches (2"). The label 5950 is optional. When applied and used, the label 5950 may recite "Push to Test", "Press to Test", or, preferably, "RHSI L1 PTT", thereby providing brief information as to the PTT aspect of the L1 lamp 5920. Under the cover 5910 is the lamp base 5960 with connection pig tails off of pins 1, 2, and 3 on the bottom of the lamp base 5960. In some embodiments of the R66 starter interrupt circuit system, the connection pig tails are approximately six inches long and connect to a Molex 4pin female connector and a Molex 4pin male connector, such as those described by reference to FIG. 23. One of the nuts 5970 is above the cover 5910 while the other nut 5970 is below the cover 5910 along with the washer 5980, which together secure the connection between the lamp base 5960 and the L1 lamp 5920 through the lamp hole 5940. The friction hole 5990 (or "collective friction hole 5990") is pre-cut in some embodiments.

Figure 60:
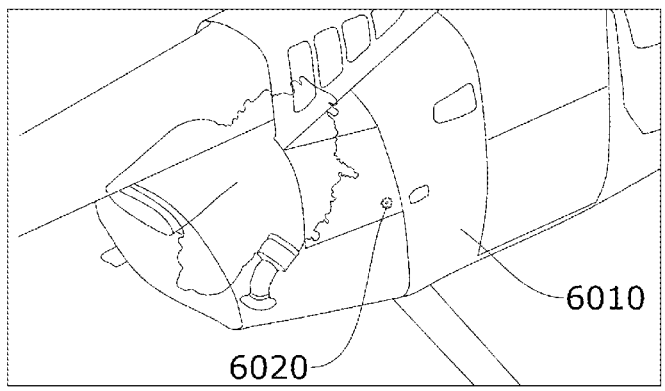
FIG. 60 conceptually illustrates a detail view of a wire route through a firewall for the FCU S2 switch in some embodiments of the R66 starter interrupt.

By way of example, FIG. 60 conceptually illustrates a detail view 6000 of a wire route through a firewall for the FCU S2 switch and cutoff lever in connection with installation and deployment of the R66 starter interrupt. Specifically, a rear portion of a Robinson R66 helicopter 6010 is shown with the firewall wire bundle opening 6020 near the rear of the helicopter 6010.

Figure 61:
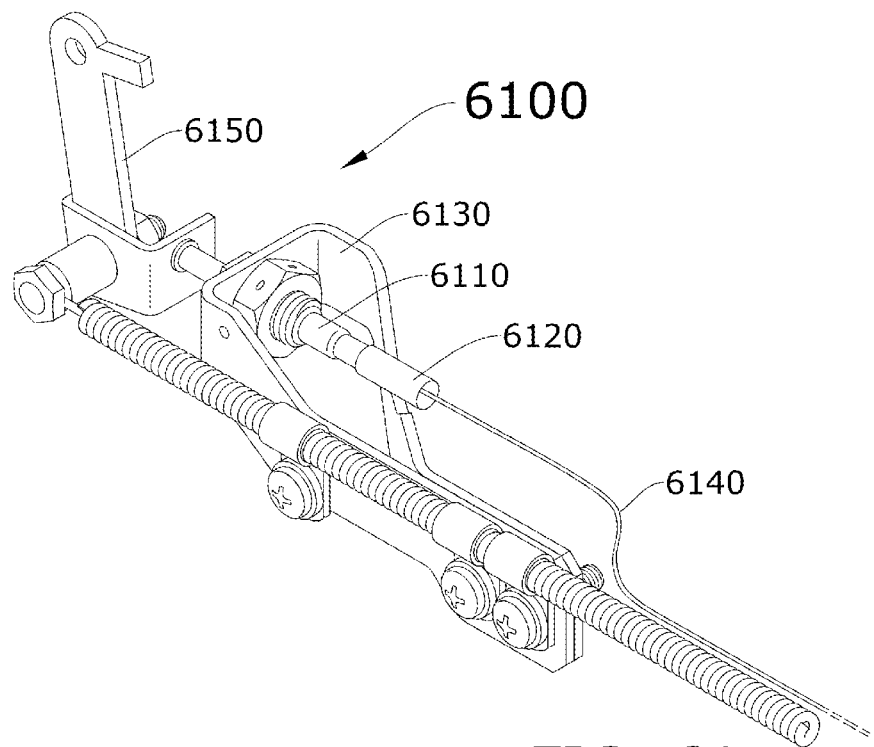
FIG. 61 conceptually illustrates a detail perspective view of the FCU S2 switch and fuel cutoff lever in some embodiments of the R66 starter interrupt.
Figure 62:
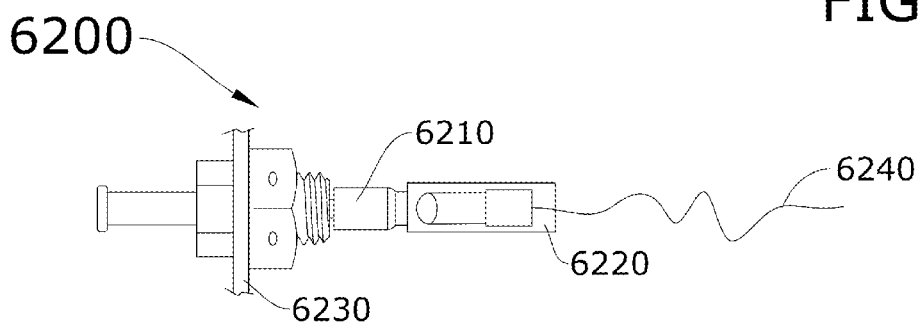
FIG. 62 conceptually illustrates a detail view of the S2 switch that is incorporated into the FCU S2 switch and fuel cutoff lever in some embodiments of the R66 starter interrupt.

Turning to another example of a component installed for the R66 starter interrupt, FIG. 61 conceptually illustrates a detail perspective view of the FCU S2 switch and fuel cutoff lever 6100 in some embodiments of the R66 starter interrupt. As shown in this figure, the FCU S2 switch and fuel cutoff lever 6100 includes a switch (S2) 6110 for detection of fuel engagement via the fuel cutoff unit, a bullet plug 6120, a bracket 6130, a wire 6140, and a fuel cutoff lever 6150. Referring now to an example of another item installed with the R66 starter interrupt, FIG. 62 conceptually illustrates a detail view 6200 of the switch (S2) that is incorporated into the FCU S2 switch and fuel cutoff lever 6100 in some embodiments of the R66 starter interrupt. Specifically, this figures shows the assembly of components: the switch (S2) 6210 for detection of fuel engagement via the fuel cutoff unit, the bullet plug 6220, the bracket 6230, and the wire 6240. In some embodiments, the body of the switch (S2) 6210 is bonded to airframe ground through the bracket 6230, thereby providing electrical ground for the second relay (R2) of the R66 starter interrupt circuit.

Figure 63:
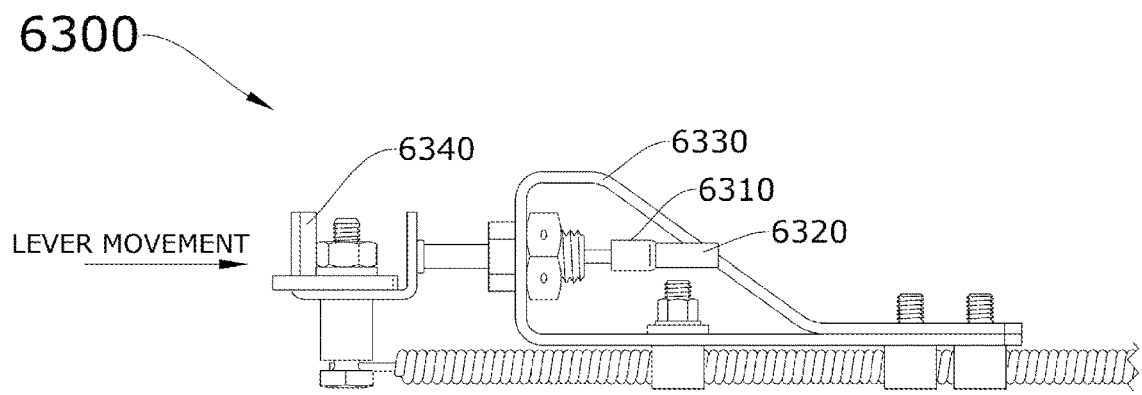
FIG. 63 conceptually illustrates a front view of the FCU S2 switch and fuel cutoff lever in a closed position in some embodiments of the R66 starter interrupt.

Now, open and closed positions of the FCU S2 switch and fuel cutoff lever are described next, by reference to FIG. 63, which conceptually illustrates a front view of the FCU S2 switch and fuel cutoff lever in a closed position 6300 for the R66 starter interrupt, and by reference to FIG. 64, which conceptually illustrates a front view of the FCU S2 switch and fuel cutoff lever in an open position 6400 for the R66 starter interrupt. Starting with FIG. 63, the FCU S2 switch and fuel cutoff lever in the closed position 6300 for the R66 starter interrupt includes the switch (S2) 6310, the bullet plug 6320, the bracket 6330, and the fuel cutoff lever 6340 (the wire 6140 is not shown here). In this configuration, the lever movement is a forward/push movement that makes a contact between the fuel cutoff lever 6340 and the switch (S2) 6310 that is incorporated into the FCU S2 switch and fuel cutoff lever, which also pushes a portion of the bullet plug 6320 forward by outward movement of the switch (S2) 6310 away from the bracket 6330. As a result of the switch (S2) being open, the fuel cut-off is set to the closed position.

Figure 64:
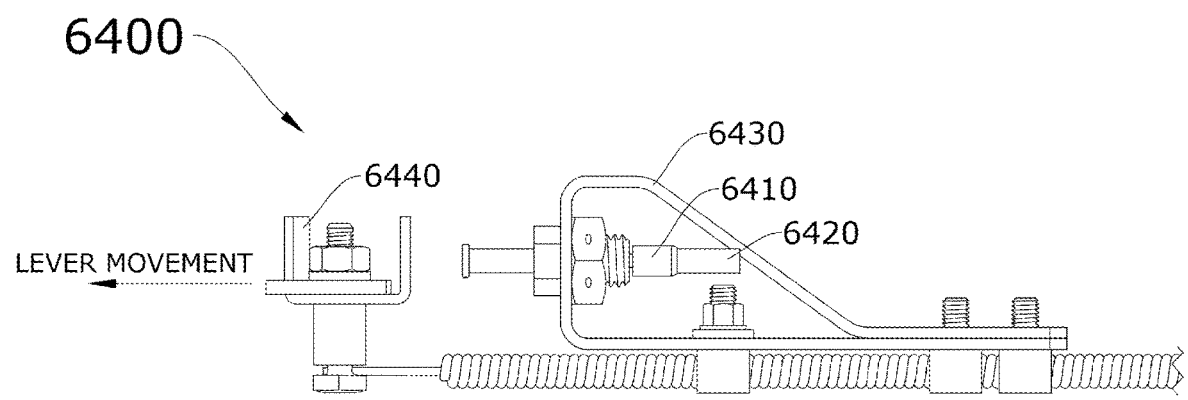
FIG. 64 conceptually illustrates a front view of the FCU S2 switch and fuel cutoff lever in an open position in some embodiments of the R66 starter interrupt.

By contrast, and referring now to FIG. 64, the FCU S2 switch and fuel cutoff lever in the open position 6400 for the R66 starter interrupt includes the switch (S2) 6410, the bullet plug 6420, the bracket 6430, and the fuel cutoff lever 6440. In this configuration, the lever movement is a backward pull movement that separates the fuel cutoff lever 6440 from the switch (S2) 6410. This also causes the bullet plug 6420 to be pulled backward and leaves the switch (S2) 6410 in the closed position. When the switch (S2) 6410 is closed, the fuel cut-off is set to the open position.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. An on-ground engine starter interrupt system of a helicopter that prevents engine start up for reciprocating and turbine helicopters when at least one of the throttle is open and the fuel control is engaged, said on-ground engine starter interrupt system comprising:
   a first electrical position switch S1;
   a second electrical position switch S2, wherein at least one of the first electrical position switch S1 and the second electrical position switch S2 is positioned via a mounting bracket next to at least one of a throttle linkage of the helicopter and a fuel control of the helicopter to detect its position as being in one of an open position and a closed position;
   a first relay R1 that is connected in series to an existing engine starter signal wire and which provides a starter signal to the first electrical position switch S1;
   a second relay R2 that is used to isolate the starter interrupt circuit after a normal engine start; and
   an indicator light L1, wherein the first electrical position switch S1, the second electrical position switch S2, the first relay R1, and the second relay R2 are connected to control linkage that detects when at least one of the throttle of the helicopter is open and the fuel control of the helicopter is engaged, wherein an engine starter signal is interrupted when at least one of the throttle and the fuel control is in the open position, as detected by at least one of the first electrical position switch S1 and the second electrical position switch S2, and the indicator lamp L1 is lighted to indicate that at least one of the throttle and the fuel control is in the open position, wherein the engine starter signal is supplied to the engine starter switch for engagement when the throttle of the helicopter and the fuel control of the helicopter are in the closed position.

* * * * *